US011819108B2

(12) United States Patent
Mouizina et al.

(10) Patent No.: US 11,819,108 B2
(45) Date of Patent: Nov. 21, 2023

(54) SMART MIRROR SYSTEM AND METHODS OF USE THEREOF

(71) Applicant: CareOS, Neuilly-sur-Seine (FR)

(72) Inventors: Ali Mouizina, Paris (FR); Thomas Serval, Neuilly-sur-Seine (FR)

(73) Assignee: CAREOS, Neuilly-sur-Seine (FR)

( * ) Notice: Subject to any disclaimer, the term of this patent is extended or adjusted under 35 U.S.C. 154(b) by 109 days.

(21) Appl. No.: 17/608,449

(22) PCT Filed: May 6, 2020

(86) PCT No.: PCT/IB2020/054302
§ 371 (c)(1),
(2) Date: Nov. 2, 2021

(87) PCT Pub. No.: WO2020/225756
PCT Pub. Date: Nov. 12, 2020

(65) Prior Publication Data
US 2022/0192346 A1 Jun. 23, 2022

Related U.S. Application Data

(60) Provisional application No. 62/843,980, filed on May 6, 2019.

(51) Int. Cl.
*A45D 44/00* (2006.01)
*H04N 7/18* (2006.01)
(Continued)

(52) U.S. Cl.
CPC ............ *A45D 44/005* (2013.01); *G06F 3/011* (2013.01); *G06T 11/001* (2013.01); *G06T 11/60* (2013.01);
(Continued)

(58) Field of Classification Search
CPC ............... G06F 2111/18; G06F 3/0481; G06F 3/04817; G06F 9/4443; G06F 3/04847;
(Continued)

(56) References Cited

U.S. PATENT DOCUMENTS 7,589,893 B2 9/2009 Rottcher
10,043,317 B2 8/2018 Kline
(Continued)

FOREIGN PATENT DOCUMENTS

EP 1 809 828 B1 4/2011
EP 2 905 721 B1 8/2020
(Continued)

OTHER PUBLICATIONS

International Search Report and Written Opinion in International Application No. PCT/IB2020/057996, dated Nov. 20, 2020 (13 pages).
(Continued)

*Primary Examiner* — Todd Buttram
(74) *Attorney, Agent, or Firm* — Nixon Peabody LLP

(57) ABSTRACT

A system comprises a frame, a mirror coupled to the frame, an electronic display device coupled to the frame, a camera coupled to the frame, one or more processors, and one or more memory devices. The one or more processors are configured to execute instructions that are stored in the one or more memory devices. The one or more processors executing the instructions causes the system to continuously display, on the electronic display device, a real-time video feed of a user within a field of view of the camera; identify and object within the field of view of the camera; and, subsequent to the identification, modify the continuously displayed real-time video feed based on at least the identified object.

20 Claims, 41 Drawing Sheets

(51) Int. Cl.
*H04N 5/272* (2006.01)
*G06T 11/00* (2006.01)
*G06T 11/60* (2006.01)
*G06F 3/01* (2006.01)
*G06V 40/16* (2022.01)
*G06F 3/04817* (2022.01)
*G06F 3/04842* (2022.01)

(52) U.S. Cl.
CPC ............... *H04N 5/272* (2013.01); *H04N 7/18* (2013.01); *A45D 2044/007* (2013.01); *G06F 3/04817* (2013.01); *G06F 3/04842* (2013.01); *G06T 2203/011* (2013.01); *G06T 2200/24* (2013.01); *G06V 40/172* (2022.01)

(58) Field of Classification Search
CPC .... G06F 11/3664; G06F 3/012; G06F 3/0304; G06F 3/011–015; G06V 20/20; G06T 19/00; G06T 17/00; G06T 7/00; G06T 19/006; G06T 2215/16; H04N 5/272; H04N 2201/3245; A63F 13/10; G02B 27/017
See application file for complete search history.

(56) References Cited

U.S. PATENT DOCUMENTS

| | | | |
|---|---|---|---|
| 11,533,453 B2 * | 12/2022 | Mouizina | G09F 13/005 |
| 2002/0196333 A1 | 12/2002 | Gorischek | |
| 2007/0010033 A1 | 1/2007 | Aderhold et al. | |
| 2013/0145272 A1 | 6/2013 | Boggie | |
| 2014/0098179 A1 | 4/2014 | Moore | |
| 2015/0205376 A1 | 7/2015 | Kubota | |
| 2016/0128450 A1 | 5/2016 | Saito | |
| 2017/0236334 A1 * | 8/2017 | Yu | G06F 3/041 345/633 |
| 2018/0005448 A1 | 1/2018 | Choukroun | |
| 2018/0032227 A1 * | 2/2018 | Broxson | G06F 3/0425 |
| 2018/0348861 A1 | 12/2018 | Uscinski | |
| 2019/0026013 A1 * | 1/2019 | Aarabi | G06F 3/04845 |
| 2019/0035163 A1 | 1/2019 | Skwarek | |
| 2019/0041902 A1 | 2/2019 | Lee | |
| 2020/0206631 A1 * | 7/2020 | Sumant | G06V 40/20 |
| 2020/0336705 A1 * | 10/2020 | Mouizina | G09G 5/10 |
| 2021/0406987 A1 * | 12/2021 | Kornilov | G06V 40/172 |
| 2022/0114784 A1 * | 4/2022 | Schickel | G06T 19/20 |
| 2022/0192346 A1 * | 6/2022 | Mouizina | H04N 5/272 |

FOREIGN PATENT DOCUMENTS

| | | |
|---|---|---|
| WO | WO 2006/119869 A2 | 11/2006 |
| WO | WO 2017/108703 A1 | 6/2017 |
| WO | WO 2018/004615 A1 | 1/2018 |
| WO | WO 2018/005884 A1 | 1/2018 |

OTHER PUBLICATIONS

International Search Report and Written Opinion in International Application No. PCT/IB2020/054302, dated Jul. 28, 2020 (14 pages).
International Search Report and Written Opinion in International Application No. PCT/IB2019/050086, dated Jul. 8, 2019 (18 pages).

* cited by examiner

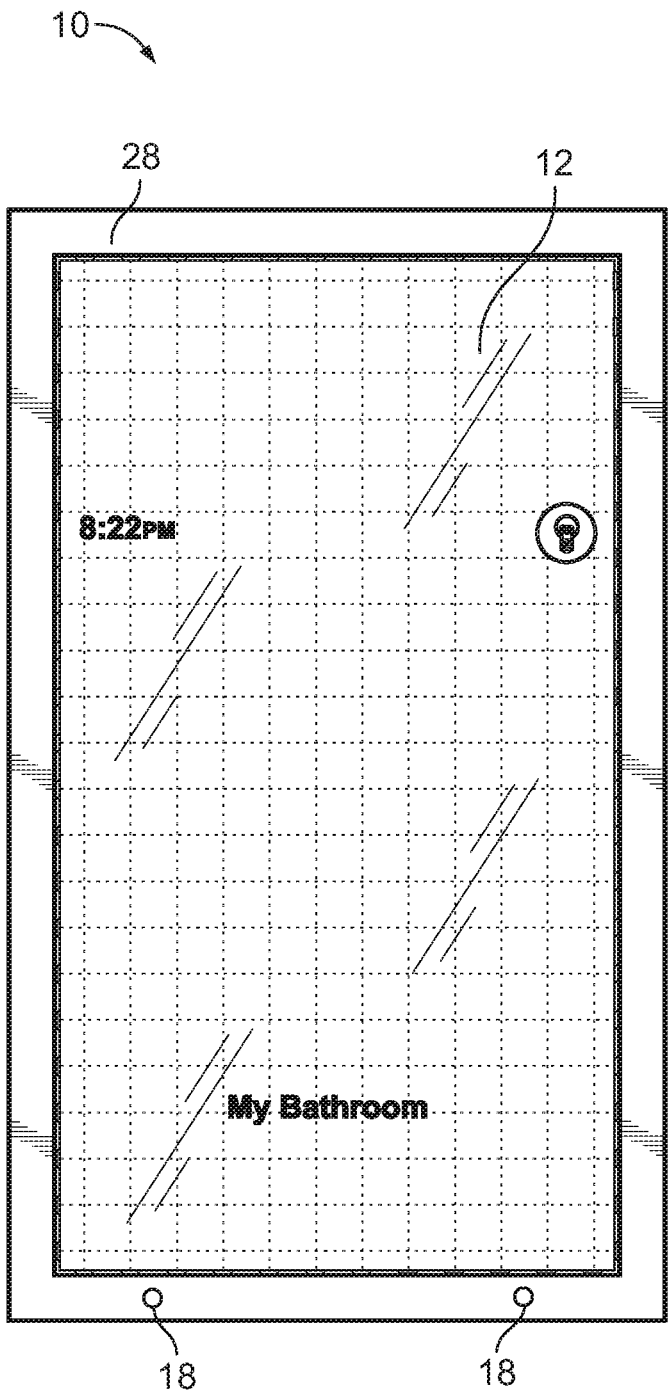
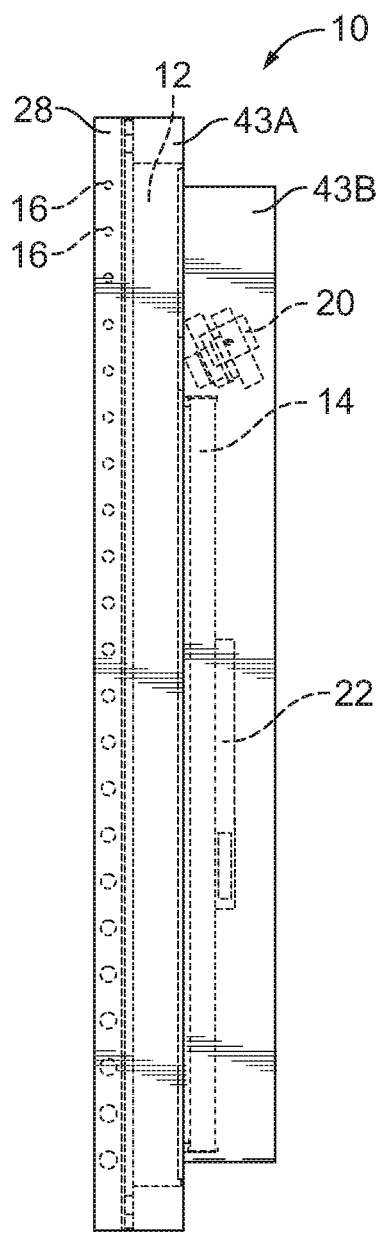
FIG. 3A
FIG. 3B

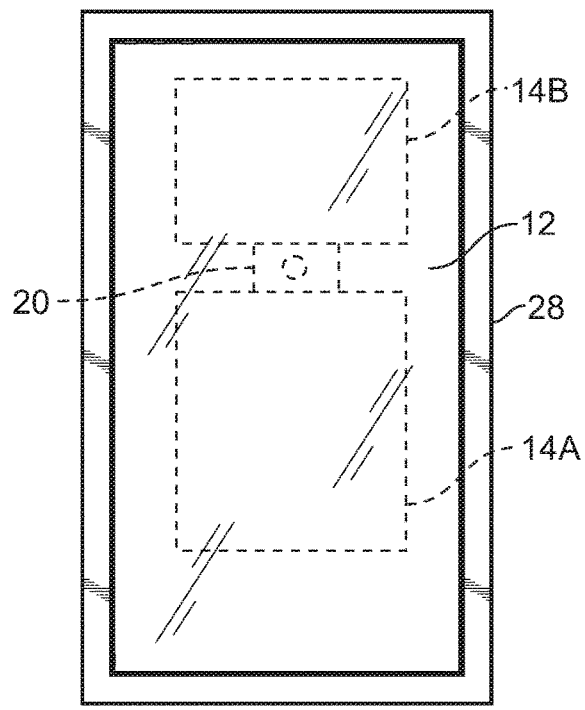
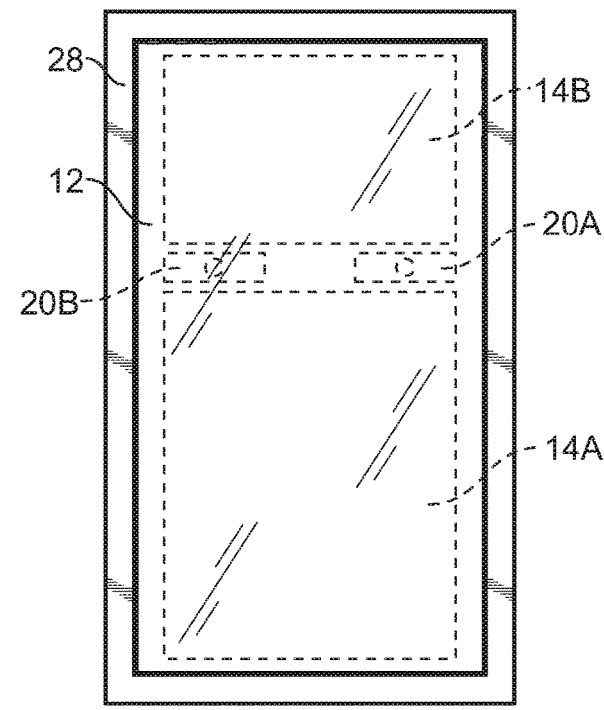
FIG. 11A     FIG. 11B
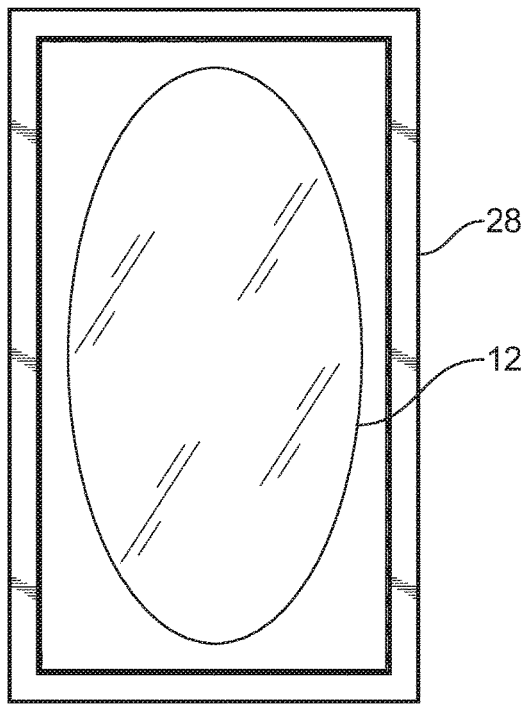
FIG. 12

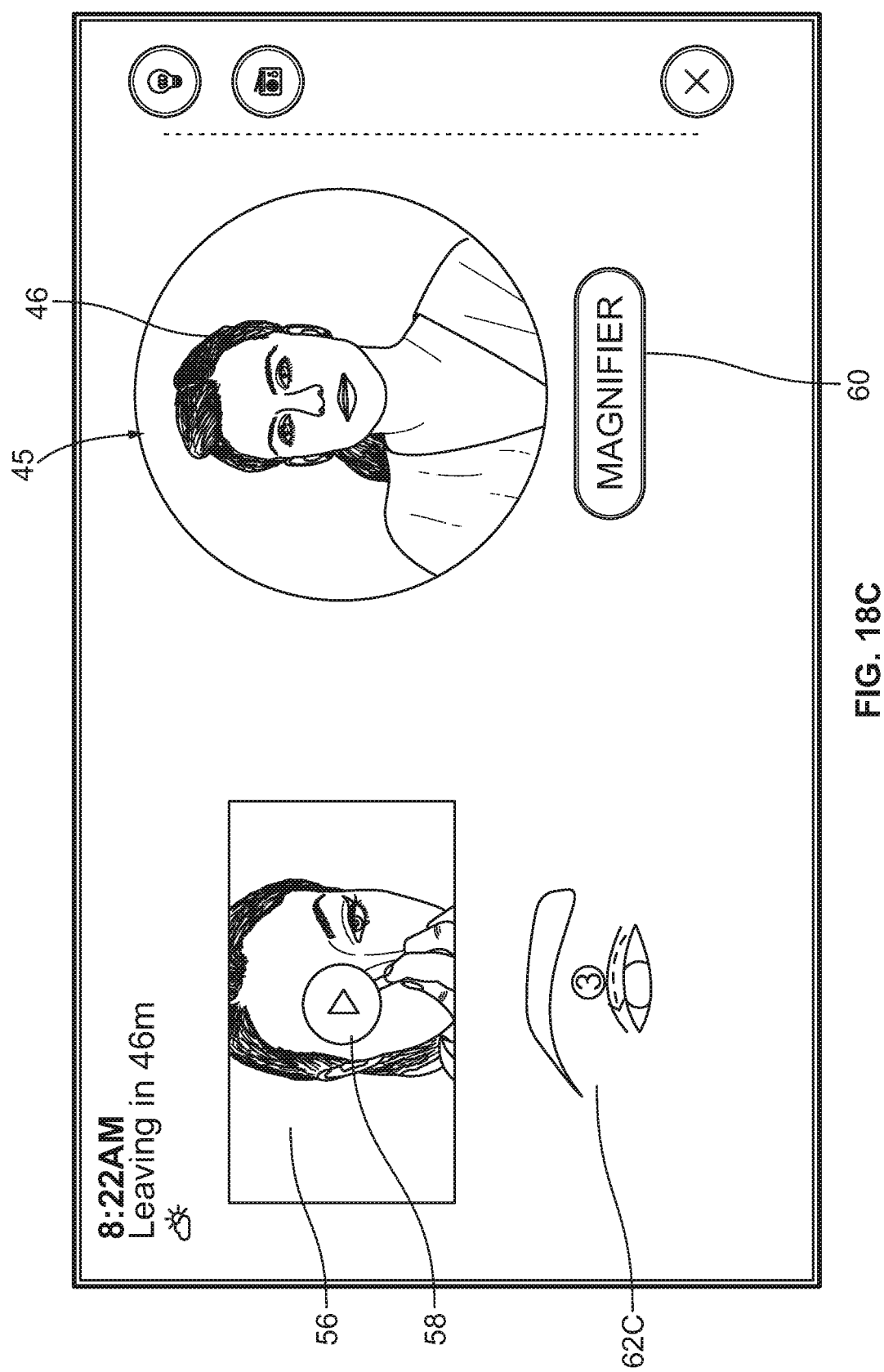

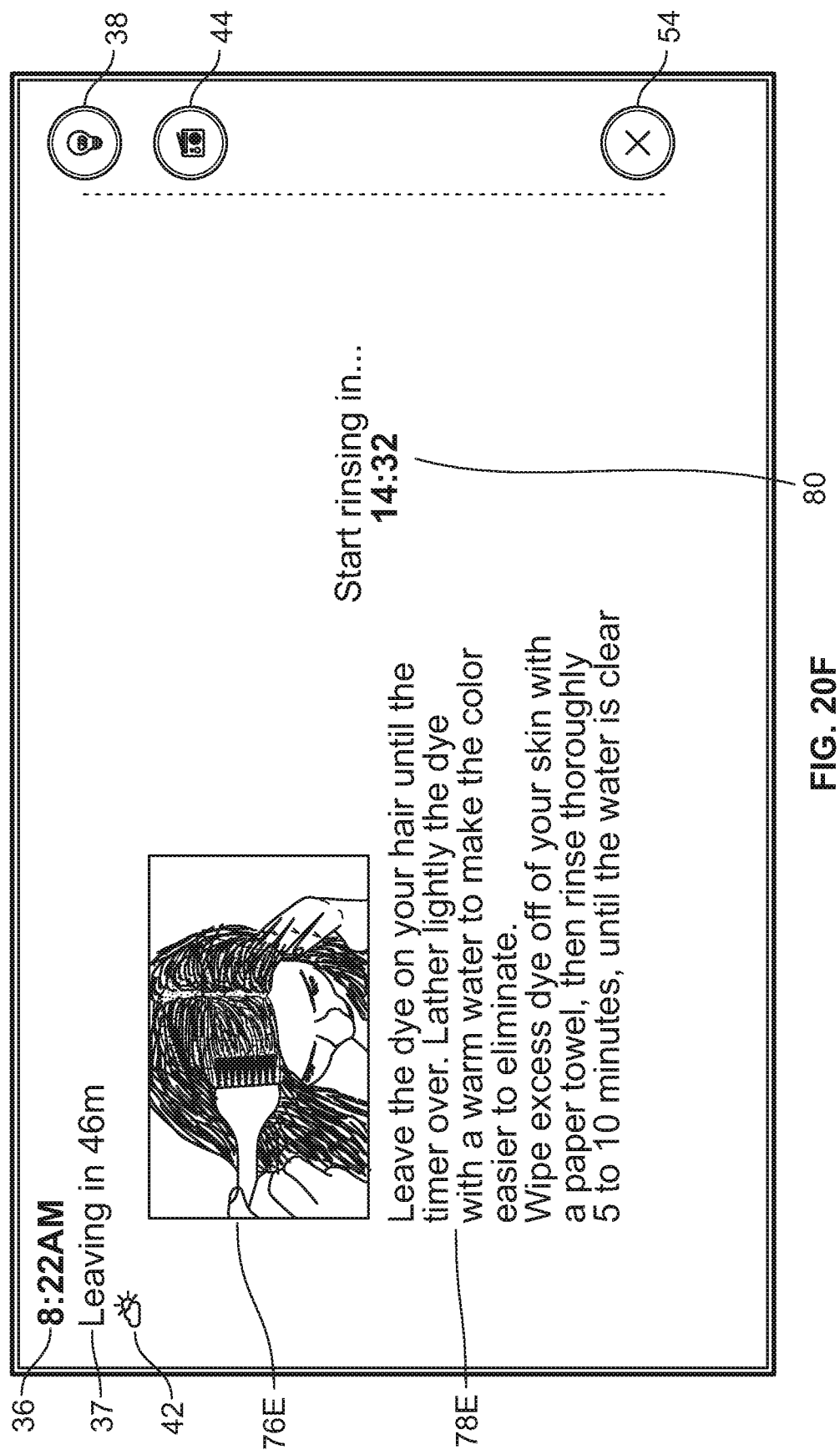

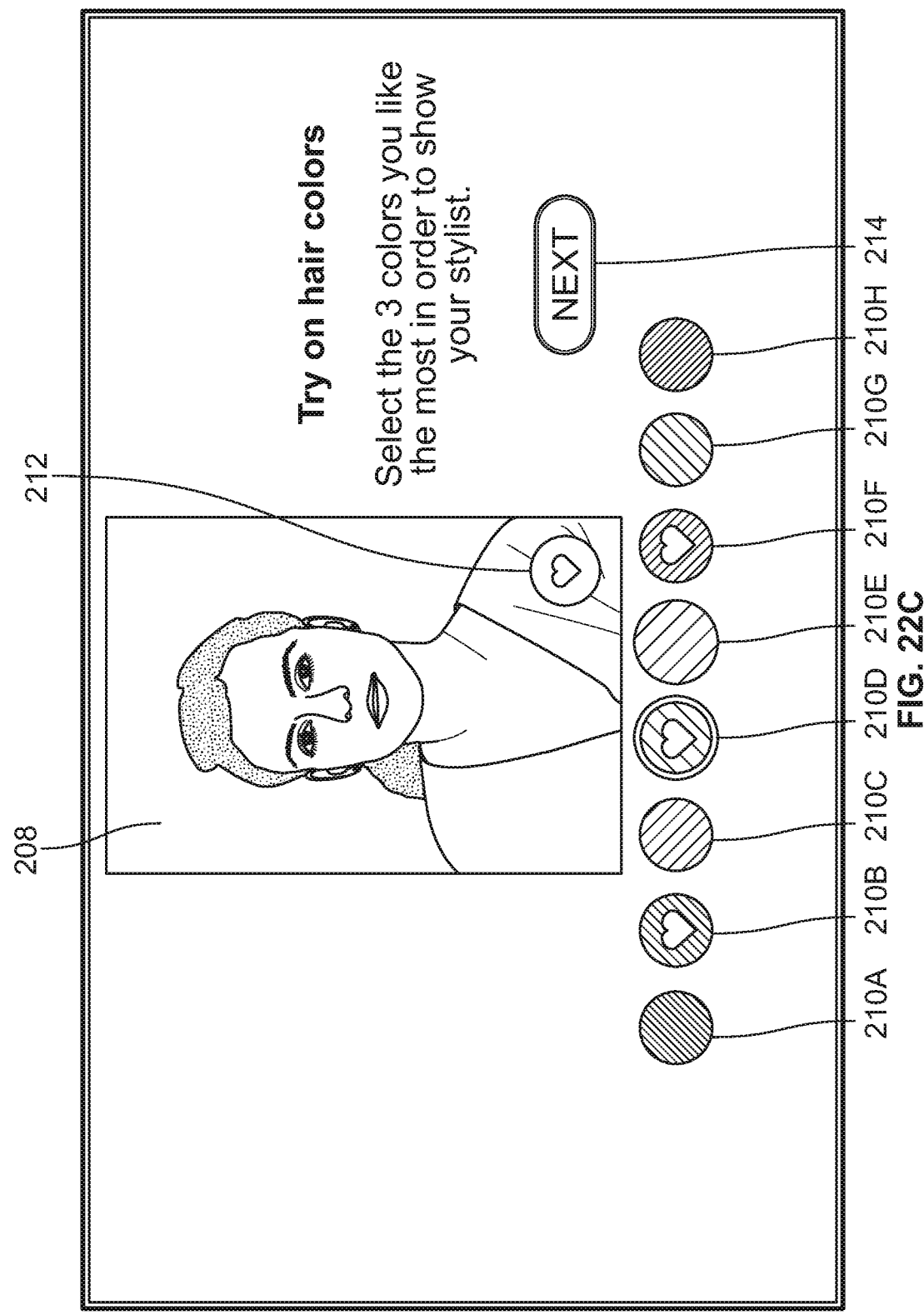

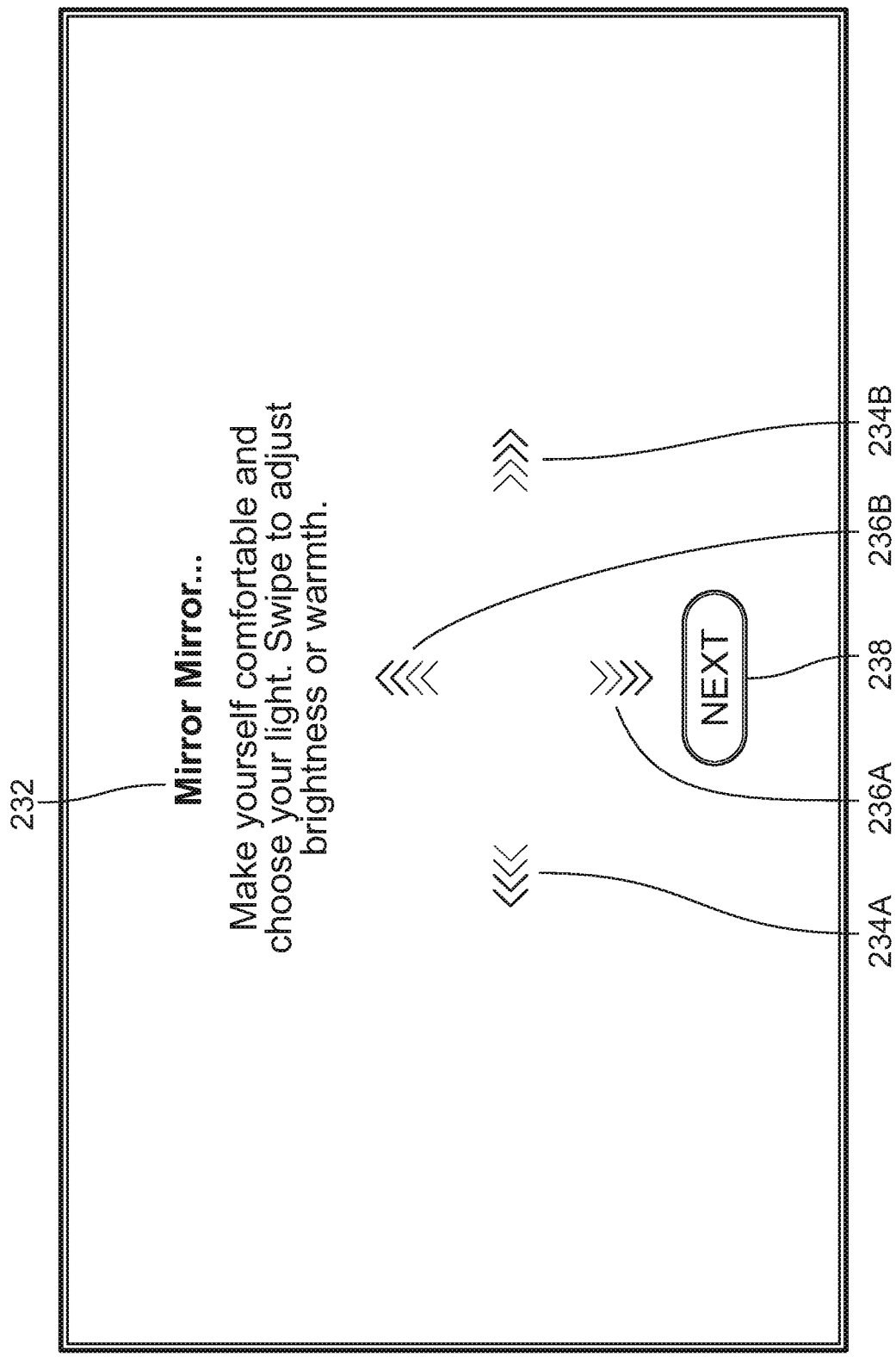

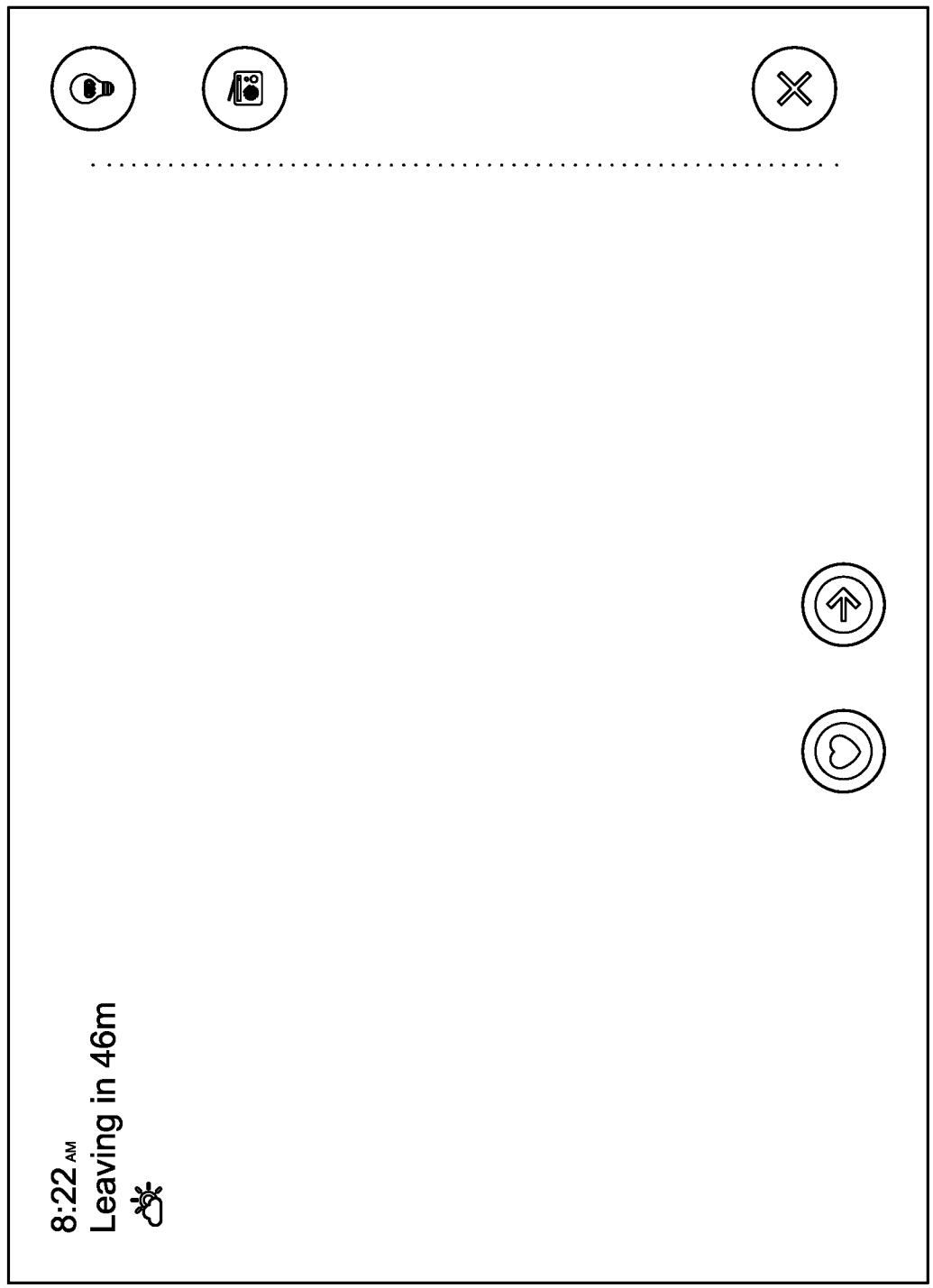

SMART MIRROR SYSTEM AND METHODS OF USE THEREOF

CROSS-REFERENCE TO RELATED APPLICATIONS

This application is a U.S. National Stage Entry of International Application No. PCT/IB2020/054302, filed on May 6, 2020, which claims the benefit of and priority to U.S. Provisional Patent Application Ser. No. 62/843,980, filed on May 6, 2019, entitled "SMART MIRROR AND METHODS OF USE THEREOF," each of which is hereby incorporated by reference herein in its entirety.

TECHNICAL FIELD

The present disclosure relates to an interactive mirror device, more specifically, the present disclosure relates to an interactive mirror with the ability to recognizes faces and objects.

BACKGROUND

In their daily lives, people perform many tasks in front of mirrors, such as brushing their teeth, shaving, applying makeup, and generally getting ready for their day. These activities are often undertaken in poor lighting conditions and can cause people problems in not sufficiently being prepared for their day. For example, a person may apply their makeup incorrectly due to inadequate lighting in their bathroom or bedroom where their mirror is located. In another example, a person may not be able to see their face properly when shaving, causing them to miss spots. In an additional example, the ambient lighting conditions may not be a realistic estimate of the actual lighting conditions a person will experience throughout the day, and thus the person cannot ensure that they have sufficiently prepared themselves when they can only view themselves in in adequate lighting. The present disclosure is directed to solving these problems and addressing other needs.

SUMMARY

According to implementations of the present disclosure, a system comprises a frame, a mirror, an electronic display device, a camera, one or more processors, and one or more memory devices. The mirror is coupled to the frame. The electronic display device is coupled to the frame such that the electronic display device is positioned adjacent to at least a portion of the mirror. The camera is coupled to the frame. The one or more processors are configured to execute instructions stored in the one or more memory devices such that the system is caused to: continuously display, on the electronic display device, a real-time video feed of at least a portion of a user positioned within a field of view of the camera; identify an object within the field of view of the camera; and subsequent to the identification, modify the continuously displayed real-time video feed based on at least the identified object.

According to implementations of the present disclosure, a system comprises a frame, a mirror, an electronic display device, a camera, one or more processors, and one or more memory devices. The mirror is coupled to the frame. The electronic display device is coupled to the frame such that the electronic display device is positioned adjacent to at least a portion of the mirror. The camera is coupled to the frame. The one or more processors are configured to execute instructions stored in the one or more memory devices such that the system is caused to: continuously display, on the electronic display device, a real-time video feed of at least a portion of a user positioned within a field of view of the camera; and subsequent to receiving a prompt, modify the continuously displayed real-time video feed based on at least the prompt.

According to implementations of the present disclosure, a system comprises a frame, a mirror, an electronic display device, a camera, one or more processors, and one or more memory devices. The mirror is coupled to the frame. The electronic display device is coupled to the frame such that the electronic display device is positioned adjacent to at least a portion of the mirror. The camera is coupled to the frame. The one or more processors are configured to execute instructions stored in the one or more memory devices such that the system is caused to: monitor, using the camera, a user positioned within a field of view of the camera; and continuously display, on the electronic display device, a real-time video feed of a first portion of the user, such that a second portion of the user is visible to the user in the mirror; receive a prompt; and subsequent to the receiving of the prompt, modify the displayed first portion of the user in the continuously displayed real-time video feed.

According to implementations of the present disclosure, a system comprises a frame, a mirror, an electronic display device, a camera, one or more processors, and one or more memory devices. The mirror is coupled to the frame. The electronic display device is coupled to the frame such that the electronic display device is positioned adjacent to at least a portion of the mirror. The camera is coupled to the frame. The one or more processors are configured to execute instructions stored in the one or more memory devices such that the system is caused to: monitor, using the camera, a user positioned within the field of view of the camera; continuously display, on the electronic display device, a real-time video feed of at least a portion of the user; determine a mood of the user; and subsequent to the determination of the mood of the user, modify the continuously displayed real-time video feed based on at least the determined mood of the user.

The foregoing and additional aspects and implementations of the present disclosure will be apparent to those of ordinary skill in the art in view of the detailed description of various embodiments and/or implementations, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

FIG. 3A is a front elevation view of the smart mirror system of FIG. 1, according to some implementations of the present disclosure;

FIG. 3B is a side elevation view of the smart mirror system of FIG. 1, according to some implementation of the present disclosure;

FIG. 11A is an implementation of the smart mirror system including a first electronic display, a second electronic display, and a camera located between them, according to some implementations of the present disclosure;

FIG. 11B is an implementation of the smart mirror system including a first electronic display, a second electronic displays, and two cameras located between them, according to some implementations of the present disclosure;

FIG. 12 is an implementation of the smart mirror system with an oval-shaped mirror and a rectangular-shaped sensor frame, according to some implementations of the present disclosure;

FIG. 18C is a view of a third step in a tutorial for applying eyeliner, according to some implementations of the present disclosure;

FIG. 20F is a view of a sixth step in a hair dying tutorial that includes a timer, according to some implementations of the present disclosure;

FIG. 22C is a view of the smart mirror system displaying a first plurality of user-selectable options associated with a first characteristic of the user where each user-selectable option represents a unique proposed modification to the first characteristic, according to some implementations of the present disclosure;

FIG. 23 is a view of the smart mirror system presenting the user options to adjust properties of light being emitted by the smart mirror system, according to some implementations of the present disclosure.

FIG. 24A is a view of the smart mirror system in a standby mode;

Figure 1:
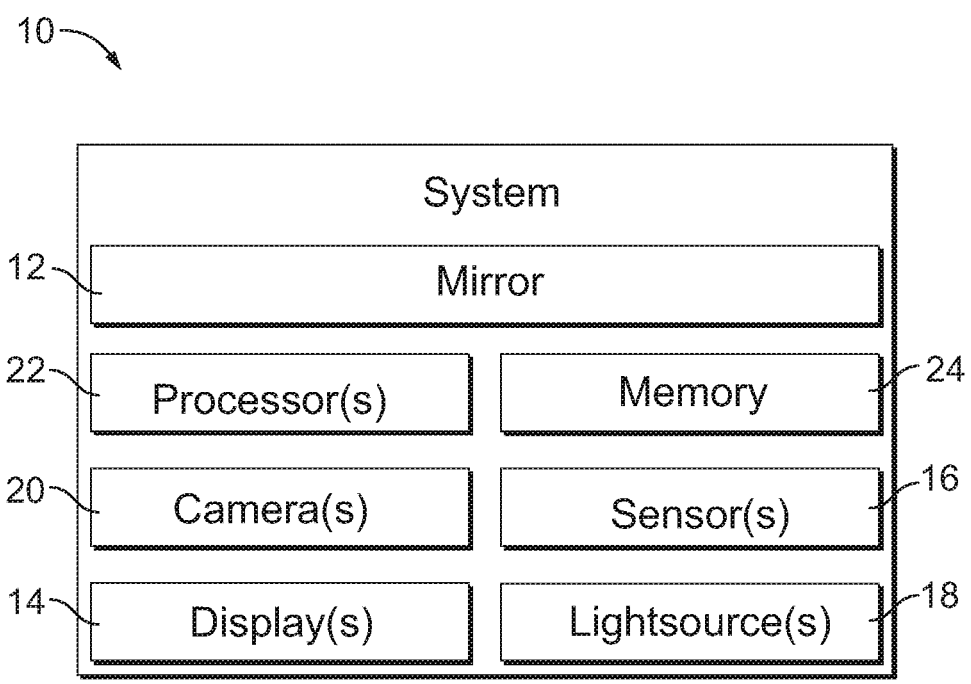
FIG. 1 is a block diagram of a smart mirror system, according to some implementations of the present disclosure.

While the present disclosure is susceptible to various modifications and alternative forms, specific implementations and embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

Referring to FIG. 1, a smart mirror system 10 according to the present disclosure includes a mirror 12, one or more electronic displays 14, one or more sensors 16, one or more light sources 18, and one or more cameras 20. The system 10 generally also includes at least one processor 22 with a memory 24. The memory 24 generally contains processor-executable instructions that when executed by the processor 22, run an operating system and/or an application on the display 14. The mirror 12 is of a type that is generally referred to as a one-way mirror, although it is also sometimes referred to as a two-way mirror. The mirror 12 is configured transmit a first portion of light that is incident on its surfaces to the other side of the mirror 12, and to reflect a second portion of the light that is incident on its surfaces. This may be accomplished by applying a thin layer of a partially reflective coating to a generally transparent substrate material, such that less than all of the incident light is reflected by the partially reflecting coating. The remaining light is transmitted through the mirror 12 to the other side. Similarly, some light that strikes the mirror 12 on a side opposite the side where a user is standing will be transmitted through the mirror 12, allowing the user to see that transmitted light. This partially reflective coating can generally be applied to surface of the substrate material on the display-side of the substrate material, the user-side of the substrate material, or both. Thus, the partially reflective coating can be present on the surface of one or both of the display-side and the user-side of the mirror 12. In some implementations, the partially reflective coating is made of silver. The generally transparent material can be glass, acrylic, or any other suitable material. The mirror 12 can have a rectangular shape, an oval shape, a circle shape, a square shape, a triangle shape, or any other suitable shape. The processor 22 is communicatively coupled with the electronic display 14, the one or more sensors 16, the one or more light sources 18, and the one or more cameras 20.

Figure 2:
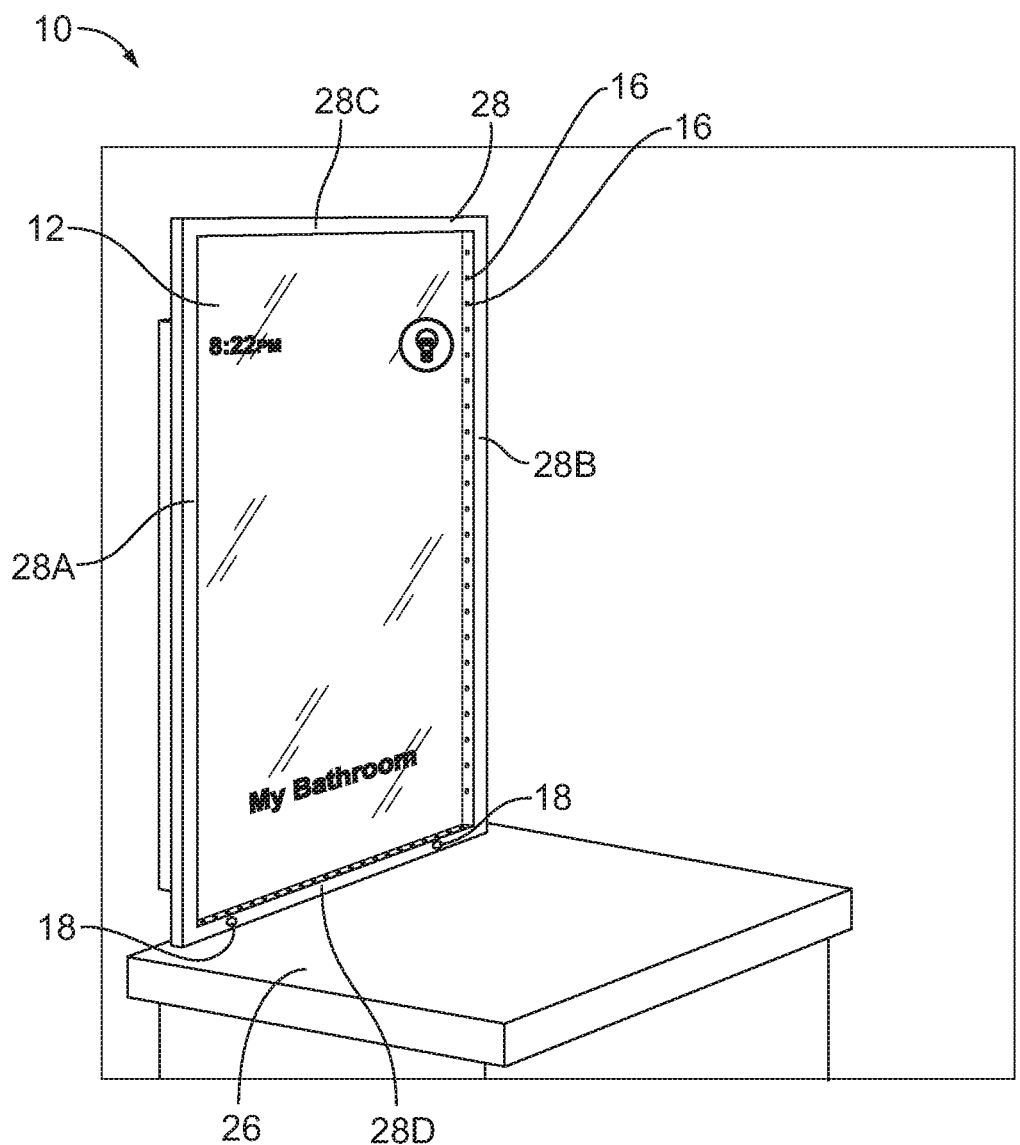
FIG. 2 is a perspective view of the smart mirror system of FIG. 1, according to some implementations of the present disclosure.

Referring now to FIG. 2, the mirror 12 can be mounted on a base 26. The mirror 12 could also be directly mounted in a counter, a wall, or any other structure. The electronic display 14 is mounted on, coupled to, or otherwise disposed on a first side of the mirror 12, while a sensor frame 28 containing the one or more sensors 16 is disposed at an opposing second side of the mirror 12. The side of the mirror 12 where the display 14 is located is generally referred to as the display-side of the mirror 12. The side of the mirror 12 where the sensor frame 28 is located is generally referred to as the user-side of the mirror 12, as this is the side of the mirror 12 where the user will be located during operation.

The electronic display 14 is generally mounted in close proximity to the surface of the display-side of the mirror 12. The electronic display 14 can be any suitable device, such as an LCD screen, an LED screen, a plasma display, an OLED display, a CRT display, an LED dot matrix display, or the like. In some implementations, the LED dot matrix display is a relatively low resolution LED display. For example, the relatively low resolution LED display can include between about 1 and about 5 LEDs per square inch, between about 1 and about 10 LEDs per square inch, between about 1 and about 25 LEDs per square inch, or between about 1 and about 50 LEDs per square inch. Due to the partially reflective nature of the mirror 12, when the display 14 is activated (e.g. turned on and emitting light to display an image), a user standing on the user-side of the mirror 12 is able to view any portion of the display 14 that is emitting light through the mirror 12. When the display 14 is turned off, light that is incident on the user-side of the mirror 12 from the surroundings will be partially reflected and partially transmitted. Because the display 14 is off, there is no light being transmitted through the mirror 12 to the user-side of the mirror 12 from the display-side. Thus, the user standing in front of the mirror 12 will see their reflection due to light that is incident on the user-side of the mirror 12 and is reflected off of the mirror 12 back at the user. When the display 14 is activated, a portion of the light produced by the display 14 that is incident on the mirror 12 from the display-side is transmitted through the mirror 12 to the user-side. The mirror 12 and the display 14 are generally configured such that the intensity of the light that is transmitted through the mirror 12 from the display 14 at any given point is greater than the intensity of any light that is reflected off of that point of the mirror 12 from the user-side. Thus, a user viewing the mirror 12 will be able to view the portions of the display 14 that are emitting light, but will not see their reflection in the portions of those mirror 12 through which the display light is being transmitted.

The electronic display 14 can also be used to illuminate the user or other objects that are located on the user-side of the mirror 12. The processor 22 can activate a segment of the display 14 that generally aligns with the location of the object relative to the mirror 12. In an implementation, this segment of the display 14 is activated responsive to one of the one or more sensors 16 detecting the object and its location on the user-side of the mirror 12. The segment of the display 14 can have a ring-shaped configuration which includes an activated segment of the display 14 surrounding a non-activated segment of the display 14. The non-activated segment of the display 14 could be configured such that no light is emitted, or could be configured such that some light is emitted by the display 14 in the non-activated segment, but it is too weak or too low in intensity to be seen by the user through the mirror 12. In an implementation, the activated segment of the display 14 generally aligns with an outer periphery of the object, while the non-activated segment of the display 14 generally aligns with the object itself. Thus, when the object is a user's face, the user will be able to view the activated segment of the display 14 as a ring of light surrounding their face. The non-activated segment of the display 14 will align with the user's face, such that the user will be able to see the reflection of their face within the ring of light transmitted through the mirror 12. In another implementation, the non-activated segment of the display 14 aligns with the object, and the entire remainder of the display 14 is the activated segment. In this implementation, the entire display 14 is activated except for the segment of the display 14 that aligns with the object.

Generally, the system 10 includes one or more sensors 16 disposed in the sensor frame 28. The sensor frame 28 is mounted on, couple to, or otherwise disposed at the second side (user-side) of the mirror 12. The sensors 16 are generally located within a range of less than about five inches from the user-side surface of the mirror 12. In other implementations, the sensors 16 could be disposed between further away from the surface of the mirror 12, such as about between about 5 inches and about 10 inches. The sensors 16 are configured to detect the presence of a hand, finger, face, or other body part of the user when the user is within a threshold distance from the mirror 12. This threshold distance is the distance that the sensors 16 are located away from the user-side surface of the mirror 12. The sensors 16 are communicatively coupled to the processor 22 and/or memory 24. When the sensors 16 detect the presence of the user aligned with a certain point of the mirror 12 (and thus the display 14), the processor 22 is configured to cause the display 14 to react as if the user had touched or clicked the display 14 at a location on the display 14 corresponding to the point of the mirror 12. Thus, the sensors 16 are able to transform the mirror 12/display 14 combination into a touch-sensitive display, where the user can interact with and manipulate applications executing on the display 14 by touching the mirror 12, or even bringing their fingers, hands, face, or other body part in close proximity to the user-side surface of the mirror 12. In some implementations, the sensors 16 can include a microphone that records the user's voice. The data from the microphone can be sent to the processor 22 to allow the user to interact with the system 10 using their voice.

The one or more sensors 16 are generally infrared sensors, although sensors utilizing electromagnetic radiation in other portions of the electromagnetic spectrum could also be utilized. The sensor frame 28 can have a rectangular shape, an oval shape, a circular shape, a square shape, a triangle shape, or any other suitable shape. In an implementation, the shape of the sensor frame 28 is selected to match the shape of the mirror 12. For example, both the mirror 12 and the sensor frame 28 can have rectangular shapes. In another implementation, the sensor frame 28 and the mirror 12 have different shapes. In an implementation, the sensor frame 28 is approximately the same size as the mirror 12 and generally is aligned with a periphery of the mirror 12. In another implementation, the sensor frame 28 is smaller than the mirror 12, and is generally aligned with an area of the mirror 12 located interior to the periphery of the mirror 12. In a further implementation, the sensor frame 28 could be larger than the mirror 12.

In an implementation, the mirror 12 generally has a first axis and a second axis. The one or more sensors 16 are configured to detect a first axial position of an object interacting with the sensors 16 relative to the first axis of the mirror 12, and a second axial position of the object interacting with the sensors 16 relative to the second axis of the mirror 12. In an implementation, the first axis is a vertical axis and the second axis is a horizontal axis. Thus, in viewing the sensor frame 28 from the perspective of the user, the sensor frame 28 may have a first vertical portion 28A and an opposing second vertical portion 28B, and a first horizontal portion 28C and an opposing second horizontal portion 28D. The first vertical portion 28A has one or more infrared transmitters disposed therein, and the second vertical portion 28B has one or more corresponding infrared receivers disposed therein. Each individual transmitter emits a beam of infrared light that is received by its corresponding individual receiver. When the user places a finger in close proximity to the mirror 12, the user's finger can interrupt this beam of infrared light such that the receiver does not detect the beam of infrared light. This tells the processor 22 that the user has placed a finger somewhere in between that transmitter/receiver pair. In an implementation, a plurality of transmitters is disposed intermittently along the length of the first vertical portion 28A, while a corresponding plurality of receivers is disposed intermittently along the length of the second vertical portion 28B. Depending on which transmitter/receiver pairs detect the presence of the user's finger (or other body part), the processor 22 can determine the vertical position of the user's finger relative to the display 14. The first axis and second axis of the mirror 12 could be for a rectangular-shaped mirror, a square-shaped mirror, an oval-shaped mirror, a circle-shaped mirror, a triangular-shaped mirror, or any other shape of mirror.

The sensor frame 28 similarly has one or more infrared transmitters disposed intermittently along the length of the first horizontal portion 28C, and a corresponding number of infrared receivers disposed intermittently along the length of the second horizontal portion 28D. These transmitter/receiver pairs act in a similar fashion as to the ones disposed along the vertical portions 28A, 28B of the sensor frame 28, and are used to detect the presence of the user's finger and the horizontal location of the user's finger relative to the display 14. The one or more sensors 16 thus form a two-dimensional grid parallel with the user-side surface of the mirror 12 with which the user can interact, and where the system 10 can detect such interaction.

In other implementations, the sensor frame 28 may include one or more proximity sensors, which can be, for example, time of flight sensors. Time of flight sensors do not rely on separate transmitters and receivers, but instead measure how long it takes an emitted signal to reflect off on an object back to its source. A plurality of proximity sensors on one edge of the sensor frame 28 can thus be used to determine both the vertical and horizontal positions of an object, such as the user's hand, finger, face, etc. For example, a column of proximity sensors on either the left or right edge can determine the vertical position of the object by determining which proximity sensor was activated, and can determine the horizontal position by using that proximity sensor to measure how far away the object is from the proximity sensor. Similarly, a row of proximity sensors on either the top or bottom edge can determine the horizontal position of the object by determining which proximity sensor was activated, and can determine the vertical position by using that proximity sensor to measure how far away the object is from the proximity sensor. When one or more of the proximity sensors detect the presence of the user's finger or other body part (e.g., hand, face, arm, etc.), the user's finger or other body part is said to be in the "line of sight" of the sensor.

The sensors 16 in the sensor frame 28 (whether IR transmitter/receiver pairs and/or proximity sensors) can be used by the system 10 to determine different types of interactions between the user and the system 10. For example, the system 10 can determine whether the using is swiping horizontally (left/right), vertically (up/down), diagonally (a combination of left/right and up/down), or any combination thereof. The system 10 can also detect when the user simply taps somewhere instead of swiping. In some implementations, the sensor frame 28 is configured to detect interactions between the user and the system 10 when the user is between about 3 centimeters and about 15 centimeters from the surface of the mirror 12. A variety of different applications and programs can be run by the processor 22, including touch-based applications designed for use with touch screens, such as mobile phone applications. Generally, any instructions or code in the mobile phone application that rely on or detect physical contact between a user's finger (or other body part) and the touch-sensitive display of the mobile phone (or other device) can be translated into instructions or code that rely on or detect the user's gestures in front of the mirror 12.

Any applications that are run by the processor 22 and are displayed by the display 14 can be manipulated by the user using the sensors 16 in the sensor frame 28. Generally, the sensors 16 in the sensor frame 28 detect actions by the user, which causes the processor 22 to take some action. For example, a user-selectable icon may be displayed on the display 14. The user can select the user-selectable icon, which triggers the processor 22 to take some corresponding action, such as displaying a new image or screen on the display 14. The triggering of the processor 22 due to the user's interaction with the system 10 can be affected using at least two different implementations.

In the first implementation, the processor 22 is triggered to take some action once the user's finger (or other body part) is removed from the proximity of the display 14 and/or the sensors 16, e.g., is removed from the line of sight of the sensors 16. For example, when the user wishes to select a user-selectable icon displayed on the display 14, they can move their finger into close proximity with the displayed user-selectable icon without touching the mirror 12, such that the user's finger is in the line of sight of the sensors 16. However, coming into the line of sight of the sensors 16 does not trigger the processor 22 to take any action, e.g., the user has not yet selected the icon by placing their finger near the icon on the display 14. Once the user removes their finger from the proximity of the icon on the display 14 and the line of sight of the sensor 16, the processor 22 is triggered to take some action. Thus, the user only selects the user-selectable icon once the user removes their finger from the proximity of the icon.

In the second implementation, the processor 22 is triggered to take some action when the user's finger (or other body part) is moved into proximity of the display 14 and/or the sensors 16, e.g., is moved into the line of sight of the sensors 16. In this implementation, as soon as the user moves their finger into close proximity of a user-selectable icon on the display 14 (e.g., moves their finger into the line of sight of the sensors 16), the processor 22 is triggered to take some action corresponding to the section of the icon. Thus, the user does not have to move their finger near the icon/sensors 16 and then remove their finger in order to select the icon, but instead only needs to move their finger near the icon/sensors 16. In some such implementations, selection of an icon requires that the user hold its finger near the icon for a predetermined amount of time (e.g., 1 second, 1.5 seconds, 2 seconds, 3 seconds, etc.).

Other methods of controlling the system 10 can also be used. For example, the system 10 can include a microphone (or communicate with a device that includes a microphone) to allow for voice control of the system 10. The system 10 can also include one or more physical buttons or controllers the user can physically actuate in order to interact with and control the system 10. In another example, the system 10 could communicate with a separate device that the user interacts with (such as a mobile telephone, tablet computer, laptop computer, desktop computer, etc.) to control the system 10. In some such implementations, the user's smart phone and/or tablet can be used as an input device to control the system 10 by mirroring the display 14 of the system 10 on a display of the smart phone and/or tablet and allowing the user to control the system 10 by touching and/or tapping the smart phone and/or tablet directly. The system 10 can also include one or more speakers to play music, podcasts, radio, or other audio. The one or more speakers can also provide the user feedback or confirmation of certain actions or decisions.

The system 10 further includes one or more light sources 18. In an implementation, the light sources 18 are light emitting diodes (LEDs) having variable color and intensity values that can be controlled by the processor 22. In other implementations, the light sources 18 can be incandescent light bulbs, halogen light bulbs, fluorescent light bulbs, black lights, discharge lamps, or any other suitable light source. The light sources 18 can be coupled to or disposed within the base 26 of the system 10, or they can be coupled to or disposed within the sensor frame 28. For example, while FIG. 2 only shows two light sources 18 disposed in a bottom portion of the system 10, a plurality of light sources 18 could be disposed about the frame such that the light sources 18 generally surround the mirror 12. In some implementations, the light sources 18 may be disposed on either the user-side of the mirror 12 or the display-side of the mirror 12. When disposed on the user-side of the mirror 12, the light emitted by the light sources 18 is configured to travel through the mirror 12 towards the user. The light sources 18 can also be rotationally or translationally coupled to the sensor frame 28 or other parts of the system 10 such that the light sources 18 can be physically adjusted by the user and emit light in different directions. The light sources 18 could also be disposed in individual housings that are separate from both the mirror 12 and the display 14. The light sources 18 are configured to produce light that is generally directed outward away from the mirror 12 and toward the user. The light produced by the one or more light sources 18 can thus be used to illuminate the user (or any other object disposed on the user-side of the mirror 12). Because they are variable in color and intensity, the light sources 18 can thus be used to adjust the ambient light conditions surrounding the user.

The system 10 also includes one or more cameras 20 mounted on or coupled to the mirror 12. The cameras 20 could be optical cameras operating using visible light, infrared (IR) cameras, three-dimensional (depth) cameras, or any other suitable type of camera. The one or more cameras 20 are disposed on the display-side of the mirror 12.

In an implementation, the one or more cameras 20 are located above the electronic display 14, but are still behind the mirror 12 from the perspective of the user. The lenses of the one or more cameras 20 faces toward the mirror 12 and are thus configured to monitor the user-side of the mirror 12. In an implementation, the one or more cameras 20 monitor the user-side of the mirror 12 through the partially reflective coating on the mirror 12. In another implementation, the one or more cameras 20 are disposed at locations of the mirror 12 where no partially reflective coating exists, and thus the one or more cameras 20 monitor the user-side of the mirror 12 through the remaining transparent material of the mirror 12. The one or more cameras 20 may be stationary, or they may be configured to tilt side-to-side and up and down. The cameras 20 can also be moveably mounted on a track and be configured to move side-to-side and up and down. The one or more cameras 20 are configured to capture still images or video images of the user-side of the mirror 12. The display 14 can display real-time or stored still images or video images captured by the one or more cameras 20.

The one or more cameras 20 are communicatively coupled to the processor 22. The processor 22 can run an object recognition (OR) algorithm that utilizes principles of computer vision to detect and identify a variety of objects based on the still or video images captured by the one or more cameras 20. The processor 22 can be configured to modify the execution of an application being executing by the processor 22, such as automatically launching a new application or taking a certain action in an existing application, based on the object that is detected and identified by the cameras 20 and the processor 22. For example, following the detection of an object in the user's hand and the identification of that object as a toothbrush, the processor 22 can be configured to automatically launch a tooth-brushing application to run on the display 14, or launch a tooth brushing feature in the current application. The processor 22 can be configured to automatically launch an application to assist the user in shaving upon detecting and identifying a razor, or an application to assist the user in applying makeup upon detecting and identifying any sort of makeup implement, such as lipstick, eye shadow, etc. The one or more cameras 20 can also recognize faces of users and differentiate between multiple users. For example, the camera 20 may recognize the person standing in front of the mirror 12 and execute an application that is specific to that user. For example, the application could display stored data for that user, or show real-time data that is relevant to the user.

In an implementation, the processor 22 can be configured to execute a first application while the display 14 displays a first type of information related to the first application. Responsive to the identification of the object by the system 10, the processor is configured to cause the display 14 to display a second type of information related to the first application, the second type of information being (i) different from the first type of information and (ii) based on the identified object. In another implementation, responsive to the identification of the object, the processor is configured to execute a second application different from the first application, the second application being based on the identified object.

In some implementations, the components of the system 10 are generally waterproof, which allows the system 10 to more safely operate areas where water or moisture may be present, such as bathrooms. For example, a waterproof sealing mechanism may be used between the mirror 12 and the sensor frame 28 to ensure that moisture cannot get behind the mirror 12 to the electronic components. This waterproof sealing mechanism can include a waterproof adhesive, such as UV glue, a rubber seal surrounding the periphery of the mirror 12 on both the user-side of the mirror 12 and the display-side of the mirror, or any other suitable waterproof sealing mechanism. Further, a waterproof or water-repellant covering can be placed over or near any components of the system 10 that need to be protected, such as speakers or microphones. In some implementations, this covering is a water-repellant fabric.

The components of the system 10 can also be designed to increase heat dissipation. Increased heat dissipation can be accomplished in a number of ways, including by using a reduced power supply or a specific power supply form factor. The system 10 can also include various mechanisms for distributing heat from behind the mirror 12, including heat sinks and fans. In some implementations, the electronic components (such as display 14, sensors 16, light sources 18, camera 20, processors 22, and memory 24) are all modular so that the system 10 can easily be customized.

FIG. 3A illustrates a front elevation view of the system 10, while FIG. 3B illustrates a side elevation view of the system 10. As can be seen in FIG. 3A, the sensor frame 28 surrounds the mirror 12, while portions of the display 14 that are activated are visible through the mirror 12. FIG. 3A also shows the two-dimensional grid that can be formed by the sensors 16 in the sensor frame 28 that is used to detect the user's finger, head, or other body part. This two-dimensional grid is generally not visible to the user during operation. FIG. 3B shows the arrangement of the sensor frame 28 with the sensors 16, the mirror 12, the display 14, and the camera 20. In an implementation, the processor 22 and the memory 24 can be mounted behind the display 14. In other implementations, the processor 22 and the memory 24 may be located at other portions within the system 10, or can be located external to the system 10 entirely. The system 10 generally also includes housing components 43A, 43B that form a housing that contains and protects the display 14, the camera 20, and the processor 22.

Figure 4A:
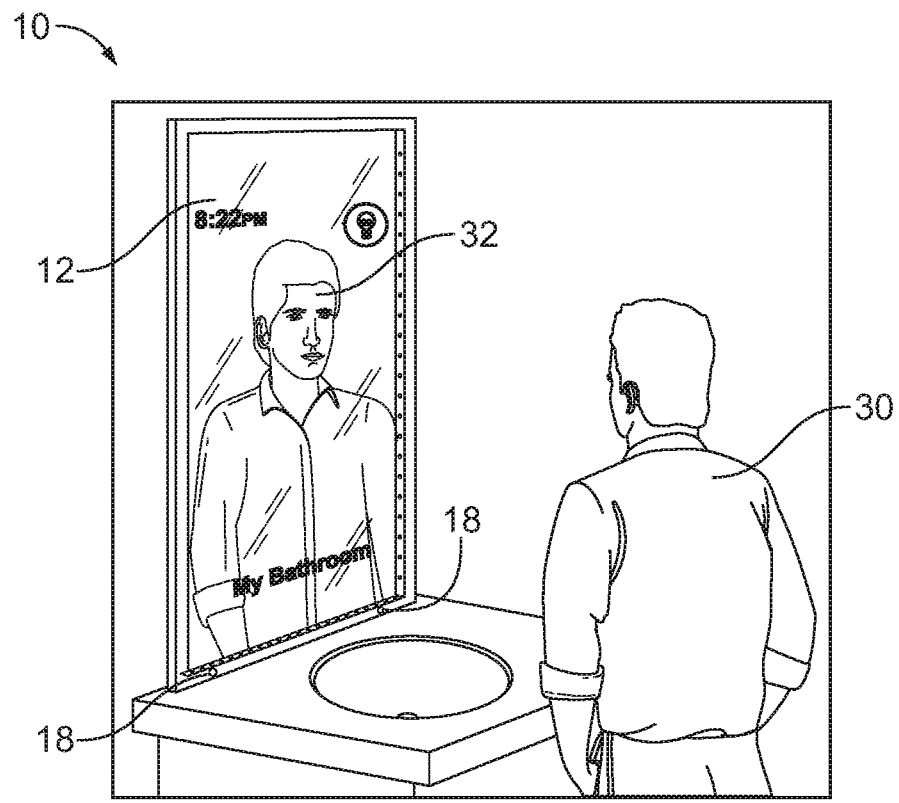
FIG. 4A is a perspective view of the smart mirror system of FIG. 1 showing a reflection of a user, according to some implementation of the present disclosure.
Figure 4B:
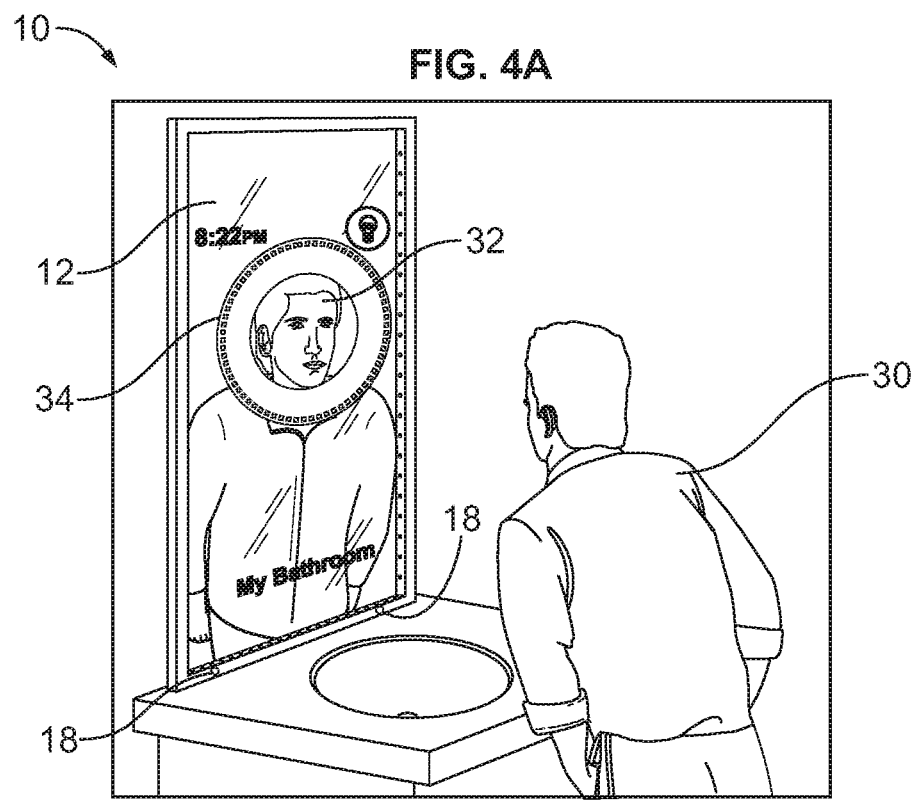
FIG. 4B is a perspective view of the smart mirror system of FIG. 1 illuminating the user using a display mounted behind a mirror, according to some implementation of the present disclosure.

FIG. 4A and FIG. 4B illustrate the system 10's ability to allow a user 30 to view their reflection 32 in the mirror 12, and to view activated segments of the display 14 behind the mirror 12. FIG. 4A and FIG. 4B also illustrate the system 10's ability to illuminate an object (such as the user's face) with the display 14. In FIG. 4A, a large segment of the display 14 is not activated, e.g. the display is off, is showing a black screen, or is otherwise emitting light that cannot be seen by the user through the mirror 12. Because the user cannot see any light emitted from the display 14 in the large segment, the only light that reaches the user 30's eyes is light that is incident on the user-side of the mirror 12 and is reflected back to the user 30. Thus, the user 30 sees a reflection 32 of themselves and their surroundings due to the light reflected off of the user-side surface of the mirror 12. Only in the small segments at the top and bottom of the display 14 where the display 14 is activated is the user 30 not able to see the reflection 32, and instead sees the display 14.

In FIG. 4B, a segment in the center of the display 14 on the display-side of the mirror 12 has been activated and is directing light toward the mirror 12. In the implementation shown in FIG. 4B, the activated segment of the display 14 has a ring-shaped configuration, and thus the display 14 shows a ring of light 34. The light emitted from the display 14 is transmitted through the mirror 12 to the user-side of the mirror 12, and thus the emitted right of light is visible to the user 30. As can be seen, the light that is transmitted through the mirror 12 at a given point on the mirror 12 is stronger than the light that is reflected off of the user-side surface of the mirror 12 at that point. At those points of the mirror 12, the user 30 only sees the display 14 through the mirror 12, rather than their reflection 32 in the mirror 12. In FIG. 4B, the ring of light is transmitted through the mirror 12 such that it generally surrounds the user 30's face. As is shown in the figure, the user 30's reflection 32 in the mirror 12 is interrupted by the ring of light 34 transmitted through the mirror 12 from the display 14. The ring of light 34 can be used to illuminate a face of the user 30. Thus, the activated segment of the display is generally aligned with the periphery of the user's face, while an enclosed non-activated segment of the display is generally aligned with the user's face itself, allowing the user to see the reflection of his face.

Figure 5:
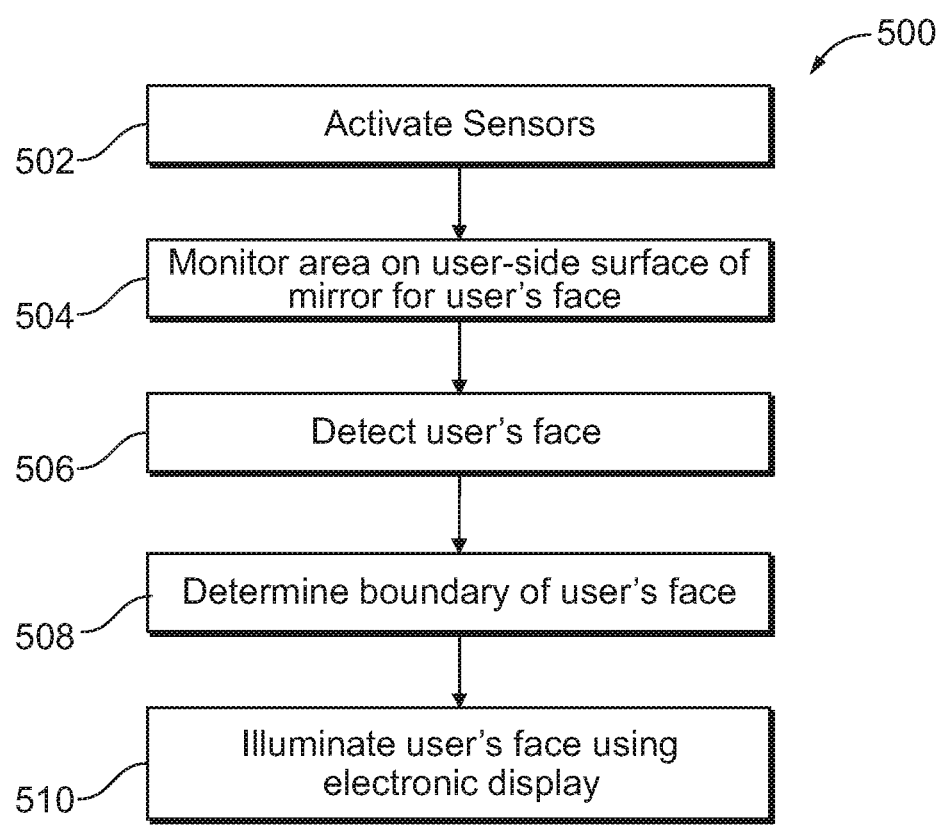
FIG. 5 is a flowchart illustrating a method of illuminating a user's face using the smart mirror system of FIG. 1, according to some implementations of the present disclosure.

A method 500 of illuminating the face of a user is illustrated in FIG. 5A. At step 502, the one or more sensors 16 of the system 10 are activated. At step 504, the one or more sensors 16 monitor the area in front of the user-side surface of the mirror 12. The one or more sensors 16 are configured to detect any portion of the user, such as the user's fingers or face, that the user places within a threshold distance of the mirror 12. In an implementation, this threshold distance is less than about five inches, between about 0.1 and four inches, between about 1 and about 3 inches, or less than about 2 inches. The threshold distance could also be greater than about 5 inches. At step 506, the one or more sensors 16 detect a plurality of different points of interaction between the user and the two-dimension grid defined by the sensors 16. These interactions are indicative of the user placing his or her face within the threshold distance from the user-side surface of the mirror 12. The one or more sensors 16 recognize that the user has placed their face up to the mirror 12 rather than a single finger by detecting multiple interactions between the user and the two-dimensional grid defined by the one or more sensors 16. In an implementation, if the one or more sensors 16 detect five points of contact, and that the five points of contact are within less than about 60 square inches, the system 10 interprets this as the user placing their face within the threshold distance from the user-side surface of the mirror 12.

At step 508, the system 10 determines the outline of the user's face from the detected points of interaction with the sensors 16. The system 10 determines the outer boundary that is defined by all of the points of interaction between the user's face and the sensors 16 and uses this boundary as an estimate of the outline of the user's face. At step 510, the electronic display 14 is activated to outline the user's face with a ring of light. Generally, the display 14 at this step will show a black screen except for the ring of light, which generally corresponds to the outer boundary of the user's face as detected by the one or more sensors 16. The display 14 could also show a variety of other minor components, such as the time or other icons. Thus, the user looking at the surface of the mirror 12 will see their reflection, and will also see a ring of light that is being transmitted through the mirror 12 from the display 14. This ring of light generally surrounds the reflection of the user's face in the mirror 12 and illuminates the user's actual face. The illumination can assist the user in any activity they are about to partake in, such as shaving, brushing their teeth, applying makeup, etc. The system 10 can also track the user's face in real-time and thus constantly update the position of the displayed ring of light. This allows the user to move their face around while still having their face illuminated at all times by the display 14.

Figure 6A:
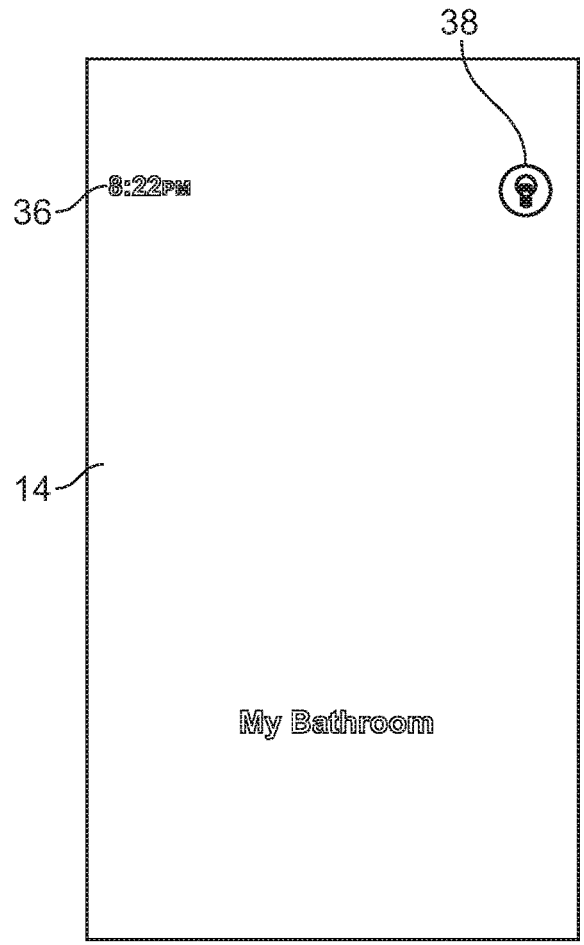
FIG. 6A is an implementation of an electronic display of the smart mirror system of FIG. 1 when not illuminating the face of a user, according to some implementations of the present disclosure.
Figure 6B:
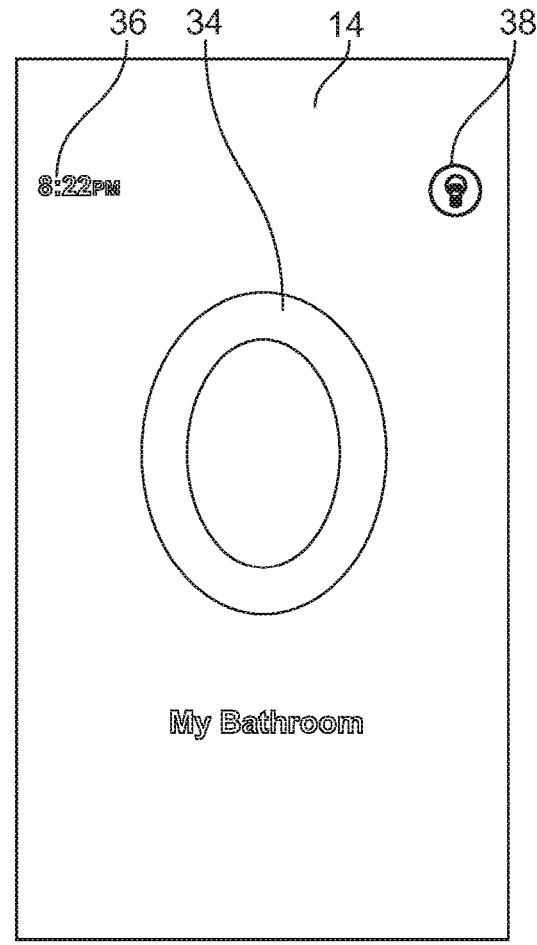
FIG. 6B is an implementation of an electronic display of the smart mirror system of FIG. 1 while illuminating the face of a user, according to some implementations of the present disclosure.

An implementation of what is displayed on the electronic display 14 during method 500 is illustrated in FIG. 6A and FIG. 6B. In FIG. 6A, the display 14 primarily shows a black screen. The display 14 can also show other features, such as the time 36, or a lighting icon 38. The lighting icon 38 can show the current state of the light that is being emitted by the light sources 18, the current conditions of the ambient light, or both. The lighting icon 38 may also be interactive to allow the user to adjust the light being emitted by the light sources 18. In FIG. 6B, the system 10 has detected and illuminated the user's face by displaying a ring of light 34 on the display 14. As can be seen, the display 14 in this state includes an activated segment in a ring-shaped configuration substantially surrounding a non-activated segment, such that the non-activated segment is located in the interior of the ring of light 34. This allows the user to see his or her own reflection in the mirror 12 without any interference from the display 14. The ring of light 34 is displayed on the display 14 at a location that generally corresponds with the periphery of the user's face. This ring of light 34 is transmitted through the display 14 and is generally incident upon the user's face, thus illuminating the user's face.

Figure 7:
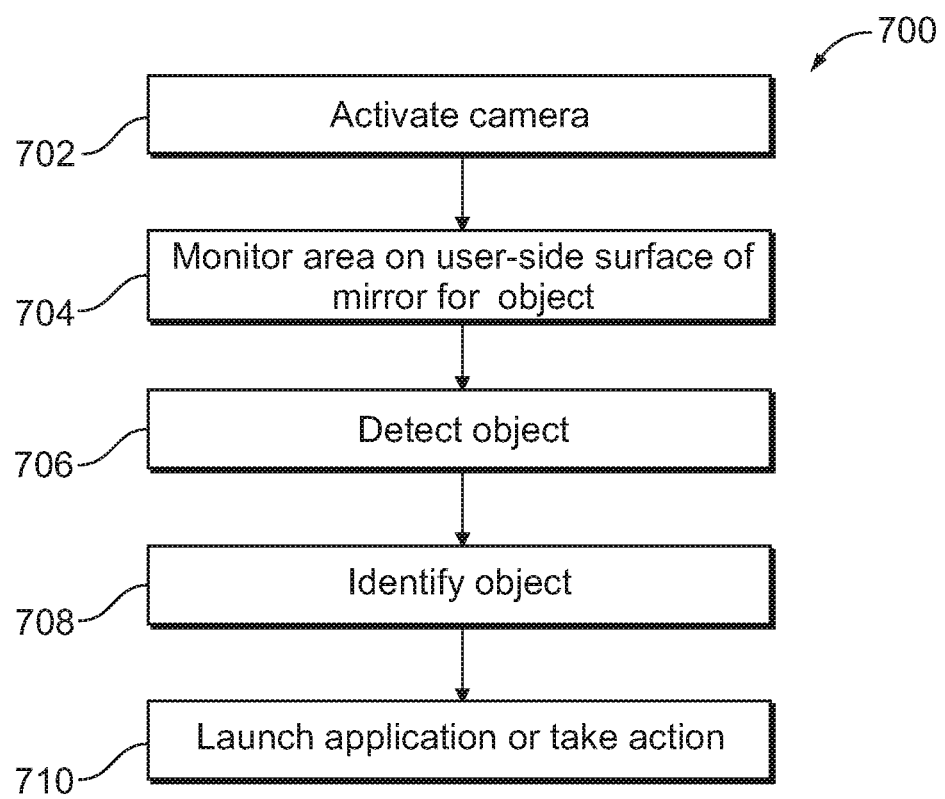
FIG. 7 is a flowchart illustrating a method of modifying an application being executed by the smart mirror system of FIG. 1 based on an identified object, according to some implementations of the present disclosure.

A method 700 of detecting and identifying an object and modifying an application being executed by the processor 22 is illustrated in FIG. 7. At step 702, the one or more cameras 20 of the system 10 are activated. At this step, the processor 22 of the system 10 will be executing an application and displaying information related to that application on the display 14. The application could be a specific program installed in the memory 24 of the processor 22, or could even simply be a basic operating system. At step 704, the one or more cameras 20 monitor the area on the user-side of the mirror 12 for the user and any objects they may be holding. In an implementation, the images recorded by the camera 20 could be displayed in real-time on the display 14. At step 706, the processor 22 receives images from the one or more cameras 20 and detects that the user is holding an object. At step 708, the processor 22 identifies the object the user is holding from one of a predetermined number of objects that the processor 22 can recognize. The processor 22 of the system 10 can be programmed with computer vision algorithms that are configured to detect and identify objects that the user is holding. For example, the system 10 may be configured to detect when the user is holding a toothbrush, a razor, a comb, a makeup implement such as lipstick or eye shadow, a curling iron, a hair straightener, a blow dryer, or any other object that the user may commonly be holding while in front of the mirror 12. In some implementations, the user can train the system 10 to identify different objects. For example, the system 10 may request that the user hold up a specific object, for example a toothbrush. The system 10 can then be trained to identify the toothbrush and any characteristics specific to the toothbrush. In this manner, the system 10 can be trained to improve its recognition of a variety of different objects.

At step 710, responsive to and based on the identification of the object the user is holding, the processor 22 modifies the execution of the application. In an implementation, the modification of the execution of the application includes displaying different information on the display 14 from what was display prior to the identification of the object. In another implementation, the modification of the execution of the application includes executing a new application that is different from the application that was being executed prior to the identification of the object.

For example, if the system 10 identifies the object that the user is holding as a toothbrush, the system 10 can launch a tooth brushing application design to assist people in brushing their teeth. The system 10 can also start a tooth brushing feature in the currently running application. If the system 10 identifies a razor, the system 10 may launch a shaving application or shaving feature in the currently-executing application to assist the user in shaving their face. If the system 10 identifies any type of makeup implement, the system 10 could launch a makeup tutorial based on the type and color of makeup that the user is holding. Furthermore, in addition to the use of the sensors 16 described above with respect to detecting and illuminating the user's face, the one or more cameras 20 can also be configured to recognize the user's face and/or identify, and take a predetermined action based on this recognition. This action could be illuminating the user's face as described above, or could be some other action.

In other implementations, the system 10 may identify the object by scanning a product barcode on the object or the object's packaging, or by detecting an RFID tag that is part of or coupled to the object or the object's packaging. To scan the barcode, the system 10 can include a barcode scanner, or the camera 20 of the system 10 can be configured to scan the barcode. To detect the RFID tag, the system 10 will generally include an RFID reader that is configured to detect and read the RFID tag when the product is near the system 10.

In some implementations, the system 10 can request the user to confirm the system 10's identification of an object. For example, the system 10 may cause the display 14 to display the name of the object, along with "Yes" and "No" indicators. The user can select one of the indicators to indicate to the system 10 whether the object has been identified correctly. In other implementations, the user can say "Yes" or "No" out loud, which can be detected by the microphone. The data from the microphone can be sent to the processor to allow the user to confirm whether the system 10 has correctly identified the object.

Figure 8:
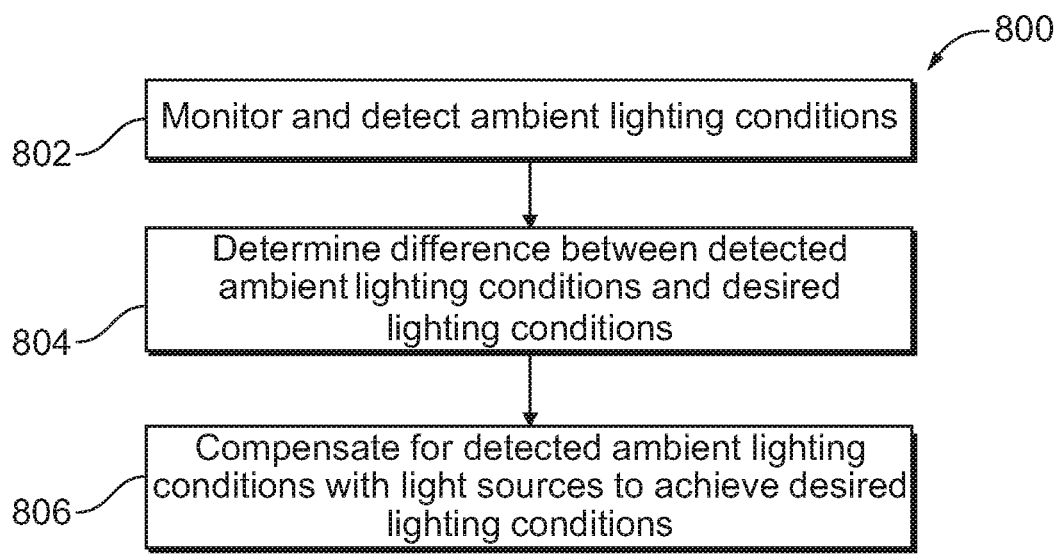
FIG. 8 is a flowchart illustrating a method of illuminating a user and compensating for ambient lighting conditions using the smart mirror system of FIG. 1, according to some implementations of the present disclosure.

A method of compensating for ambient lighting conditions is illustrated in FIG. 8. Generally, the system 10 is able to recognize and compensate for the ambient lighting conditions of the area where the user and the system 10 are located, so as to illuminate the user with a desired set of lighting conditions. At step 802, the system 10 monitors and detects ambient lighting conditions. In an implementation, the monitoring and detecting of the ambient lighting conditions is done by the one or more cameras 20. In another implementation, the system 10 includes a separate optical sensor that is specifically configured to monitor and detect ambient lighting conditions. The ambient lighting conditions can be determined from sensing the color or hue of an object in the field of view of the camera 20/optical sensor with known reflectance properties. The system 10 could also detect the ambient lighting conditions by capturing an image of the user's face and analyzing the captured image to determine the currently ambient lighting conditions. Further, the system 10 could detect ambient lighting conditions by using an optical sensor to collect and analyze ambient light. The system 10 could also use any combination of the above, or other methods, to detect the ambient light conditions.

At step 804, the difference between the detected ambient lighting conditions and the desired ambient lighting conditions is determined. The difference can be measured in terms of color temperature/white balance. The desired ambient lighting conditions can be manually input by the user, or the user could also select from one of a plurality of pre-determined desired ambient lighting conditions. In another implementation, the user could use a sensor or other device to measure the ambient lighting conditions at a desired location, for example the user's office, and then upload this measurement to the system 10. The system 10 could then compare the detected ambient lighting conditions to the uploaded ambient lighting conditions. The uploaded ambient lighting conditions could be in the form of simple numerical data, but could also comprise an image of the desired location with desired lighting conditions. At step 806, the system 10 adjusts the color, intensity, and other parameters of the one or more light sources 18 to compensate for the detected ambient light conditions and produce the desired lighting conditions. This desired lighting condition can be achieved causing the one or more light sources 18 to emit various shades and intensities of white light. The desired lighting conditions could also be achieved by causing the one or more light sources 18 to emit different colors of light, such as but not limited to red, green, blue, purple, yellow, orange, etc. The illumination of the object due to the ambient lighting conditions and the illumination of the object due to the light produced by the one or more light sources 18 combine to cause the object to be illuminated by the desired lighting condition.

In some implementations, the system 10 continually detects the ambient lighting conditions, adjusts the light being emitted from the light sources 18, newly detects the ambient lighting conditions, and then readjusts the light being emitted from the light sources. The system 10 can also use the detected ambient lighting conditions to calibrate itself, such that each time the system 10 is activated by the user, the system 10 will automatically adjust the light sources 18 to bring about the desired ambient lighting conditions. The system 10 can also allow the user to monitor the process and view the updated lighting conditions, either by the user's reflection in the mirror 12, or by displaying a live feed from the one or more cameras 20 on the display 14. The user can also manually adjust the light being emitted from the one or more light sources 18 depending on his or her preferences.

The system 10 can monitor and adjust the ambient light to improve pictures that the user may take, of themselves or other objects. The system 10 can also provide feedback to the user to improve pictures, such as suggesting that the user move themselves or the object, suggesting the user move the camera 20, or automatically moving the camera 20.

Figure 9:
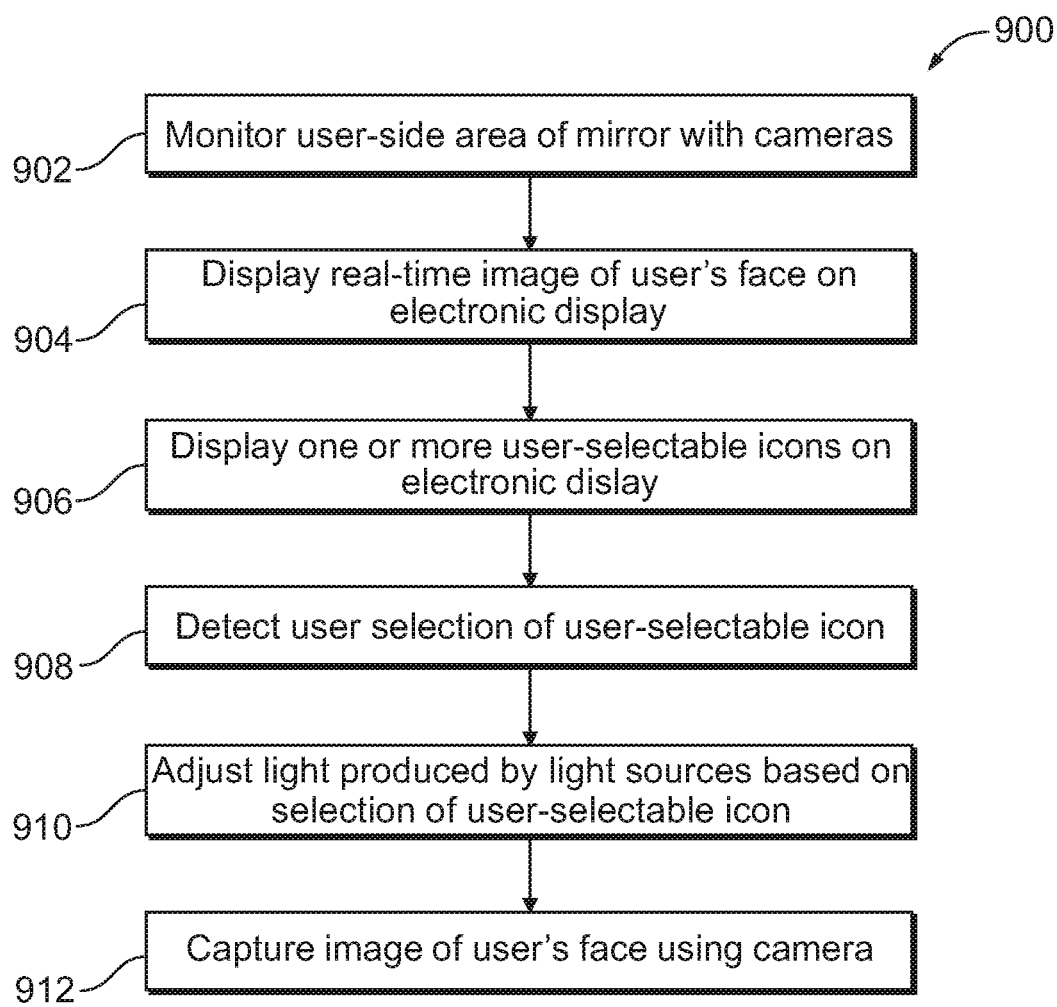
FIG. 9 is a flowchart illustrating a method of capturing an image of a user using the smart mirror system of FIG. 1, according to some implementations of the present disclosure.

A method 900 of capturing an image of the user is illustrated in FIG. 9. At step 902, the one or more cameras 20 are activated and begin monitoring the area on the user-side of the mirror 12. At step 904, a real-time image of the user's face is shown on the display 14 in an area of the display 14 that generally aligns with the user's face. The user thus sees the real-time image of themselves from the one or more cameras 20, rather than their reflection. At step 906, one or more user-selectable icons are displayed on the display 14. Each of the user-selectable icons corresponds to a different ambient lighting condition, such as natural light, no light, soft light, sunset, sunrise, rainbow colors, or other desired ambient lighting conditions. At step 908, the system 10 detects user input that corresponds to a selection of one of the user-selectable icons. At step 910, the system 10 adjusts the color, intensity, or other parameter of the light emitted by the one or more light sources 18 so as to illuminate the user with the desired ambient lighting condition. At step 912, an image of the user's face and/or other portions of the user is captured.

In another implementation, the system 10 recognizes the user's face when the user steps into the field of view of the one or more cameras 20. Instead of displaying user-selectable icons, the system 10 automatically selects a pre-determined lighting profile based on which user the system 10 has recognized. For example, a certain user may prefer to capture images of themselves using the system 10 in soft light, and thus can configure the system 10 to automatically illuminate their face in soft light. The capture of the image can be manually triggered by the user, or can be automatic once the desired lighting conditions have been achieved. The system 10 can also give a countdown to the user so they can be prepared for the image to be captured.

Figure 10:
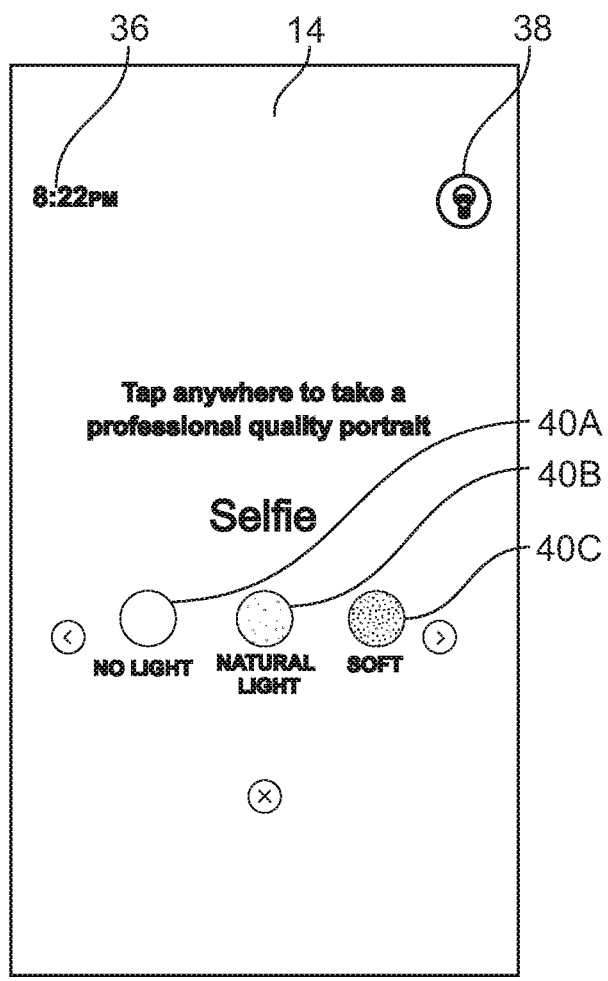
FIG. 10 is an implementation of an electronic display of the smart mirror system of FIG. 1 during the method of capturing an image of the user, according to some implementations of the present disclosure.

An implementation of what is displayed on the electronic display 14 during method 900 is illustrated in FIG. 10. In FIG. 10, the display 14 shows a plurality of icons 40A, 40B, 40C, each corresponding to a different ambient light condition that the user may select. Icon 40A corresponds to no light. Icon 40B corresponds to natural light. Icon 40C corresponds to soft light. The user can select any of these icons to cause the processor to adjust the light produced by the light sources such that the ambient light conditions in the area surrounding the user correspond to the selected icon. The display 14 can also display the time 36, or a lighting icon 38 that indicates the lighting conditions and can allow the user to adjust them. In an implementation, the display can show instructions to the users. In another implementation, the display shows a real-time image of the user captured by the camera 20.

Referring now to FIG. 11A, an implementation of the system 10 includes a first display 14A and a second display 14B. The first display 14A and the second display 14B are both located on a side of the mirror 12 opposite where a user would be located. The first display 14A and the second display 14B are generally spaced apart such that a gap is defined between them. The system 10 further includes one or more cameras 20 that are located on the same side of the mirror 12 as the first display 14A and the second display 14B. However, the one or more cameras 20 are located in the gap between the first display 14A and the second display 14B, rather than being up near the top of the mirror 12. The system 10 will generally include a sensor frame 28 including one or more sensors 16, and one or more light sources. The system 10 thus operates in generally the same manner as other implementations disclosed herein. However, by locating the one or more cameras 20 between the first display 14A and the second display 14B, the one or more cameras 20 will generally be positioned level with a user's face, and can thus obtain images of the user at a more appropriate viewing angle.

FIG. 11B illustrates an implementation of the system 10 that includes two displays 14A and 15B, and two cameras 20A and 20B. As shown, this implementation of the system 10 includes a left camera 20A and a right camera 20B. The field of view of the left camera 20A generally spans from the center of the user's face to the far left boundary of the user's face (e.g., the outer edge of the user's left ear) so as to capture an image or a video of the left side of the user's face. Similarly, the field of view of the right camera 20B generally spans from the center of the user's face to the far right boundary of the user's face (e.g., the outer edge of the user's right ear) so as to capture an image or a video of the right side of the user's face. The images and/or videos from the two cameras 20A, 20B can be combined to form a single front-facing image of the user's face. In some implementations, there is a slight overlap in the fields of view of the two cameras 20A, 20B near the center of the user's face to ensure all of the user's face is captured by at least one of the cameras 20A, 20B.

Figure 13:
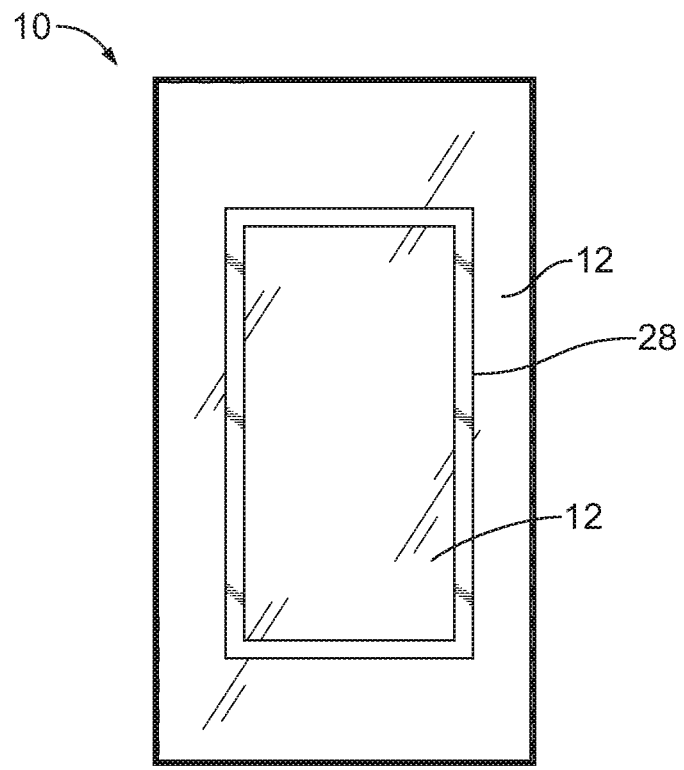
FIG. 13 is an implementation of the smart mirror system with a rectangular-shaped mirror and a smaller rectangular-shaped sensor frame, according to some implementations of the present disclosure.

FIG. 12 illustrates an implementation of the system 10 where the mirror 12 and the sensor frame 28 have different shapes. In this implementation, the mirror 12 is oval-shaped while the sensor frame 28 is rectangular-shaped. FIG. 13 illustrates an implementation of the system 10 where the mirror 12 and the sensor frame 28 have the same shapes but different sizes. Both the mirror 12 and the sensor frame 28 are rectangular-shaped, but the mirror 12 is larger than the sensor frame 28. In this implementation, the sensor frame 28 is generally aligned with an area of the mirror 12 interior to the periphery of the mirror 12.

Other implementations of the smart mirror system 10 are contemplated in accordance with the present disclosure. For example, the system 10 could operate without the mirror 12. The images captured by the camera 20 could be displayed on the display device to take the place of the reflection in the mirror 12.

In some implementations of the present disclosure, the system 10 connects (e.g., wirelessly, via one or more wired connections, or a combination thereof) with one or more other devices. By connect with, it is meant that the system 10 can receive data from the one or more other devices and/or transmit data and/or instructions to the one or more other devices. For example, the system 10 can connect with one or more mobile phones, one or more laptop computers, one or more desktop computers, one or more online servers, one or more fitness trackers, one or more scales (e.g., Internet-connected scales), one or more cloud services (e.g., a backend of an application-enabled smart device), one or more Internet-connected water bottles, one or more Internet-connected thermostats, one or more smart watches, one or more smart speakers, any other smart device, or any combination thereof.

In some implementations, the system 10 aggregates all of the data collected from any other devices connected to the system 10 and provides an easy-accessible location and/or portal for the user to view and/or manipulate and/or analyze the aggregated data. Thus, system 10 can act as a centralized hub (e.g., a base station) for all of the devices and/or services that the user is currently using. Such a centralized hub can collect data from any services the user is using and/or subscribing to, by communicating with any devices associated with these services (e.g., by communicating directly to the device via a wireless connection or wired connection and/or via a connected cloud service that receives the data from the respective device). In some implementations, the data can be stored locally by the centralized hub for the user to access. In additional or alternative implementations, the system 10 can send the data to the respective back-ends of the services.

In some implementations, the system 10 analyzes all or some of the collected/aggregated data from the other devices and correlates different events. In some such implementations, the system 10 offers advice to the user based at least in part on the analyzed aggregated data. For example, the system 10 obtains data from the user's Internet-connected scale. The system 10 analyzes the data and determines that the user lost weight in a given time period. In some implementations, in view of the weight loss determination, the system 10 analyzes data from one or more of the other connected devices that generate data during a corresponding time period of the weight loss to determine what other activities and/or events the user experienced that may have contributed to the weight loss. For example, the system 10 may recognize that during the relevant time period where the user lost the weight, the user also drank a certain amount of water, slept a certain number of hours per day, underwent a certain amount of activity day, or any combination thereof. The system 10 can correlate all of this data, present it to the user, and offer advice on what may have led to the user's weight loss and what may lead to further weight loss or gain.

The connection of the system 10 with the other devices allows the system 10 to utilize any data or portion of data from one or more of the other connected devices and/or services in a manner that is not normally possible. This is because such data from one of other connected devices and/or services is not generally accessible by another of the other devices and/or services. Thus, the system 10 aids in integrating separate and distinct platforms that have not communicated in the past.

In an implementation, the system 10 can monitor features on their body or face, such as moles, wrinkles, or beauty spots. The system 10 captures an initial image of the user using the camera 20. The user can view the captured image and select one or more features for the system 10 to monitor. Once the feature is selected by the user the system 10, using image processing and/or computer vision algorithms, can allow a finer selection or delineation of the feature selected by the user. In another implementation, the system 10 can mark features without user selection. Once the features are selected and marked by the system 10, the initial location, color, and other characteristics of the selected features are stored in the memory of the system 10. The system 10 can capture subsequent images of the user and identify the selected features. Any deviation in the characteristics of the features can be monitored by the system 10. Any unusual deviations can be reported by the system 10 to the user. In some implementations, the system 10 can monitor features such as moles, growths, sores, or other features that can appear on the user's skin that may be indicative of skin cancer or other diseases. The system 10 can monitor features by looking at images of only the feature itself, or can monitor the features by analyzing images of the user's entire face and/or body. The system 10 can also monitor other features indicative of medical conditions or diseases. For example, the system 10 can monitor the user's hair to determine if any of the user's hair is falling out. The system 10 can also monitor the user's teeth, gums, or lips for any indication of cavities, gum diseases, or other afflictions. The user's eyes can also be monitored for any type of distinguishing feature.

Figure 14:
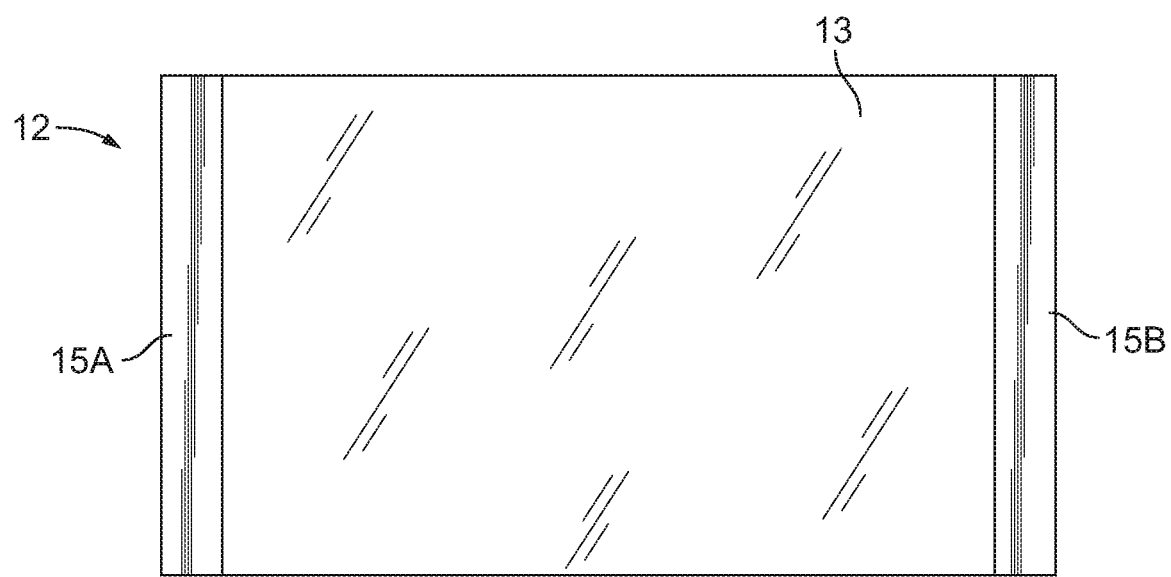
FIG. 14 is an implementation of the smart mirror system with the mirror divided into an inner zone and two outer zones, according to some implementations of the present disclosure.

Referring now to FIG. 14, in some implementations of the system 10, the mirror 12 includes an inner zone 13 and two outer zones 15A and 15B. The inner zone 13 defines the area on either surface of the mirror 12 (or both) that includes the partially reflective coating. The outer zones 15A and 15B define the area on both surfaces of the mirror 12 where no partially reflective coating exists. In some implementations, the outer zones 15A and 15B are formed as generally vertical bands or strips. In these areas, the mirror 12 comprises only the generally transparent substrate material (e.g., glass, acrylic, etc.). In some implementations, one or more light sources (such as light sources 18 discussed herein) can be positioned on the display-side of the mirror 12. The light sources are positioned such that they emit light towards the mirror 12, which propagates through the generally transparent substrate material and then to the user. The light sources can thus shine light through the generally transparent substrate material of the mirror 12 to illuminate the user, the area or objects surrounding the user, or both.

In some implementations, one or both of the display-side surface of the mirror 12 and the user-side surface of the mirror 12 within the outer zones 15A and 15 can be sandblasted. Because the partially reflective coating is not present on either surface of the generally transparent substrate material within the outer zones 15A and 15B, the generally transparent substrate material itself is sandblasted. By sandblasting the surface of the substrate material, the light emitted toward the user by the light sources is diffused as it travels through the substrate material. By diffusing the light that is emitted through the mirror 12 towards the user, the system 10 achieves a more even illumination of the user and the area/objects surrounding the user. Further, if the outer zones 15A and 15B were both sandblasted and contained the partially reflective coating, the resulting light transmitted by the light sources towards the user would generally be dull and not provide sufficient illumination. Thus, the outer zones 15A and 15B are generally only sandblasted. However, in certain implementations, the outer zones 15A and 15B, or the inner zone 13, may be sandblasted and include the partially reflective coating.

In one implementation, the partially reflective coating is present only on the surface of the user-side of the substrate material within the inner zone 13, while the substrate material is sandblasted only on the display-side within the outer zones 15A and 15B. By coating only the user-side surface of the substrate material with the partially transparent coating, images designed to be shown to the user through the mirror 12 by the displays on the display-side of the mirror 12 are more visible. Further, if the user-side surface of the substrate material within the outer zones 15A and 15B is sandblasted, the resulting porous surface can more easily absorb liquids or other substances such as shaving cream, toothpaste, etc. By only sandblasting the display-side of the substrate material, the user-side of the substrate material within the outer zones 15A and 15B will generally not absorb undesirable substances. The partially reflective coating is not present on the user-side surface of the substrate material within the outer zones 15A and 15B so as to not dull the light that is emitted by the light sources and transmitted through the mirror 12.

In another implementation, the partially reflective coating is present only on the surface of the display-side of the substrate material within the inner zone 13, while the substrate material is sandblasted only on the user-side within the outer zones 15A and 15B. In other implementations, the partially reflective coating is present on the same side of the substrate material that is sandblasted. In these implementations, either or both of the user-side and the display-side of the substrate material is coated by the partially reflective coating within the inner zone 13. The outer zones 15A and 15B of that same side of the substrate material is sandblasted. In some implementations, the partially reflective coating is deposited on the entirety of the desired surface(s) of the substrate material, including in the inner zone 13 and in the outer zones 15A and 15B. The partially reflective coating within the outer zones 15A and 15B can then be removed, either by the sandblasting process or by another process preceding the sandblasting process. In still other implementations, the partially reflective coating is deposited on the desired surface(s) only within the inner zone 13.

Figure 15:
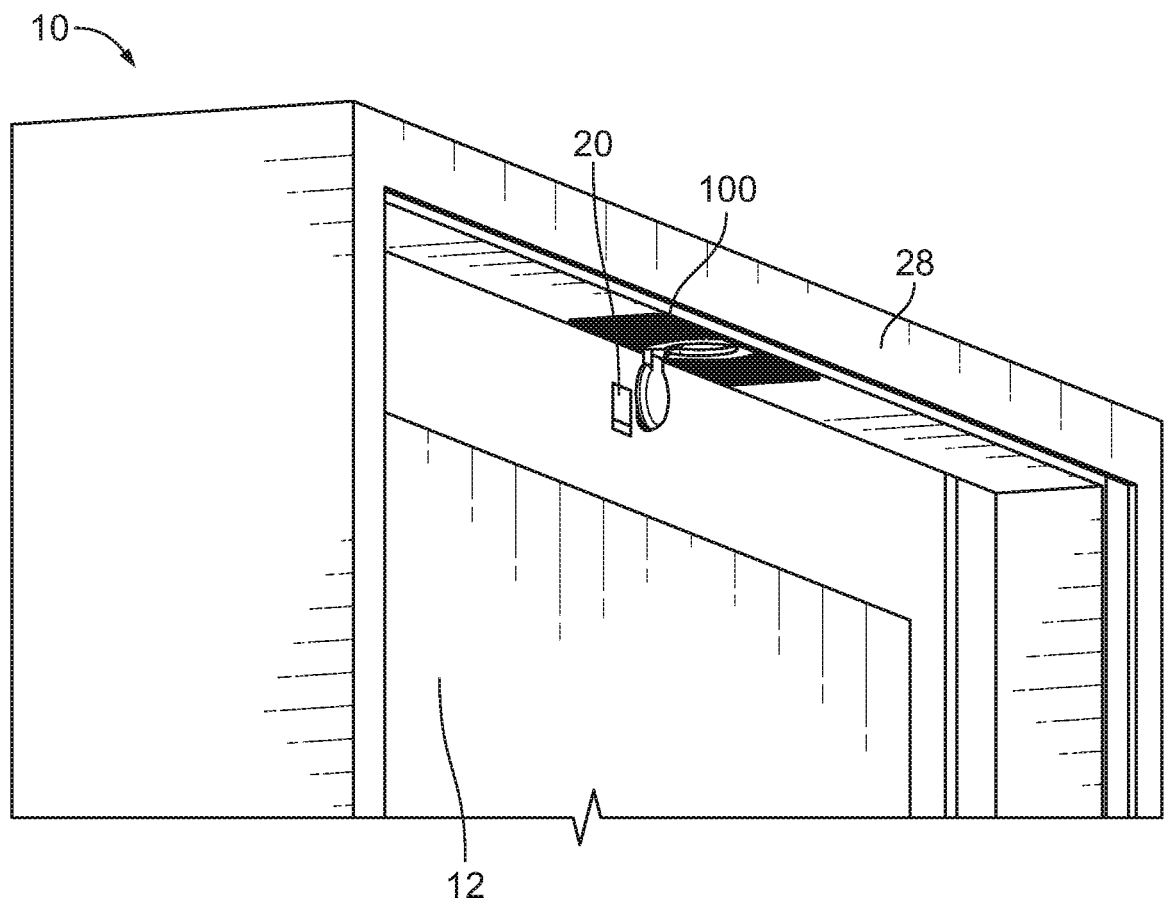
FIG. 15 is an implementation of the smart mirror system with an obstruction at least partially blocking a field of view of the camera, according to some implementations of the present disclosure.

Referring now to FIG. 15, the system 10 can include an obstruction 100 that is configured to at least partially block or obscure the field of view of the camera 20. This allows the user to prevent him or herself from being viewed by the camera 20, and also prevents the camera 20 from viewing the area surrounding the user. In some implementations, the user can manually move the obstruction 100 between a stored position and a deployed position. In other implementations, the obstruction 100 can be moved between the stored position and the deployed position using one or more electronic actuation devices, which can include a solenoid, a spring, a lever, a magnet, any combination thereof, or any other suitable device. FIG. 15 illustrates the obstruction 100 in the deployed position. In other implementations, the processor(s) of the system 10 are configured to move the obstruction 100 between the stored position and the deployed position. As shown in the implementation of FIG. 15, the obstruction 100 can be mounted to the underside of the top portion of the frame, and includes a portion projecting downwardly that blocks the field of view of the camera 20. In some implementations, the obstruction 100 is pivotally coupled to the frame. In other implementations, the obstruction 100 is slidably or translatably coupled to the frame.

Figure 16A:
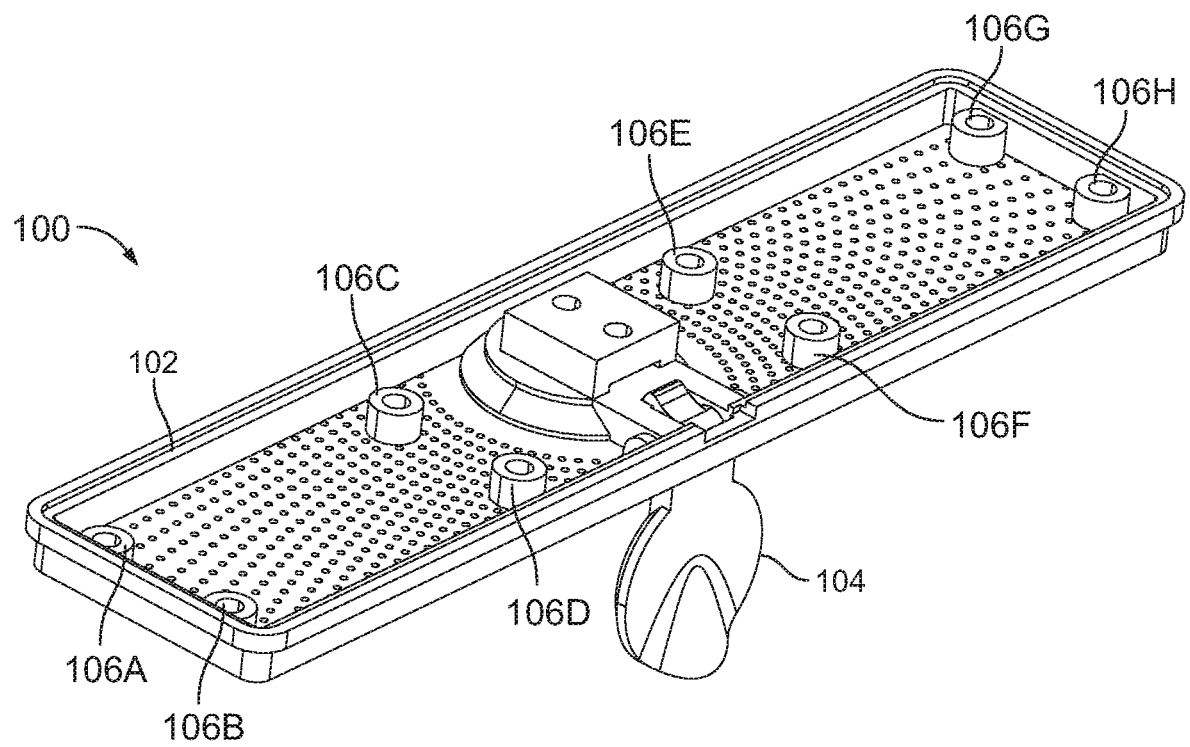
FIG. 16A is a top perspective view of the obstruction of FIG. 15, according to some implementations of the present disclosure.
Figure 16B:
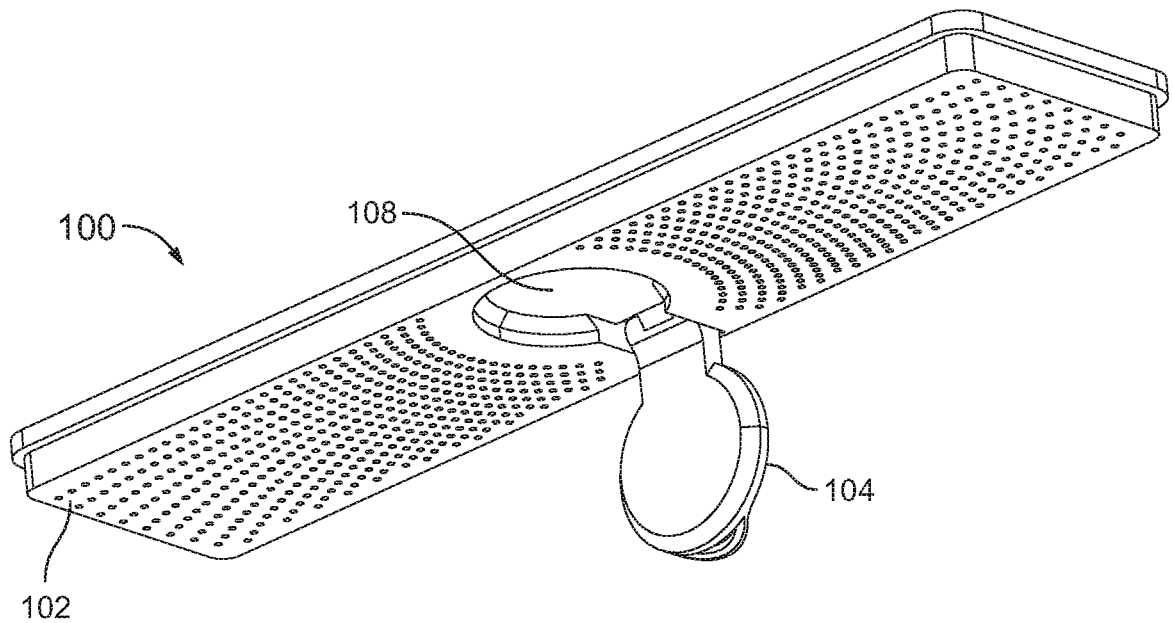
FIG. 16B is a bottom perspective view of the obstruction of FIG. 15, according to some implementations of the present disclosure.

FIGS. 16A and 16B show perspective views of the top and bottom of the obstruction 100. As shown, the obstruction 100 generally includes a baseplate 102 and a projection portion 104. The baseplate 102 includes a variety of fastener apertures 106A-106H that are used to secure the obstruction 100 to the frame (or another component) of the system 10. In some implementations, respective fasteners extend through the fastener apertures 106A-106H and into the frame to secure the obstruction 100 to the frame. The fasteners can be screws, nails, pins, rods, clips, etc. In other implementations, the obstruction 100 can be secured to the frame without the use of fasteners and the fastener apertures 106A-106H, for example by using adhesive.

The projection portion 104 is coupled to the baseplate 102 in a manner that allows the projection portion 104 to move between a stored position and a deployed position. FIGS. 16A and 16B show the projection portion 104 in the deployed position. In this deployed position, the projection portion 104 extends away from the baseplate 102 so as to block the field of view of the camera 20. In some implementations, the projection portion 104 is pivotally coupled to the baseplate 102 via a hinge or other structure that allows the projection portion 104 to pivot relative to the baseplate 102. In still other implementations, the projection portion 104 is configured to move generally along one dimension between the stored position and the deployed position. The baseplate 102 can include a depression 108 defined therein that is sized to accommodate the projection portion 104 when the projection portion 104 is moved to the stored position. The projection portion 104 and the depression 108 can be sized so that the obstruction 100 has a generally flat surface when the projection portion 104 is in the stored position.

In some implementations, the projection portion 104 can be biased towards either the stored position or the deployed position, or can be selectively biased towards both positions. In still other implementations, the projection portion 104 is not biased in either position. The projection portion 104 can be biased using any suitable mechanism, such as a spring. When the projection portion 104 is biased towards only one of the stored and deployed positions, the obstruction 100 generally include a retention feature that retains the projection portion 104 in the non-biased position. The retention feature could be a clip, strap, or other similar feature. The retention feature could also include a structure on the projection portion 104 that snaps into a corresponding depression on the baseplate 102.

In some implementations, the retention feature is the depression 108, which may be sized so as to retain the projection portion 104 within the depression 108 via a friction fit. For example, the portion of the baseplate 102 that forms the outer periphery of the depression 108 may include a small semi-resilient ridge. The semi-resilient ridge can form a circle with a diameter that is slightly less than the diameter of the projection portion 104. When the projection portion 104 is moved to the stored position, the force imparted to the projection portion 104 can overcome the friction force between the projection portion 104 and the semi-resilient ridge so that the projection portion 104 is seated in the depression 108 and retained there.

When the projection portion 104 is selectively biased in both the stored position and the deployed position, the projection portion 104 must be moved a certain amount away from either position until the bias alternates, which causes the projection portion 104 to continue to move towards the other position. For example, if the projection portion 104 is selectively biased towards both positions and is currently in the stored position, the user (or a component of the system 10) must begin to move the projection portion 104 away from the baseplate 102. Once the projection portion 104 is moved a certain amount away from the baseplate 102 and reaches an inflection point, the bias alternates towards the deployed position. Moving the projection portion 104 from the deployed position to the stored position also occurs in a similar fashion. In some implementations, the inflection point may be about halfway between the stored position and the deployed position. In these implementations, no retention feature is necessary, as the projection portion 104 is always biased towards the position in which it is currently stored.

In the implementations where the projection portion 104 is not biased towards either position, the obstruction 100 still generally includes a retention feature to prevent gravity from causing the projection portion 104 from moving between positions. For example, the projection portion 104 may still snap into the depression 108 in the baseplate 102 so as to prevent the projection portion 104 from moving towards the deployed position due to the influence of gravity. In these implementations, friction in the structure used to couple the projection portion 104 to the baseplate 102 may retain the projection portion 104 in either position. For example, friction in the hinge or other pivoting mechanism used to pivotally couple the projection portion 104 to the baseplate 102 may impart a force on the projection portion 104 that is greater than the force imparted on the projection portion 104 due to gravity. This causes the projection portion 104 to remain in the stored position, even when gravity is imparting a force on the projection portion 104 towards the stored position.

The obstruction 100 can be formed from an opaque material that does not let any light pass therethrough, or a partially transparent material that only lets a portion of light therethrough. For example, the obstruction 100 could be formed of one or more optical filters that are configured to block or lass different wavelengths of light.

In different implementations, the camera 20 can have various positions relative to other components of the system 10. In some such implementations, the camera 20 is located on the user-side of the mirror 12, such that the mirror 12 is positioned between the camera 20 and the user. These implementations are illustrated in FIGS. 3B, 11A, and 11B. In these implementations, the camera 20 can be positioned above the display 14, as shown in FIG. 3B. The camera 20 could also be positioned between separate display portions 14A and 14B, as shown in FIGS. 11A and 11B. In other implementations, the camera 20 could be located below or to the side of the display 14 or display portions 14A and 14B.

In still other implementations, the camera 20 is located in an area such that the mirror 12 is not positioned between the camera 20 and the user. In these implementations, the camera 20 has a direct line of sight to the user such that substantially all of the light entering the camera 20 does not first pass through the mirror 12. In some of these implementations, the camera 20 is positioned in front of and/or on the mirror 12 such that the camera 20 is positioned between the mirror 12 and the user. The camera 20 can still be within the frame 28 of the system 10, and can generally be located in any direction relative to the display 14, e.g., above, below, or to the side of the display 14. In some implementations, the camera 20 is positioned outside of the frame 28 of the system 10. In these implementations, the mirror 12 is not positioned between the camera 20 and the user, and the camera 20 can be positioned on either the display-side of the mirror 12 or the user-side of the mirror 12. In still other implementations, the camera 20 is positioned on the internal side of the mirror 12; however, the portion of the mirror 12 that light passes through when received by the camera 20 (e.g., the portion of the mirror 12 that the camera 20 "looks" through) can have little or no reflective coating on the substrate material. The camera 20 will thus effectively view the user and the surrounding area through the generally transparent substrate material and not through a mirrored/reflective film, thereby improving the quality of the images generated by the camera 20.

While the mirror 12 is generally depicted as being a full-size rectangular mirror in which the reflection of a substantial portion of the user 30's upper body fits and is visible, the mirror 12 can have any desired size and/or shape. For example, the mirror 12 can be a relatively smaller mirror typically used to apply makeup or to shave, a handheld mirror that can be stored in a purse and//or pocket, a relatively larger mirror that shows the reflection of the user 30's head and neck, or any other suitable size. In some implementations, the mirror 12 can have a generally rectangular shape, with a long dimension that is between about four inches and about twelves inches. In other implementations, the mirror 12 can be circular, with a diameter of between about four inches and about twelve inches. In still other implementations, the mirror 12 has a square shape that is three inches by three inches, four inches by four inches, five inches by inches, or any other suitable size. In still other implementations, the mirror 12 has a size and shape designed to match the size and shape of the display 14, and various devices can be used as the display 14. For example, the display 14 could be a handheld device (such as the user 30's smartphone), and the mirror 12 can have a size similar to that of the handheld device. The mirror 12 can have a size and shape similar to a tablet or a laptop, so that the mirror 12 can be used with a tablet computer or a laptop computer. In still other implementations, an LED dot matrix display can be used as the display 14, and the mirror 12 can be sized to be used with the LED dot matrix display. Thus, the mirror 12 and display 14 can be used as a portable and/or modular device that the user 30 can use for a variety of different applications or in a variety of different locations.

As discussed herein, the system 10 is generally configured to recognize objects in the field of view of the camera 20 and launch and application or tutorial based on the identified object. In some implementations, this tutorial can show the user how to apply a certain product, which could be makeup (e.g. lipstick, eyeliner, etc.), hair dye, toothpaste (e.g. the user brushing their teeth), or any other product that the user may apply in front of the mirror 12.

Figure 17A:
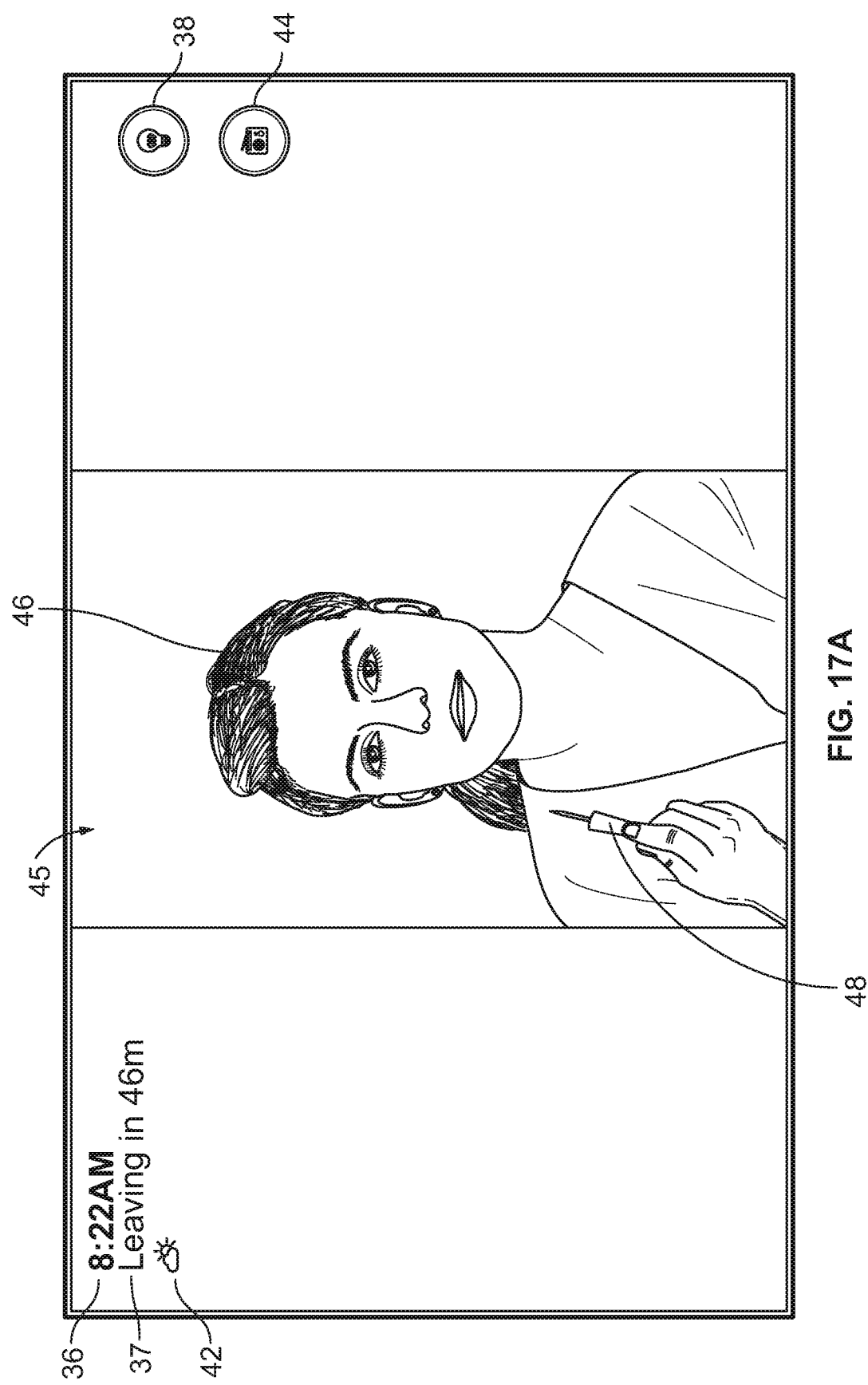
FIG. 17A is a view of the smart mirror system displaying the user and an object the user is holding, according to some implementations of the present disclosure.
Figure 17B:
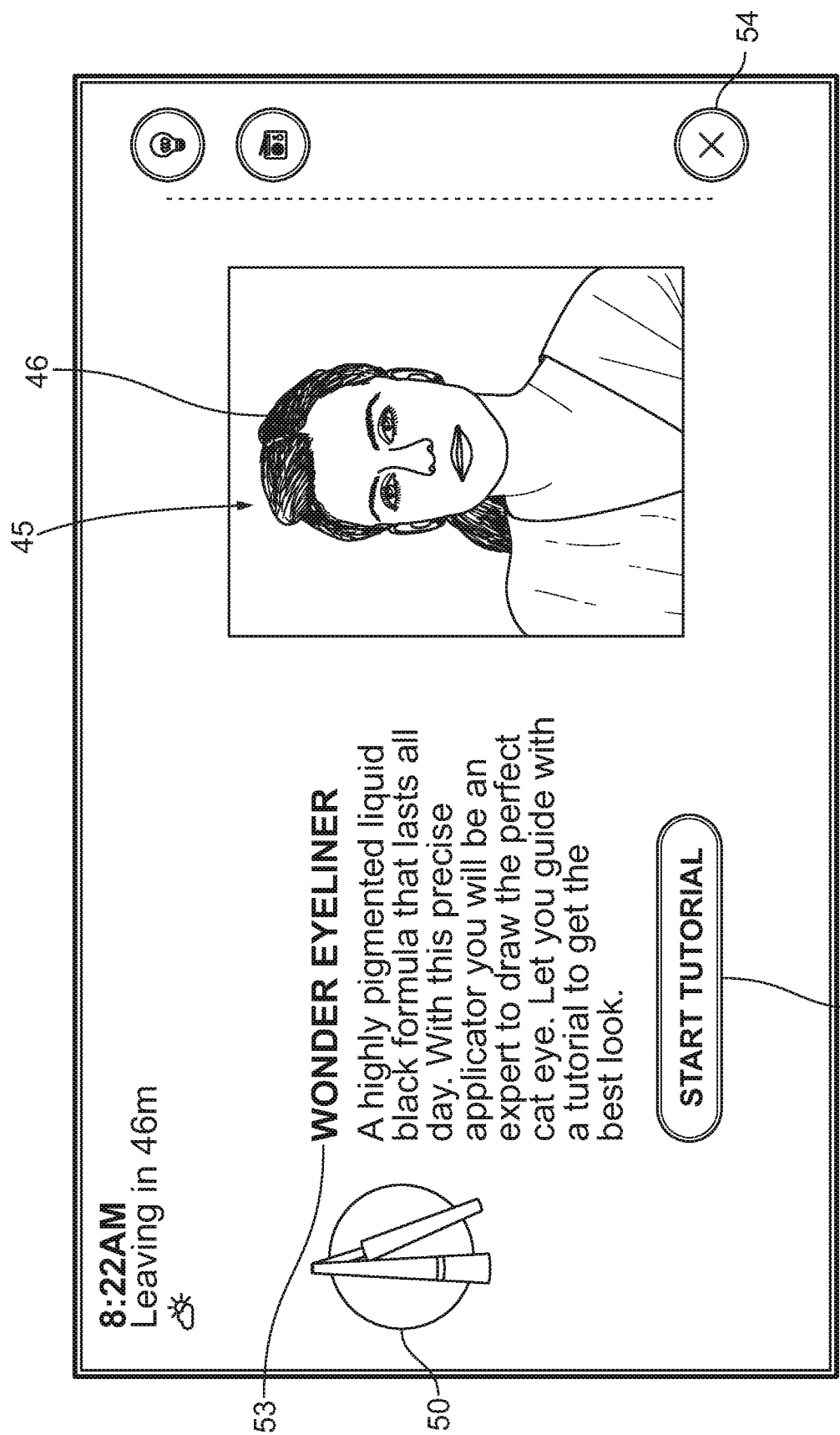
FIG. 17B is a view of the smart mirror system after the smart mirror system identifies the object the user is holding, according to some implementations of the present disclosure.

FIGS. 17A and 17B illustrate an implementation of the mirror 12 and the display 14 when the system 10 identifies an object or product held by the user using the object recognition algorithm, and launches a tutorial based on that object or product. As shown, the display can show the time 36, and can also show information 37 relating to the user's schedule. In the illustrated implementation, the information 37 includes an indication of when the user is supposed to leave for their destination. This information can be based on the user's calendar, which can be stored in the memory of the system 10, or synced from another device or location. The display also shows a variety of icons, that may or may not be interactive. As discussed herein, the display 14 can display the lighting icon 38. The display can also display a weather icon 42 can show an image that is indicative of the current weather conditions, such as clouds, a sun, snow, etc. An audio player icon 44 is interactive and can be operated by the user to play music, podcasts, radio stations, or other audio sources.

As shown in FIG. 17A, the system 10 shows an image 45 that contains the user 46 and the object 48 being held by the user 46. The image 45 can be a reflection in the mirror 12, or can be a still image or real-time video feed shown on the display 14. When the image 45 appears as a reflection in the mirror 12, the display 14 is inactivated in the center where the reflection of the user 46 and the object 48 appears. When the object 48 is in the field of view of the camera 20, the system 10 can detect and identify the object 48 and (if applicable) the product contained therein.

FIG. 17B shows the state of the system 10 upon detecting that object 48 that the user 46 is holding the bottle of eyeliner. As shown, the display can display an image 50 of the eyeliner (which can be a stock image or an image captured by the camera 20) and a description 53 of the object 48 or the product contained therein. The system 10 can again show an image 45 of the user 46, either as a still image or real-time video feed on the display or as a reflection in the mirror 12. The display also shows an initiation icon 52 that can be activated by the user 46 to launch a tutorial application, which can show the user 46 how to apply the eyeliner. The initiation icon 52 can include the words "START TUTORIAL," or can show other text or images. Finally, the display shows a cancellation icon 54 that the user 46 can interact with to exit this stage if they do not wish to proceed with the tutorial. Activating the cancellation icon 54 causes the system 10 to revert back to the previous stage. This can be useful when, for example, the system 10 incorrectly identifies the object 48 that the user is holding, or if the user 46 changes their mind and no longer wishes to use the object 48.

Figure 18A:
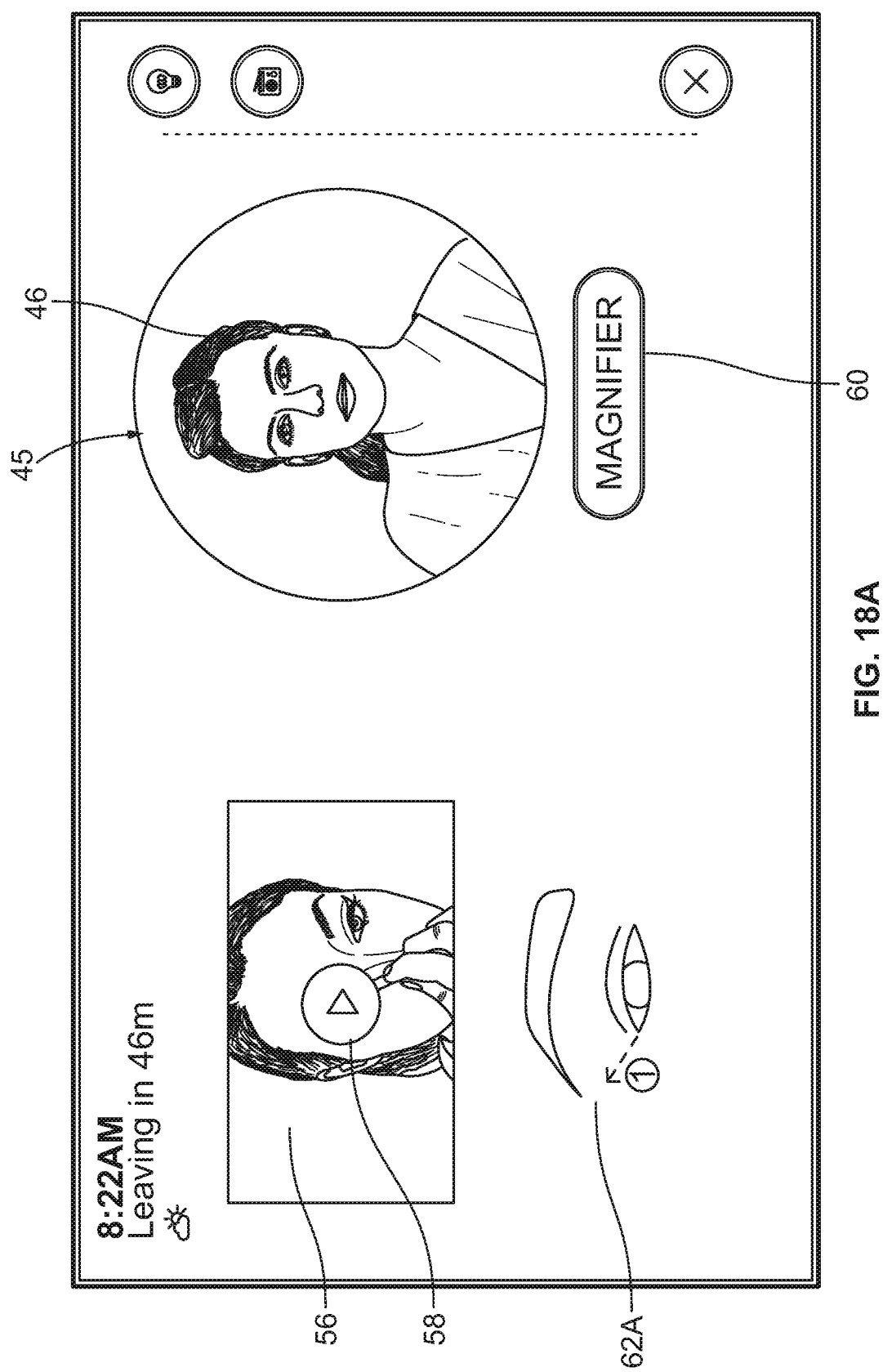
FIG. 18A is a view of a first step in a tutorial for applying eyeliner, according to some implementations of the present disclosure.
Figure 18B:
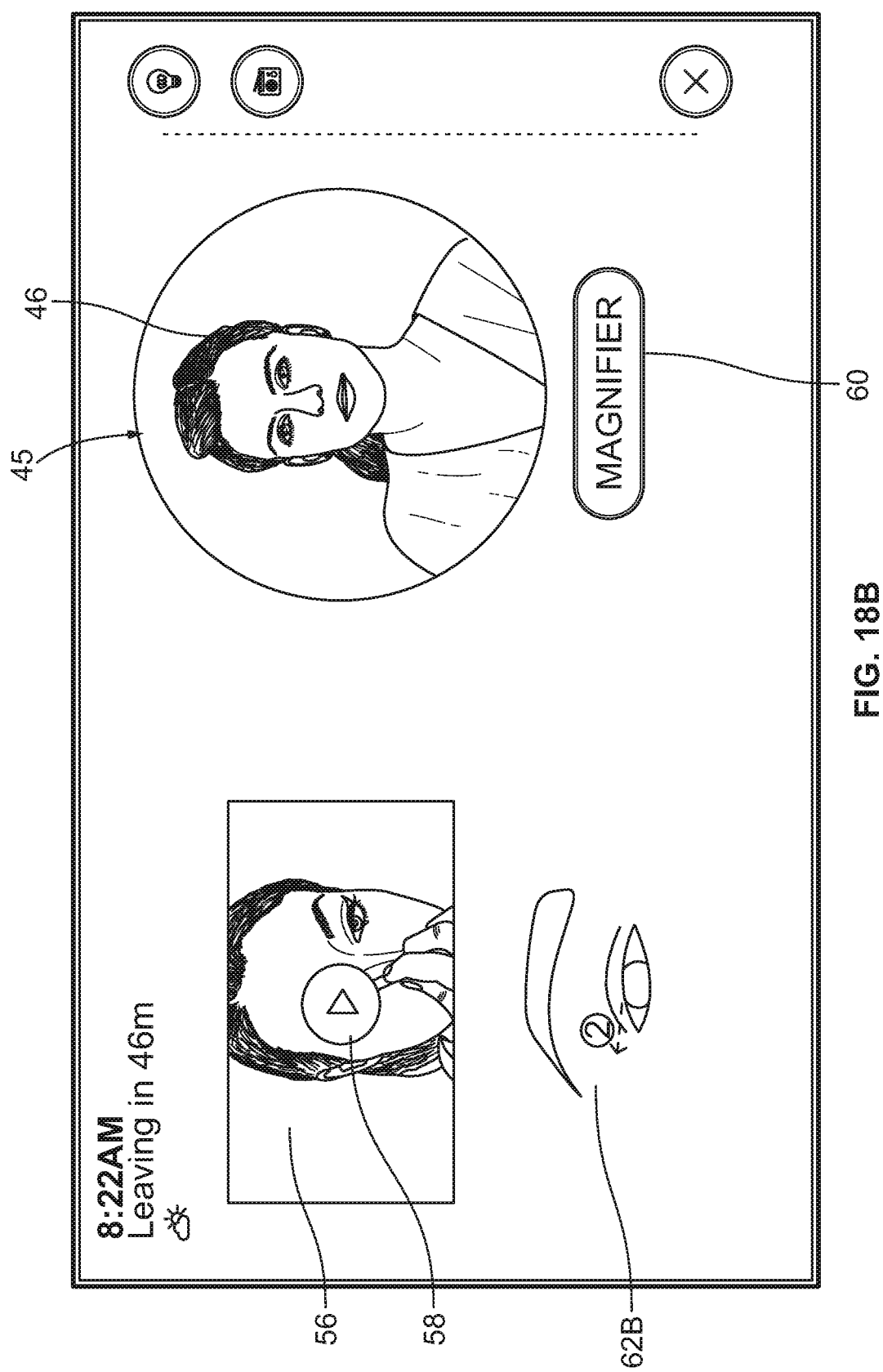
FIG. 18B is a view of a second step in a tutorial for applying eyeliner, according to some implementations of the present disclosure.

FIGS. 18A, 18B, and 18C illustrate the steps of the tutorial application that is executed by the system 10. The tutorial can be launched responsive to the user interacting with the initiation icon 52 that is shown in FIG. 17B. The tutorial can also be launched via another method, such as voice activation. As illustrated in FIGS. 18A, 18B, and 18C, the image 45 of the user 46 is shown as either a reflection in the mirror 12 or as a real-time video feed shown on the display. The display also shows an image frame 56 from a live action video showing how to apply the eyeliner. An interactive icon 58 can be overlaid on the image frame 56. When the user 46 interacts with the icon 58, the display plays the video for the user 46. The video may be stored in the memory of the system 10, or can be downloaded from another location and played in response to the user activating the icon. The video plays can play on a loop, or can play a set number of times. While FIGS. 18A, 18B, and 18C show the icon 58 overlaid on the image frame 56 during the tutorial, the live action video can be played repeatedly during the tutorial. During the tutorial application, the display can also show a magnification icon 60 that initiates a magnification feature when activated by the user. The magnification icon 60 can include text such as the word "MAGNIFIER," or could also be displayed as an image.

The tutorial application can also display an image or a series of images showing the steps to apply the eyeliner. In one implementation, the display displays an animated GIF (Graphics Interchange Format) that shows the steps to the user. FIG. 18A illustrates the display showing a first frame 62A of the GIF that demonstrates the first step of the application process. FIG. 18B illustrates the display showing a second frame 62B of the GIF that demonstrates the second step of the application process. FIG. 18C illustrates the display 14 showing a third frame 62C of the GIF demonstrating the third step of the application process.

Each of the frames 62A-62C is indicated with a number and other markings showing the which action to take. For example, each step in FIGS. 18A, 18B, and 18C includes an arrow 64A, 64B, or 64C that indicates to the user which motion to take to apply the eyeliner and achieve the desired result. During the tutorial, the display can repeatedly show each frame 62A-62C of the application process in sequential order until the user 46 finishes applying the eyeliner. The image or series of images showing the steps to apply the eyeliner can take the form of other file types as well. For example, instead of showing a GIF, the display can instead show a series of individual still image files, such as JPEG files or PNG files. In some implementations, the display shows an animated video instead of an image or series of images. Generally, the GIF presents to the user a looping video that illustrates an animation associated with the tutorial, e.g., showing how to applying the product.

As shown in FIGS. 18A, 18B, and 18C, the display 14 during the tutorial application can still display the time 36, the information 37 related to the user 46's schedule, the lighting icon 38, the weather icon 42 related to the current weather conditions, and the audio player icon 44 allowing the user to play music or other audio.

In some implementations, the system 10 can assist the user 46 in conducting activities (applying eyeliner) by highlighting portions of the user 46's face where they need to apply the product. In one example, the light sources of the system 10 can emit light onto a portion of the user 46 (e.g. their face) to highlight where to apply the product. The light sources can include LEDs, lasers, or other suitable types of light-emitting devices. The light emitted by the light sources can have any suitable shape or form, such as dots, circles, squares, triangles, curves, arcs, arches, lines, any combination thereof, or any other suitable shape. The light projected on to the user 46's face will be visible in the image 45 of the user 46, either as a reflection in the mirror 12 or as an image on the display.

In another implementation, the display is used to guide the user 46 and to overlay template features onto the user 46's face to aid the user in conducting activities. For example, when the image 45 of the user 46 is a real-time image on the display, the display could highlight portions on the user 46's face where to apply the product. In another implementation, the image 45 of the user 46 could be a reflection in the mirror 12, but the display could still highlight any portions on the use 46's face where to apply the product. The light in this location from the display will be brighter than the light reflecting off of the mirror 12 at this location, and thus the user 46 will be able to see the light indicating where they are supposed to apply the product. The template features that can be shown by the display can take any suitable shape or form, such as dots, circles, squares, triangles, curves, arcs, arches, lines, any combination thereof, or any other suitable shape.

Figure 19A:
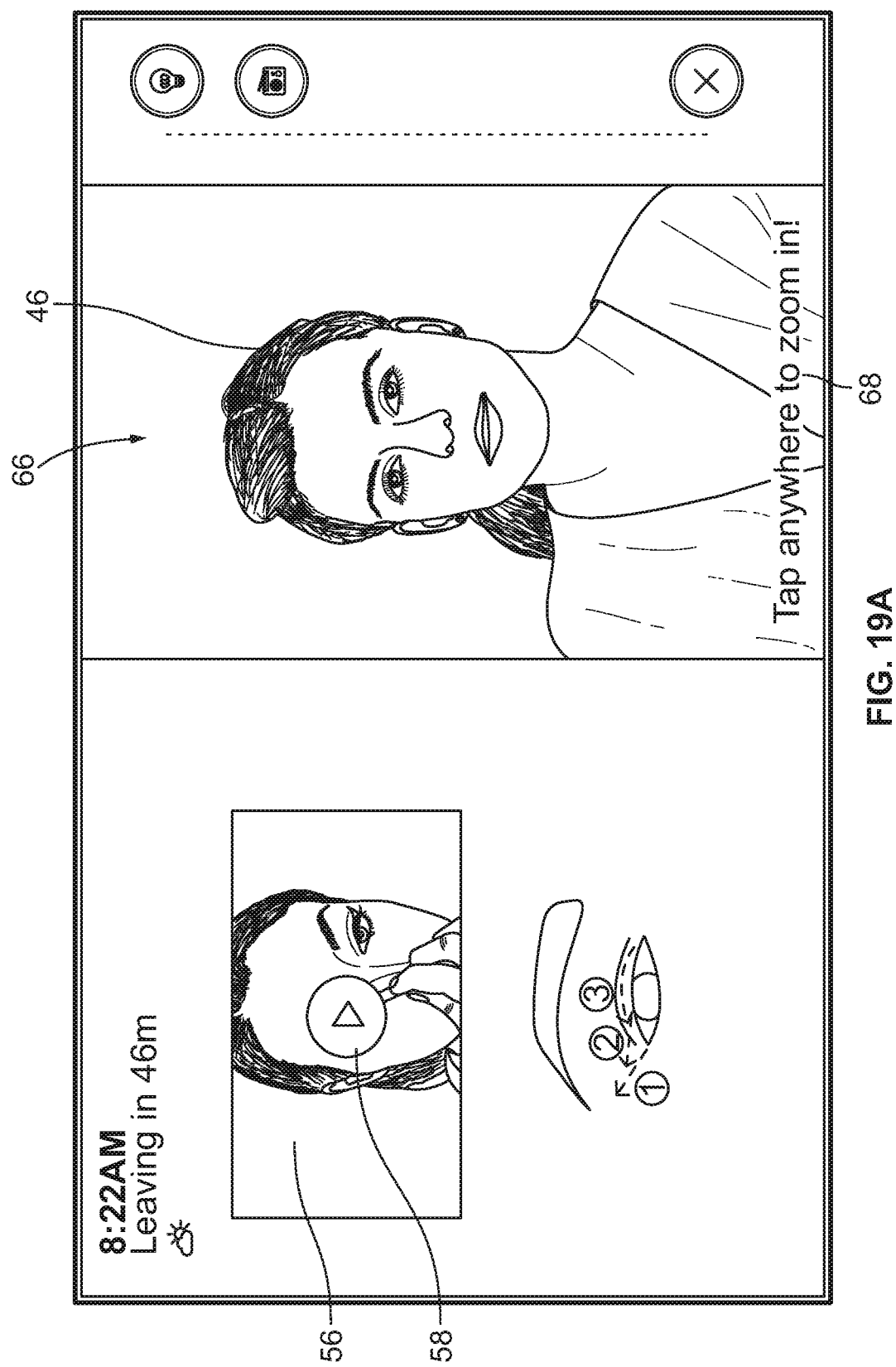
FIG. 19A is a view of a first stage of a magnification feature, according to some implementations of the present disclosure.
Figure 19B:
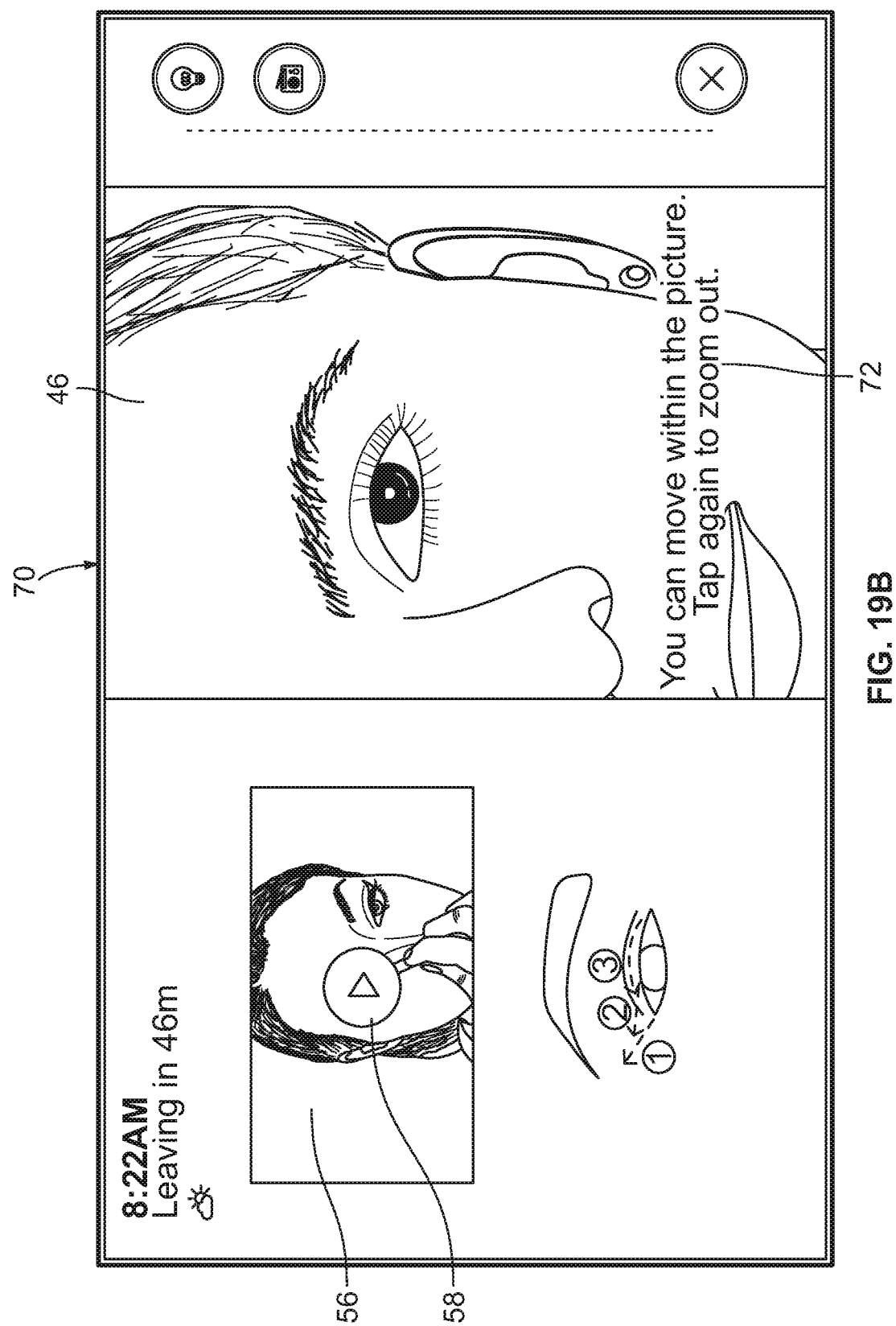
FIG. 19B is a view of a second stage of a magnification feature, according to some implementations of the present disclosure.

FIGS. 19A and 19B show the state of the system 10 when the user initiates the magnification feature by selecting the magnification icon 60 as shown in FIGS. 18A-18C. The display can continue to show the image frame 56 of the video and the icon 58 that can be activated to play the video, or can continue to show the video itself. The display also continues to show the steps of the looping video illustrating the animation associated with the steps for applying the eyeliner (e.g. the GIF). In the first stage of the magnification feature illustrated in FIG. 19A, the display displays a full-size image 66 of the user 46's face, along with a caption 68. The caption 68 can include the instructions "Tap anywhere to zoom in!" While during the tutorial the system 10 can show the user 46's face as just a reflection in the mirror 12, once the magnification feature is activated, the user 46's face is shown as an image on the display.

FIG. 19B shows a second stage of the magnification feature. Once the user 46 taps or otherwise interacts with the image 66 of their face at an area of interest, the display shows a zoomed-in image 70 of the user's face that includes that area of interest. For example, as illustrated in FIG. 19B, when the user is applying eyeliner to the user's eyelashes, the user can zoom in on the portion of their face that includes their eyelashes. This allows the user to better view their eyelashes as they apply the eyeliner. The user can also manipulate the zoomed-in image 70 by interacting with the display. The user can swipe or drag the zoomed-in image so that different areas of the user's face. The user can also tap again to zoom back out. The display can show instructions 72 that indicate to the user how to manipulate the zoomed-in image 70. In some implementations, the system 10 is configured to track the area of interest as the user moves. Thus, the display shows the zoomed-in view of the area of interest, and continues to display the zoomed-in view of the area of interest as the user moves. The area of interest could be the user's eyes, noses, ears, mouth, teeth, etc., or any other feature on the user's face or body.

Figure 20A:
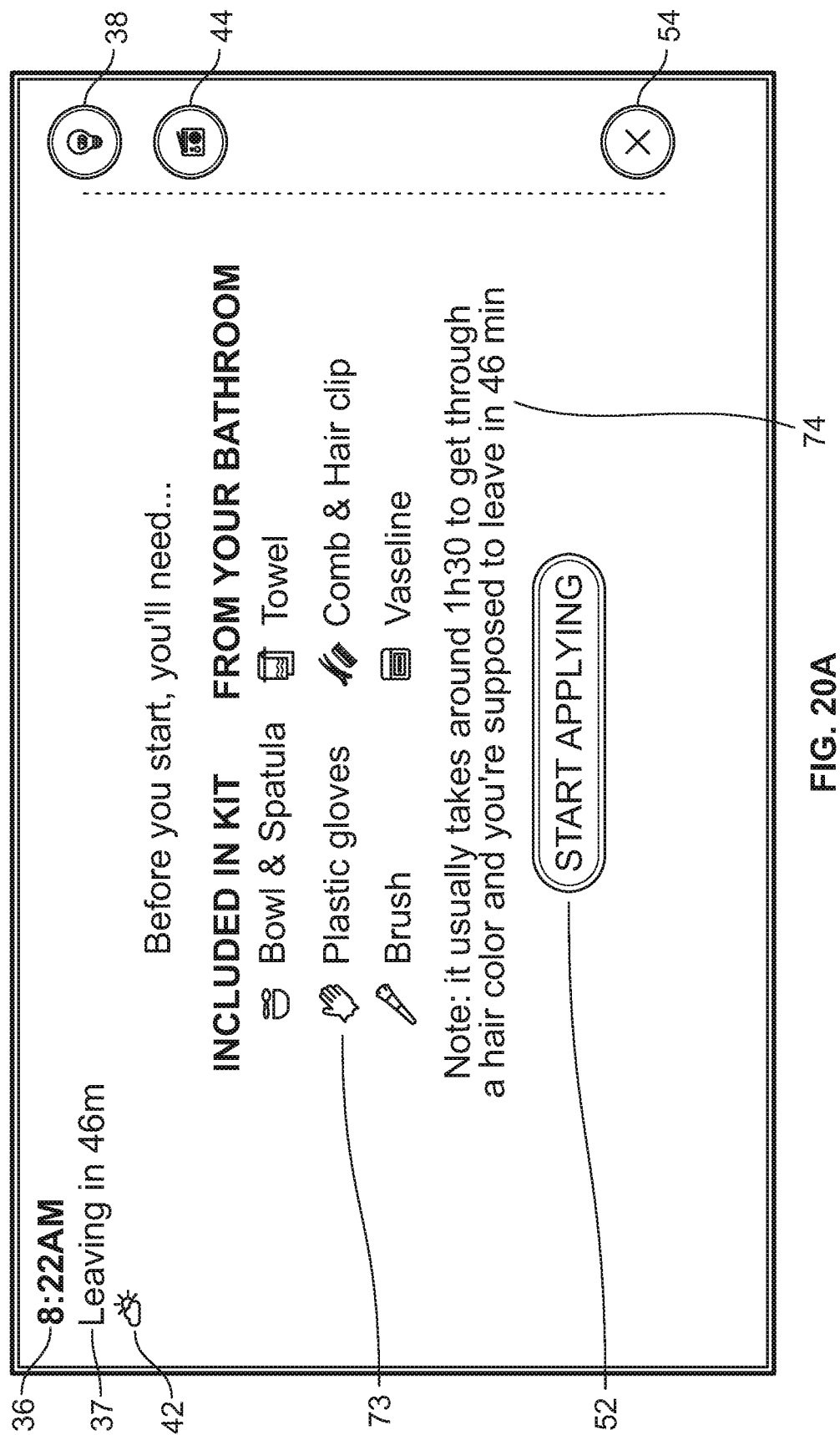
FIG. 20A is a view of a first step in a hair dying tutorial, according to some implementations of the present disclosure.

FIGS. 20A-20F illustrate a tutorial for applying hair dye that the system 10 can execute for the user. During the tutorial, the display can show the same information and icons discussed above, including the time 36, information 37 relating to the user's schedule, the lighting icon 38, the weather icon 40, the audio player icon 41, and the cancellation icon 54. At a first step in the tutorial as shown in FIG. 20A, the display can show a list 73 of items the user will need to apply the hair dye. This list 73 is be displayed after the system 10 identifies the object that the user is holding as hair dye. The display can also show the initiation icon 52 that the user can interact with to begin the tutorial. The display may also show a warning 74 to the user related to the time needed to complete the application of the hair dye. For example, if the user has to depart in a certain amount of time period (which is communicated to the user via the information 37 on the display) but it normally takes longer than that time period to complete the application of the product, the system 10 can issue a warning 74 to the user indicating this fact.

Figure 20B:
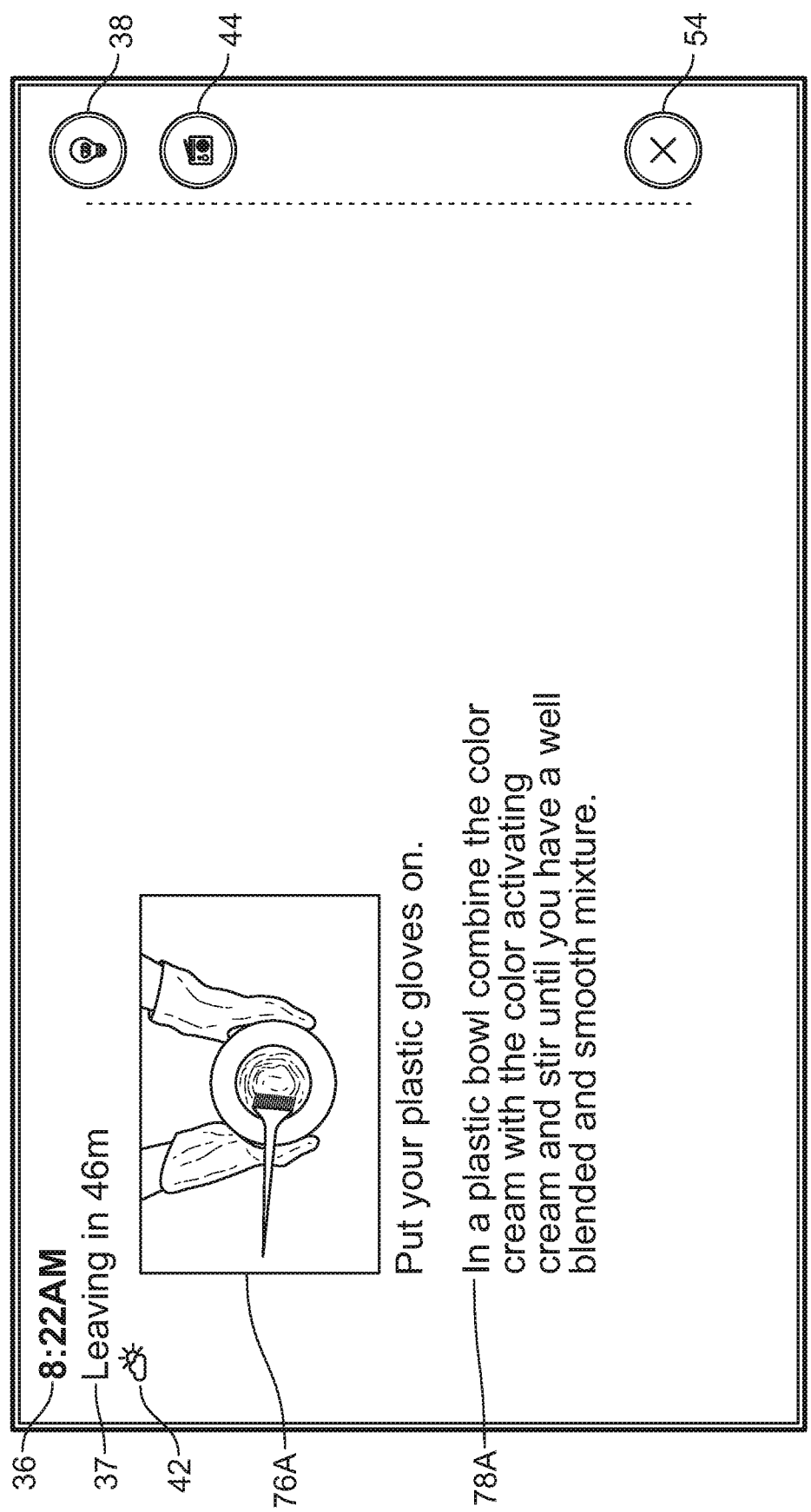
FIG. 20B is a view of a second step in a hair dying tutorial, according to some implementations of the present disclosure.
Figure 20C:
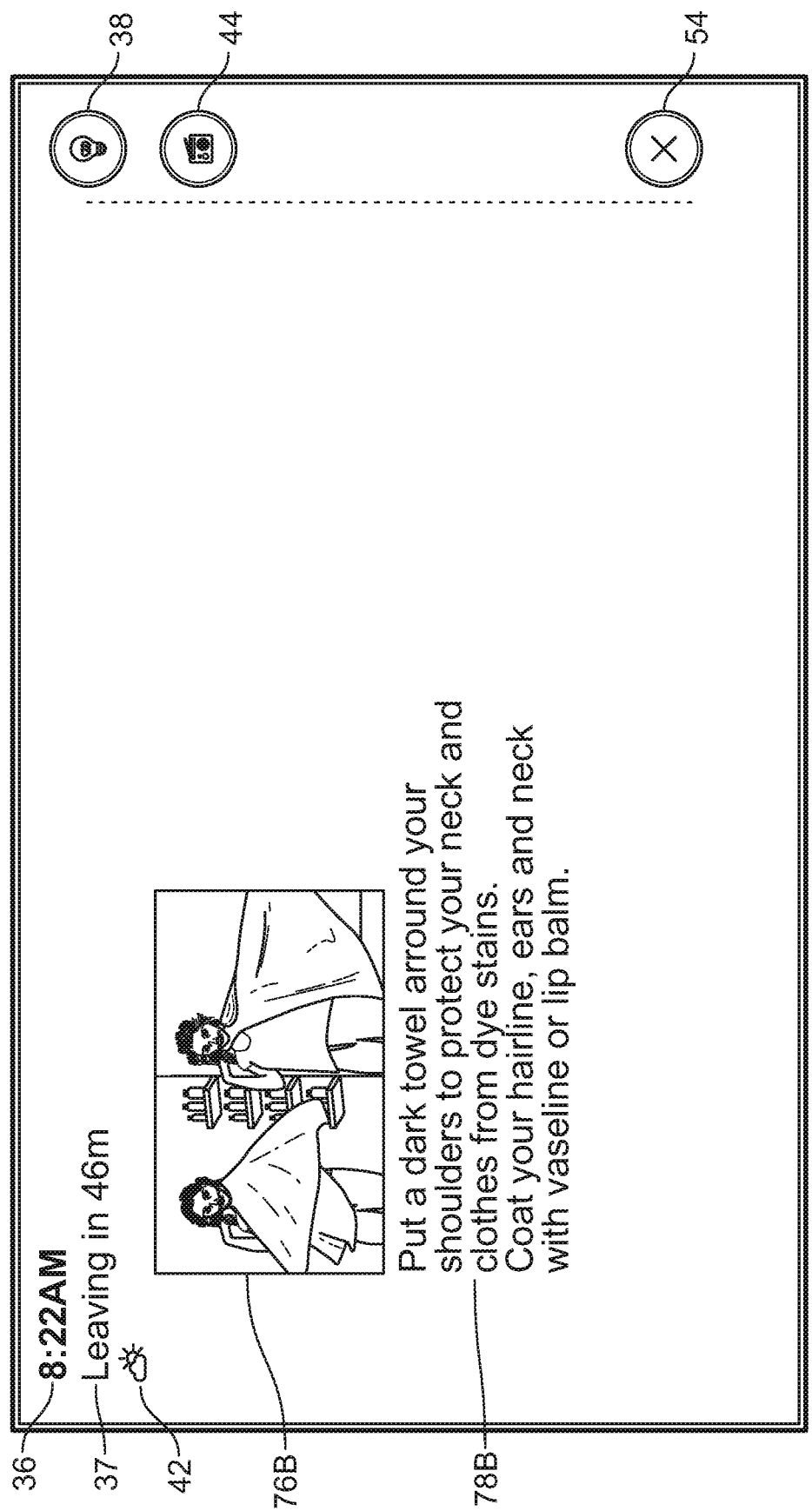
FIG. 20C is a view of a third step in a hair dying tutorial, according to some implementations of the present disclosure.
Figure 20D:
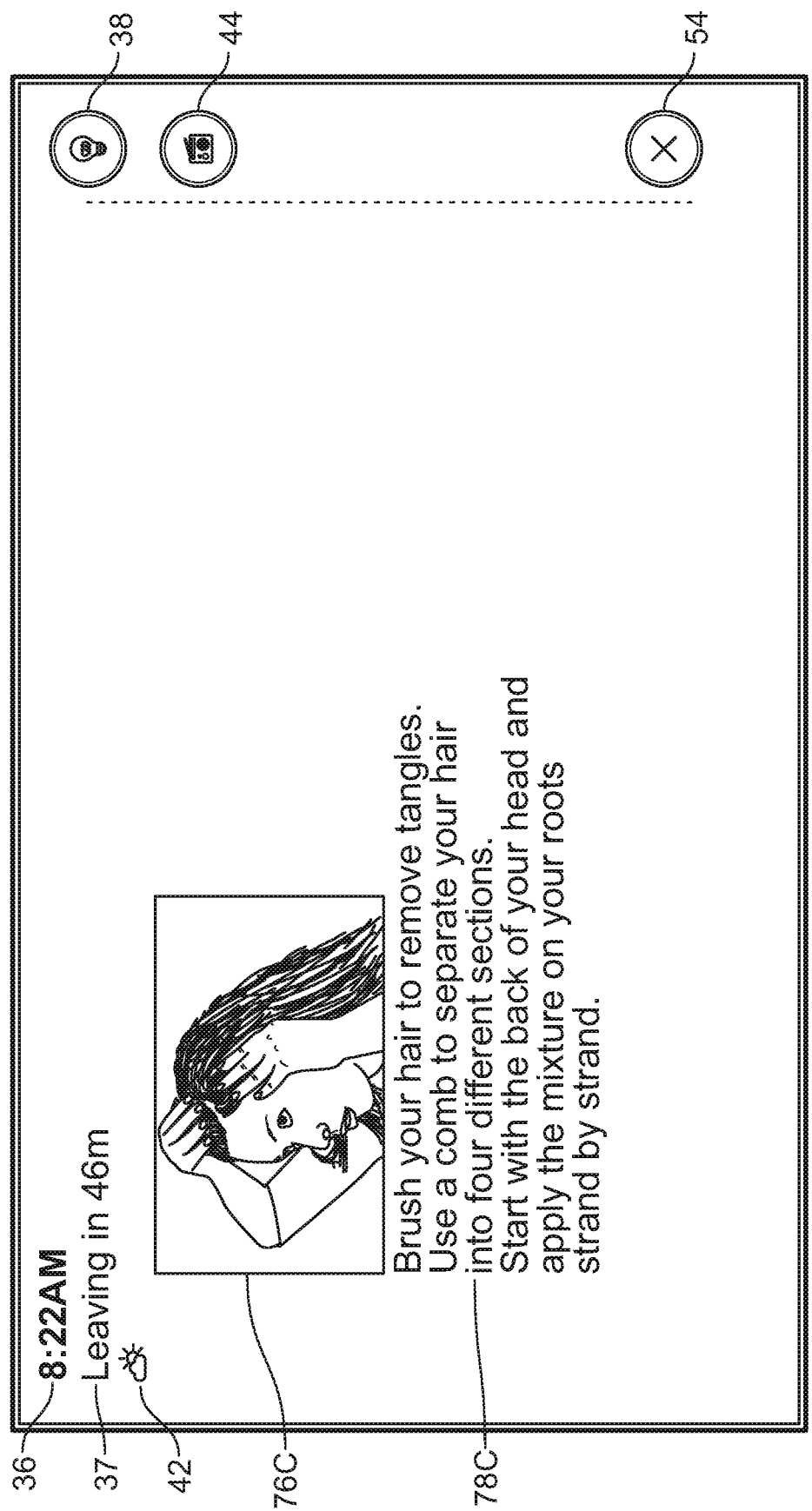
FIG. 20D is a view of a fourth step in a hair dying tutorial, according to some implementations of the present disclosure.
Figure 20E:
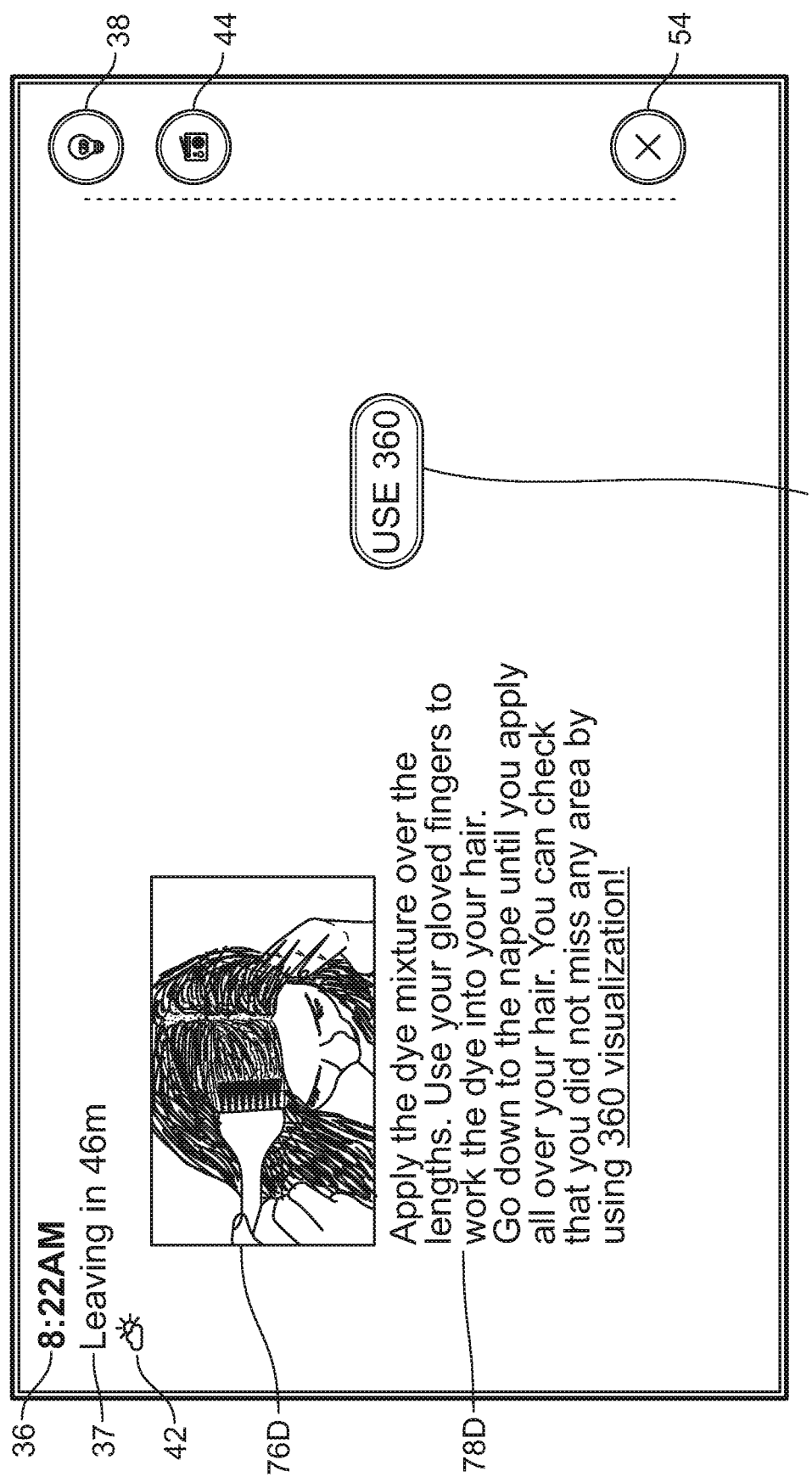
FIG. 20E is a view of a fifth step in a hair dying tutorial, according to some implementations of the present disclosure.

Once the user initiates the tutorial by interacting with the initiation icon 52, the display can show a number of images to the user showing them how to apply the hair dye. FIG. 20B illustrates the display displaying an image 76A to the user showing how to mix and prepare the hair dye, along with instructions 78A for mixing and preparing the hair dye. FIG. 20C illustrates the display displaying an image 76B to the user showing how to protect their skin and clothing from the hair dye, along with instructions 78B for protecting their skin and clothing from the hair dye. FIG. 20D illustrates the display displaying an image 76C of a user preparing their hair for the dying process, along with instructions 78C for preparing the user's hair for the dying process. FIG. 20E illustrates the display displaying an image 76D of a user applying the hair dye to their hair, along with instructions 78D for applying the hair dye. Finally, FIG. 20F illustrates the display displaying an image 76E of a user rinsing the hair dye out of their hair, along with instructions 78E for when and how to rinse the hair dye out of their hair. At this last step shown in FIG. 20F, the display can also show a timer 80 that indicates how much longer they need to keep the hair dye in their hair before the rinse it out. The system 10 may also include an alarm to indicate to the user when the timer 80 has reached zero and they can begin to rinse the hair dye from their hair. The alarm could be an audio alarm, a visual alarm, a combination thereof, or any other suitable type of alarm.

Figure 21A:
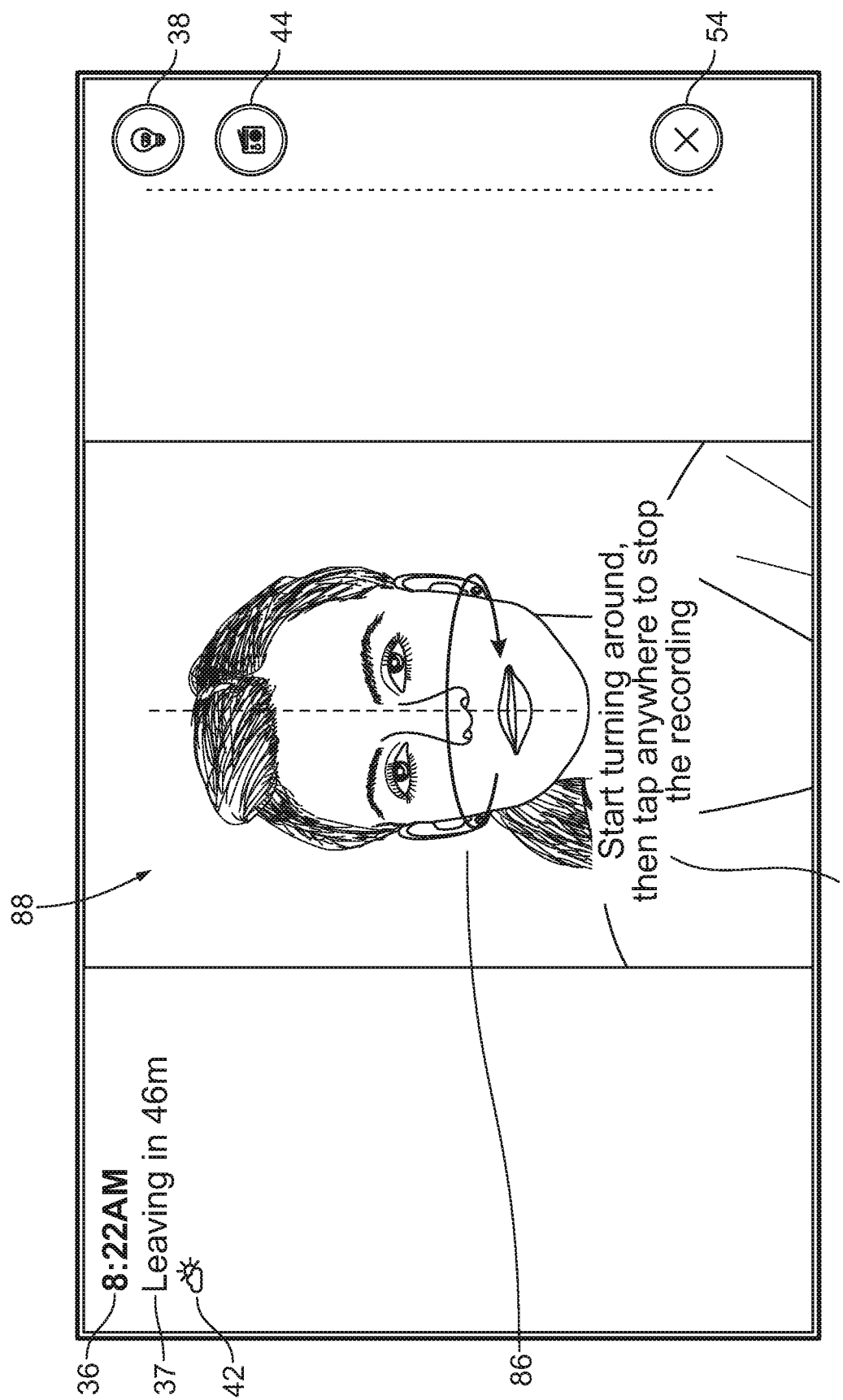
FIG. 21A is a view of the smart mirror system recording a 360° video of a user, according to some implementations of the present disclosure.
Figure 21B:
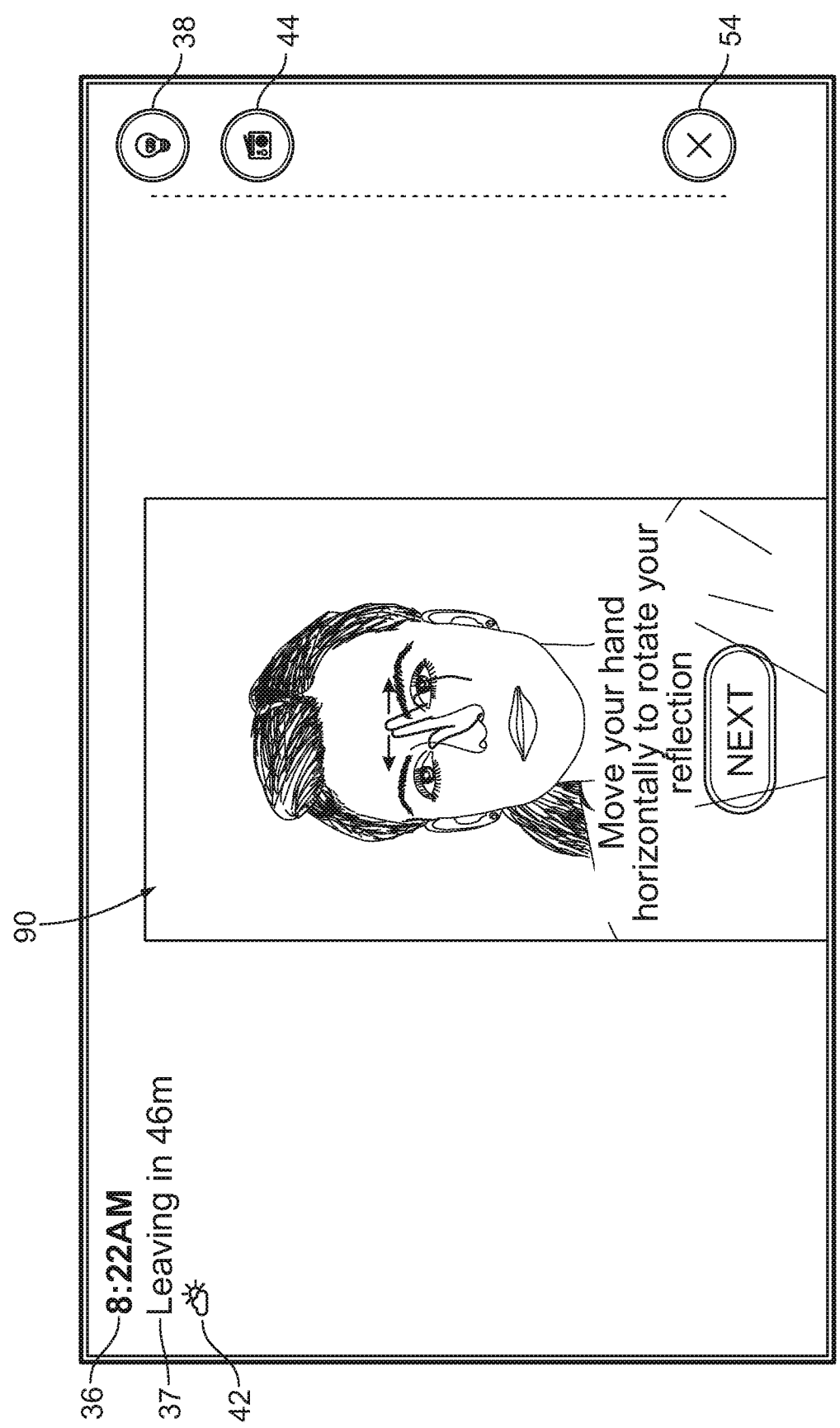
FIG. 21B is a view of the smart mirror system displaying a 3D model of the user, according to some implementations of the present disclosure.

As shown in FIG. 20E, the instructions 78D for applying the hair dye may also include a suggestion to use a 360° visualization feature. This is so that the user can ensure that they have applied the hair dye evenly on their entire head, including the back and sides. At this step, the display displays an icon 82 that the user can select to launch the 360° visualization feature, which is shown in FIGS. 21A and 21B. Once the visualization feature is launched, the camera 20 can begin recording the user, e.g., the camera 20 can begin generating image data that is reproducible as an image(s) or video of the user. At this point, the display can show a live video feed 88 of the user, along with text instructions 84 and pictorial instructions 86. The text instructions 84 can, for example, instruct the use to being turning around so that the camera 20 can record their head. The pictorial instructions 86 can include a looping arrow showing the user which direction to rotate. Once the recording has been completed, the display can display a 3D model 90 of the user based on the recorded video, as shown in FIG. 21B. This 3D model can be manipulated by the user to rotate and/or zoom in on various portions of the user's head.

While FIGS. 18A-21B show tutorials for eyeliner and hair dye, the system 10 can provide tutorials that are generally applicable to any type of product or application thereof. For example, the system 10 may provide tutorials for the application of makeup, application of moisturizer, application of hair dye, application of hair gel, application of shaving cream, shaving, brushing teeth, eyebrow waxing, waxing, eyebrow threading, threading, facials, ear cleaning, hair styling, application of contact lenses, application of facial masks, or any combination thereof. Moreover, any of the features described with respect to these figures or other figures can be utilized on conjunction with any type of tutorial, or for other non-tutorial applications that the system 10 may execute. For example, the 360° visualization feature can be used in conjunction with any taken by the user or application executed by the system 10, not just for a hair dying tutorial.

Figure 22A:
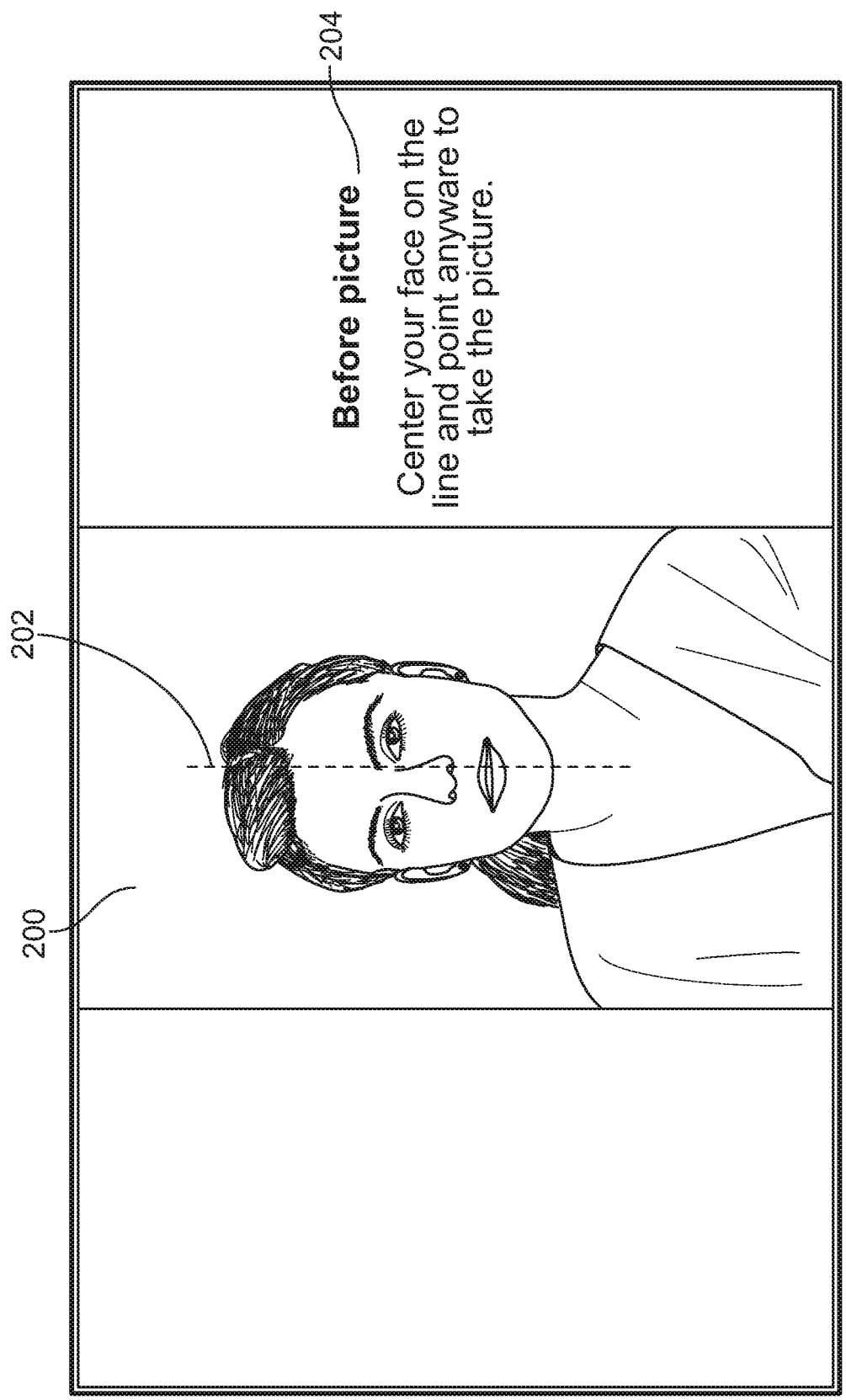
FIG. 22A is a view of the smart mirror system capturing a before image of the user, according to some implementations of the present disclosure.
Figure 22B:
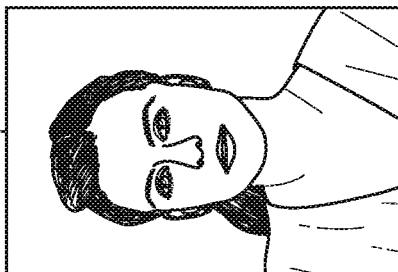
FIG. 22B is a view of the smart mirror system displaying the before image to the user, according to some implementations of the present disclosure.

Referring now to FIGS. 22A-22H, the system 10 can also execute applications that allow the user to view modified images of themselves based on the modification of different characteristics of the user. For example, the user can view images of themselves that show what they may look like after the application of different types of products or procedures, for example applying different hair dye or getting different hair styles. As part of this process, the system 10 can capture a "before" image, as shown in FIG. 22A. Here, the display can display a real-time video feed 200 on the display that includes the user. The display can also include a centering indicia 202 that shows the user where to position themselves to capture a high-quality before image. The purpose of the centering indicia 202 is to ensure that any images that the system 10 captures of the user all show the user in the same location. The display also displays instructions 204 for capturing the before image. Once the user instructs the system 10 to capture the before image (for example via physical interaction with the display or via voice activation), the display can show the before image 206 as shown in FIG. 22B. The display also displays an initiation icon 52 that allows the user to begin selecting different types of products or procedures to apply.

As shown in FIG. 22C, the display can show a plurality of user-selectable options 210A-210H. Each of the user-selectable options 210A-210H are associated with a unique modification of a first characteristic related to the user. In this example, that characteristic is hair color, and each individual user-selectable option 210A-21H is associated with a unique proposed modification of that characteristic, e.g. different hair colors. Each of the user-selectable options 210A-210H can also include an image showing the different proposed modifications. In some implementations, the images may show an image of a person with that proposed modification. In other implementations, the images may show some sort of indicia representing the proposed modification.

Along with the user-selectable options 210A-210H, the display can show the before image 206. Once the system 10 receives via an input device a selection from the user of one of the options 210A-210H, the display can show a modified image 208 that shows the user with the proposed modification of the characteristic corresponding to the selected option. In this example, the modified image 208 shows the user with the hair color corresponding to the selection option. In some implementations, the display shows a real-time video feed of the user that is modified in real-time as different modifications (e.g. hair colors) are selected by the user. If the user likes any of the proposed modifications, they can tap or interact with the icon 212 to note that. Once the user has identified at least one proposed modification that they like, they can tap the confirmation icon 214 to proceed to the next stage. In other implementations, the system 10 can display a prior image of the user captured the last time the user modified the first characteristic the same as a selected option. This allows the user to check their own history to determine which modification they like.

In some implementations, instead of displaying the options 210A-210H for the user to select, the system 10 can identify an object that the user is holding and show the modified image 208 based on that identification. For example, the system 10 can determine that the user is holding a certain color hair dye, and can produce the modified image 208 that shows the user with hair the color corresponding to the identified hair dye.

Figure 22D:
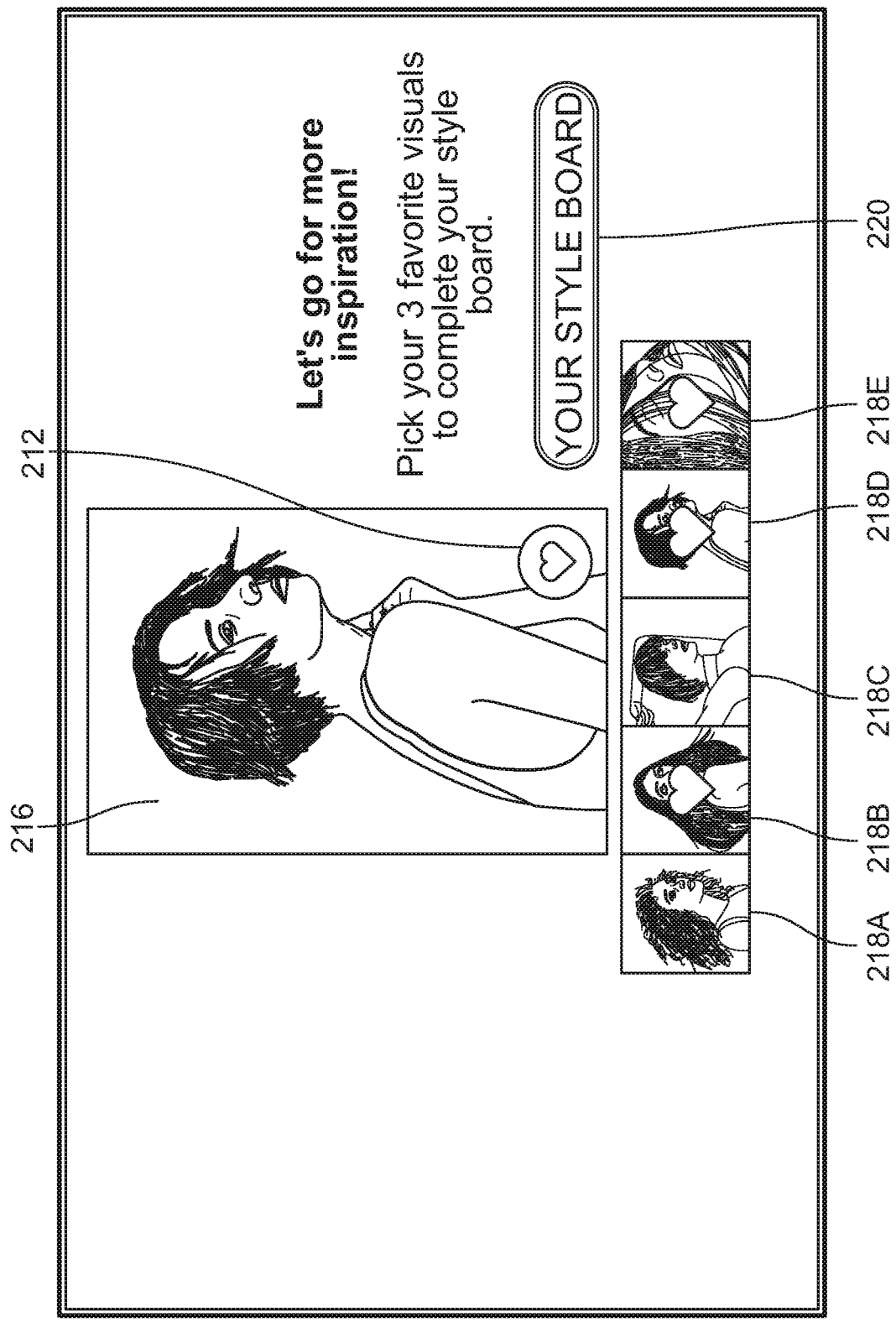
FIG. 22D is a view of the smart mirror system displaying a second plurality of user-selectable options associated with a second characteristic of the user where each user-selectable option represents a unique proposed modification to the second characteristic, according to some implementations of the present disclosure.

As shown in FIG. 22D, the display can then display a second set of user-selectable options 218A-218E that correspond to unique proposed modifications of a second characteristic related to the user. In this implementation, the second characteristic is hair style. Each of the second set of options 218A-218E can include an image showing the proposed modification, or some other indicia. As the user selects different hair styles, the display can show an image 216 of a person with that hair style. Generally, depending on what the second characteristic of the user is, the system 10 may not be able to show a still or real-time image/video of the user with the proposed modification to that characteristic. For example, it may be difficult for the system 10 to show a modified still image or real-time video of the user with a different hair color. However, the system 10 can instead just show stock images or videos of a person with that hair style.

Figure 22E:
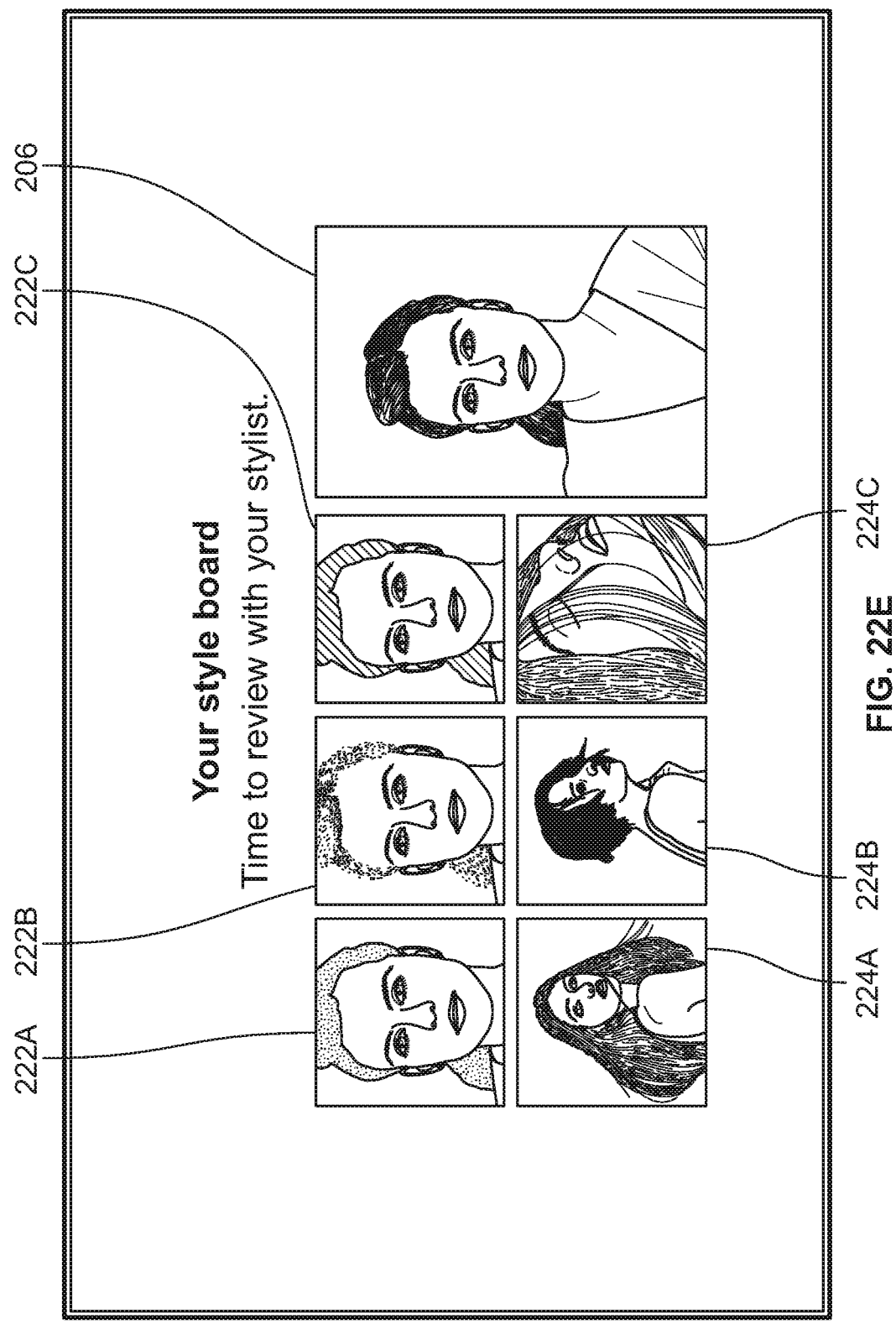
FIG. 22E is a view of the smart mirror system displaying a plurality of potential modifications to the first characteristic, a plurality of potential modifications to the second characteristic, and the before image, according to some implementations of the present disclosure.
Figure 22F:
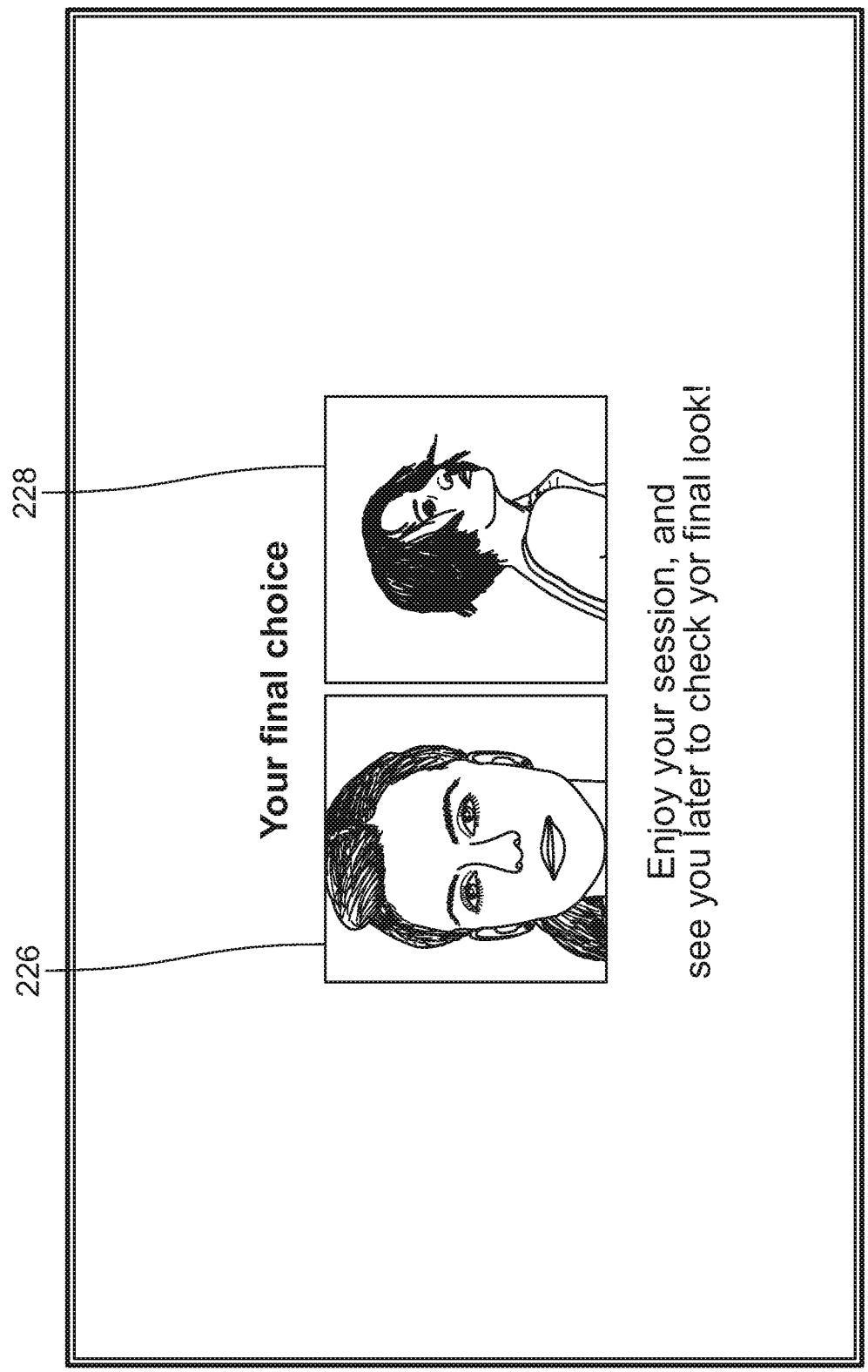
FIG. 22F is a view of the smart mirror system displaying a selected modification to the first characteristic and a selected modification to the second characteristic, according to some implementations of the present disclosure.

After the user has selected at least one of options 218A-218E to the second characteristic using the icon 212, the user can interact with the icon 220 to move to the stage illustrated in FIG. 22E. Here, the display can show the before image 206 of the user, along with a plurality of images 222A, 222B, 222C that show the user in their before image 206 but with the selected modifications to the first characteristic. The display can also show images 224A, 224B, 224C that correspond to the selected modifications to the second characteristic. The images 224A, 224B, 224C can be images of other people. After reviewing the options for modification of the first and second characteristic, the system 10 can display an image 226 showing the desired modification to the first characteristic and an image 228 showing the desired modification to the second characteristic, as shown in FIG. 22F.

Figure 22G:
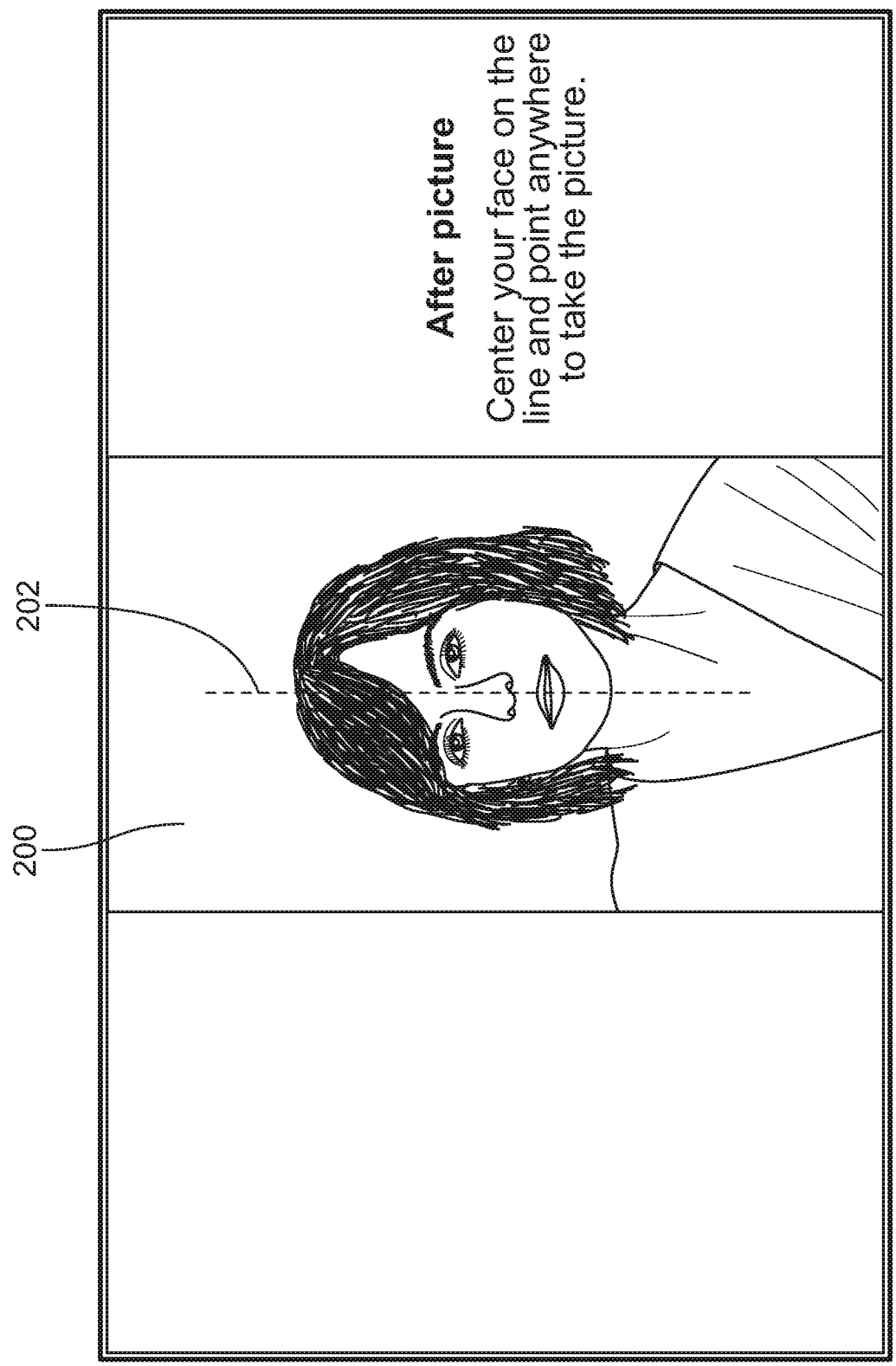
FIG. 22G is a view of the smart mirror system capturing an after image of the user, according to some implementations of the present disclosure.
Figure 22H:
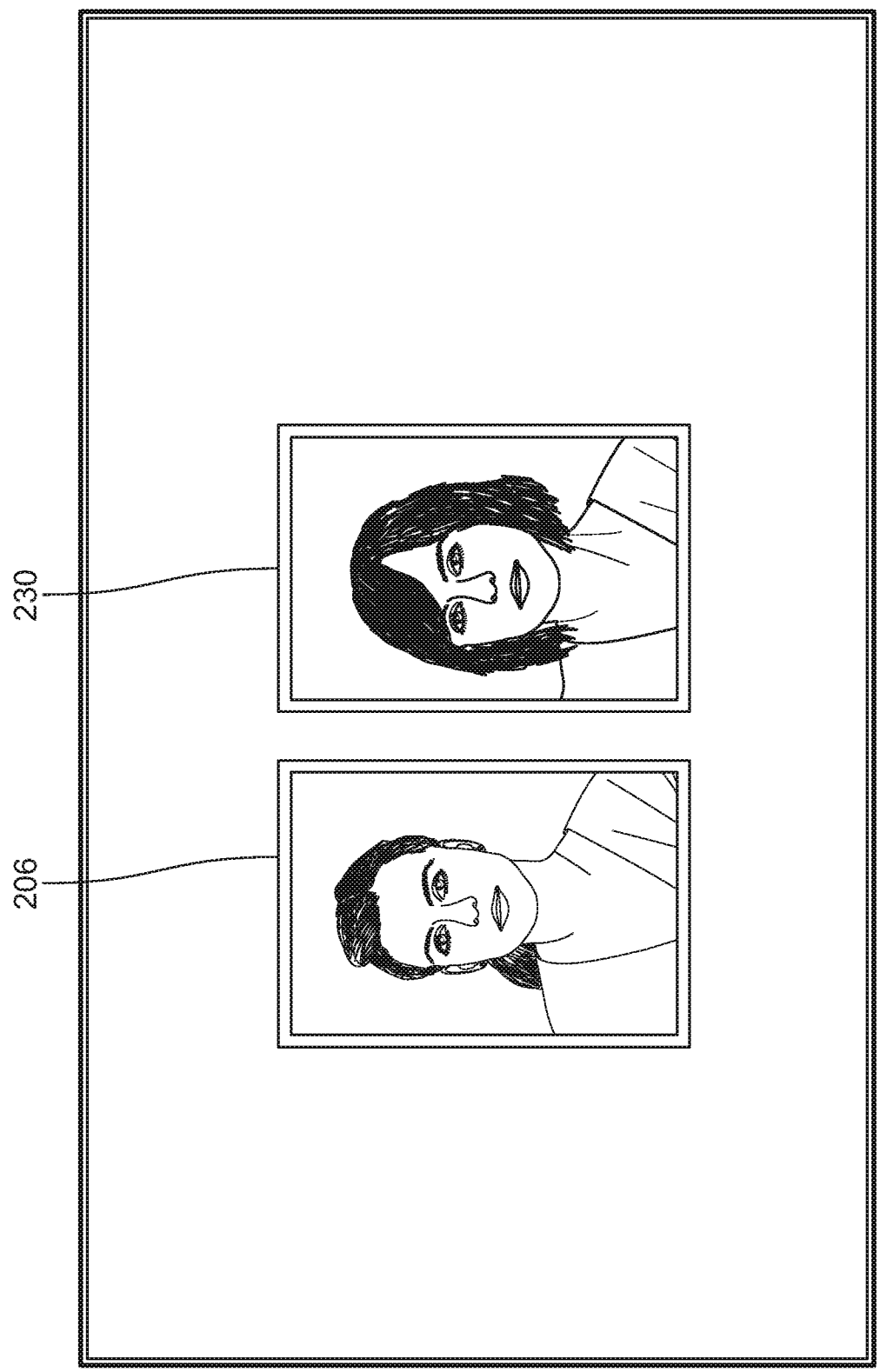
FIG. 22H is a view of the smart mirror system displaying both the before image of the user and the after image of the user, according to some implementations of the present disclosure.

As illustrated in FIG. 22G, once the user has actually undertaken the selected modifications to the characteristics (e.g. they have dyed and cut their hair), the system 10 can obtain an "after" image 230. As shown, the display can show the real-time video feed 200 and the centering indicia 202. The centering indicia 202 ensures that both the before image 206 and the after image 230 will show the user from the same angle. Once the system 10 captures the after image 230, the system 10 can show the before image 206 and the after image 230 side-by-side to allow the user to compare them. The system 10 may also be able to use the before image 206 and after image 230 to train itself to better show the proposed modifications to the user's characteristics. For example, the system 10 can compare the image it generated to show a potential modification with the actual image of the user after they have undergone that modification. The system 10 can identify any differences and use that to improve its generation of the modified images in the future.

The features discussed in connection with FIGS. 22A-22H can generally be used in connection with any type of activity and generally in any combination. For example, these features can be used with activities other than cutting or dying the user's hair, such as applying makeup. Moreover, for any characteristic of the user, the display can show images that illustrate a variety of different modifications to that characteristic. The images can either be modified images of the user him or herself, or can be images of other people showing the modification.

The system 10 can also maintain a photo history of the user's activities. In one implementation, the display can show the before and after images to the user after they complete the activity (e.g. applying the makeup or other substance) so they can examine how well they performed the activity. In another implementation, the display can show to the user past results from applying makeup or other substances. This can allow the user to examine their past applications and determine whether they made any errors that they need to try and avoid. This also allows the user to check their history to determine which types of activities they might want to repeat (e.g., a past haircut that the user would like to have again).

Referring now to FIG. 23, the system 10 is configured to allow the user to adjust the light emitted by the light sources via taps or swipes. In an example, the display shows instructions 232 to the user for adjusting the color. Horizontal icons 234A and 234B can be manipulated (by tapping on the icons or swiping across the icons) to adjust a property of the light, such as brightness, warmth, color, temperature, etc. Vertical icons 236A and 236B can also be manipulated in the same fashion. In some implementations, horizontal icons 234A and 234B can be used to adjust a first property of the emitted light (e.g. brightness), while the vertical icons 236A and 236B are used to adjust a second property of the emitted light (e.g. color).

In some implementations, the display 14 displays a virtual power button to the user when in a rest mode or an off mode. When the user interacts with the virtual power button, the system 10 wakes up or turns on. The user can interact with this virtual power button by touching the surface of the mirror 12 (or moving their finger into close proximity with the surface of the mirror 12) where the virtual power button is displayed. In other implementations, the system 10 includes a physical power button that the user may interact with. In still other implementations, the system 10 includes a proximity sensor that is configured to detect when the user has placed his or her finger near within a threshold distance of the user-side surface of the mirror 12 for at least a specified time period. Detection of this causes the system 10 to wake up or turn on.

In some implementations, the system 10 can execute an application to test the user's eyesight or other properties related to the user's eyes. This application can be launched manually by the user. However, the system 10 may also launch the application automatically upon detecting that the user is experiencing difficulties with their eyesight. People whose eyesight is deteriorating will often begin to squint more than they normally do. The system 10 can be configured to detect the user squinting, for example, by detecting wrinkles that appear on the user's face near their eyes when they squint. The system 10 may also detect that the user is squinting in other ways. Once the application is launched, the system 10 can perform a variety of eyesight tests for the user, for example by displaying a series of numbers and/or letters that get increasingly small, and having the user identify which series they can still see properly.

In some implementations, the system 10 can execute a stretching application. As a part of this application, the system 10 can detect the user's posture (whether sitting, standing, walking, running, jumping, etc.) and recommend exercises to improve the user's posture.

Figure 24B:
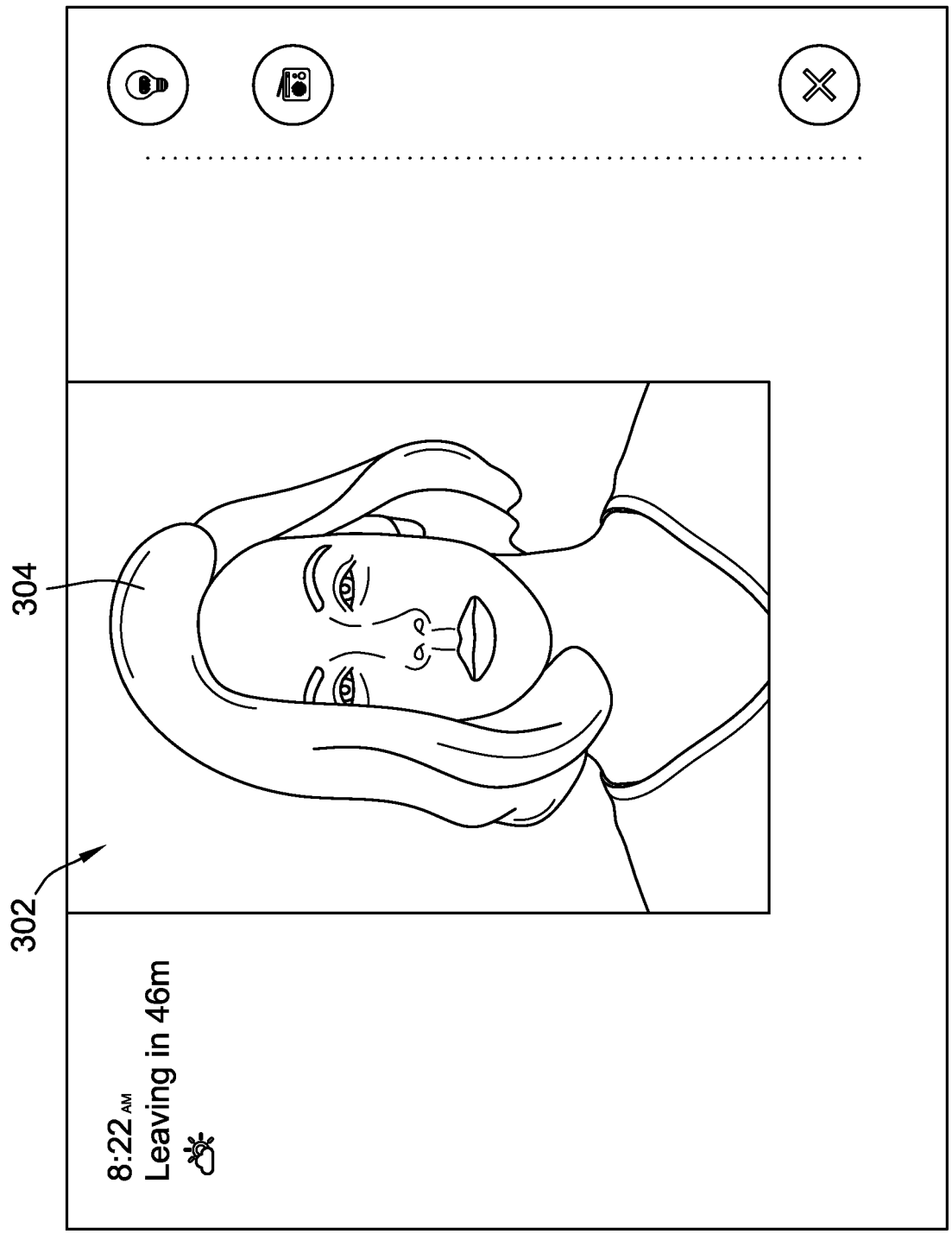
FIG. 24B is a view of the smart mirror system showing a real-time video feed of the user.

FIGS. 24A-24D show an augmented reality application the system 10 can execute, similar to that shown in FIG. 22C. The augmented reality application can cause the display 14 to show to the user various modified images or videos of themselves. For example, the user may be holding a beauty product that is capable of being applied to a person (e.g., lipstick, eye shadow, hair dye, etc.). The display 14 can continuously display a real-time video feed of the user (or a portion of the user) that shows the user as if they had applied the beauty product to themselves. FIG. 24A shows the system 10 in a standby mode. In the standby mode, no images or videos of the user or the surrounding area are shown in the display 14. Various other icons may be shown on the display 14 however. In the standby mode, any objects in front of the mirror 12 would generally be visible as a reflection in the mirror 12, as the display 14 generally does not display anything when the system 10 is in the standby mode.

FIG. 24B illustrates a view of the system 10 once a user has walked near the system 10 in front of the mirror 12. In this view, the display 14 is continuously showing a real-time video feed 302 of a user 304. However, the display 14 could also be off such that the user 304 simply sees his or her reflection in the mirror 12. In some implementations, the system 10 constantly monitors the area surrounding the mirror 12 using the camera 20, such that the display 14 automatically displays the video feed 302 of the user 304 once the user 304 walks in front of the mirror 12, or after a certain time period following the user 304 walking in front of the mirror 12. In other implementations, the user 304 must activate the system 10 or wake the system 10 from the standby mode in order to see the video feed 302 of themselves in the display 14. In either implementation, the user 304 may view their reflection in the mirror 12 prior to the display 14 activating and the display 14 showing the real-time video feed 302 of the user 304.

Figure 24C:
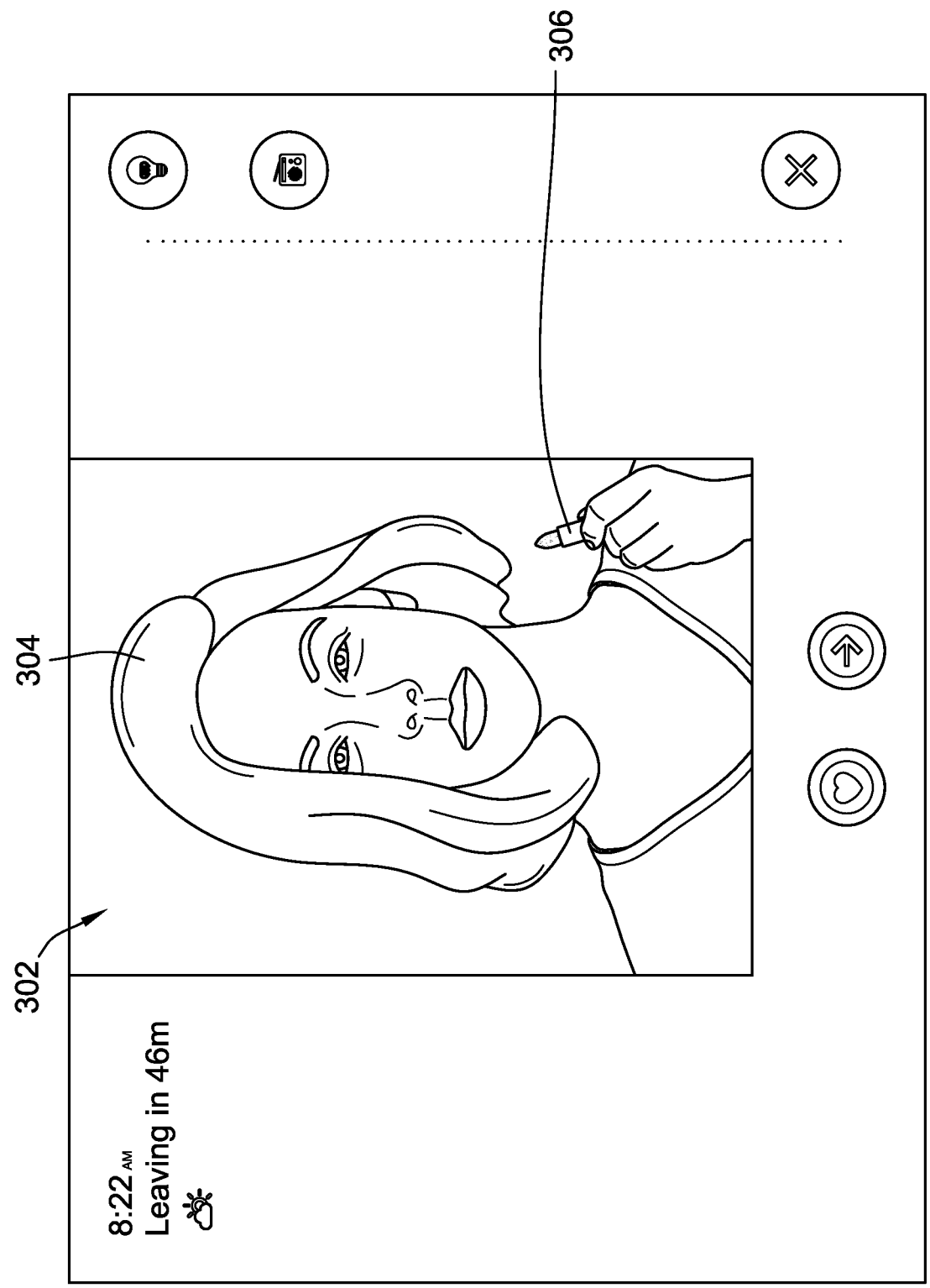
FIG. 24C is a view of the smart mirror system showing the real-time video feed of the user holding an object.

FIG. 24C shows the user 304 holding up an object 306 in the field of view of the camera 20. The processor 22 of the system 10 runs the object recognition (OR) algorithm, either continuously, or upon some sort of command from the user (e.g., a voice command, a touch command, a gesture command, etc.), in order to detect and recognize the object 306 that the user 304 is holding. Similar to FIGS. 17A and 17B, the system 10 can recognize the object 306 using the data generated by the camera 20. The OR algorithm can also detect specific characteristics of the object 306. For example, if the OR algorithm detects that the user 304 is holding a tube of lipstick, the OR algorithm can identify the brand and color of the lipstick that the user 304 is holding. The OR algorithm can also be used to detect other types of objects 306 that the user 304 may be holding, as described herein.

Figure 24D:
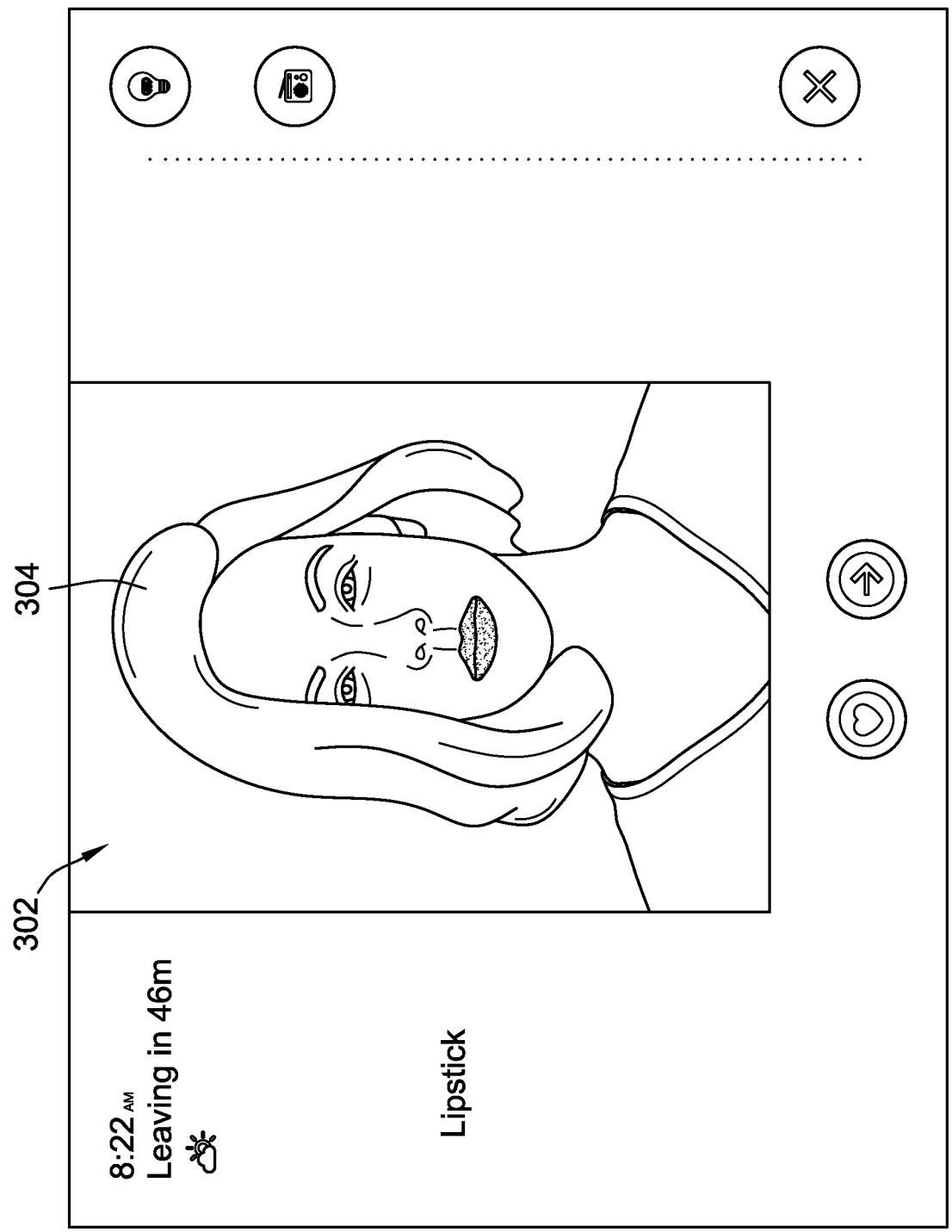
FIG. 24D is a view of the smart mirror system showing a modified real-time video feed of the user based on the identified object.

Once the system 10 has identified the object that the user 304 is holding, the display 14 can modify the continuously displayed real-time video feed 302 of the user 304 based on the identified object 306. FIG. 24D shows a view of the system 10 where the system 10 has modified the continuously displayed real-time video feed 302 of the user 304 of FIG. 24C. In FIG. 24C, the video feed 302 on the display 14 shows the user 304 and the portion of the area surrounding the user 304. In the modified video feed in FIG. 24D, both a modified portion of the user 304 and an unmodified portion of the user 304 are shown. The modified portion appears as if the user 304 applied the lipstick to their lips. The unmodified portion of the user 304 appears normal. Thus, the system 10 modifies the continuously display real-time video feed 302 of the user 304 such that the video feed 302 of the user 304 shows the user 304 as if they used the object that the OR algorithm detected they were holding. For example, if the object 306 is a beauty product that can be applied to the user 304, the modified video feed 302 of the user 304 will show the user 304 as if they had applied the beauty product to themselves. The display 14 can display an indication to the user 304 of what the object is. In the implementation illustrated in FIG. 24C, the display 14 displays the word "Lipstick."

In some implementations, the modified video feed 302 of the user 304 shows both the modified portion of the user 304 and the unmodified portion of the user 304. The user 304's entire face and head are thus shown on the display 14. In this implementation, the light emitted from the display 14 through the mirror 12 toward the user 304 is stronger than the light reflected off of the mirror 12 back toward the user 304, and thus the user 304 sees the both the modified portion and the unmodified portion of themselves in the real-time video feed 302 on the display 14. In other implementations, the display 14 only shows the modified portion of the user 304, while the unmodified portion of the user 304 (e.g., the rest of the user 304's face and/or head) is shown as a reflection in the mirror 12. For example, if the system 10 shows the user 304 what the user 304 would look like if they applied lipstick, the display 14 may only show the user 304's lips colored the same color as the lipstick, with the rest of the display 14 being dark. The display 14 will show the user 304's lips at a location that is generally aligned on the mirror 12 with the user 304's actual lips. The user 304 will thus see the modified version of their lips in the display 14 at a location aligned with where they would normally instead see the reflection of their un-augmented lips. Thus, the user 304 will see (1) the modified portion of themselves (e.g., their lips) on the real-time video feed 302 on the display 14 through the mirror 12, and (2) the unmodified portion of themselves (e.g., their face and head except for their lips) as a reflection in the mirror 12.

The system 10 can show real-time video feeds 302 of the user 304 that are modified in a variety of ways. For example, the modified video feed 302 of the user 304 can show: (1) the user 304 wearing glasses, (2) the user 304 not wearing glasses if the user 304 normally does wear glasses, (3) the user 304 with a different hair color, (4) the user 304 with a different hair style, (5) the user 304 with their face shape retouched or altered, (6) the user 304 with abnormalities on their skin (such as freckles or acne) removed, (7) the user 304 with a modified complexion (e.g. with a tan or a sunburn), or (8) any other suitable or desired modification.

In some implementations, the modified video feed 302 is displayed automatically upon detecting the object 306 the user 304 is holding. In other implementations, the modified video feed 302 is displayed responsive to the system 10 receiving or identifying some type of prompt, such as a user-selection of a displayed user-selectable icon, a voice command, or user-actuation of a physical trigger mechanism (such as a button or touch-sensitive controller). The prompt could also be bringing the object 306 into a field of view of the camera 20 so that the system 10 can detect and identify the object 306. In some implementations, the ambient conditions in the room where the user 304 is located (such as light, temperature, humidity, etc.), the local weather conditions, or a change in the ambient conditions or local weather conditions can also serve as the prompt to the system 10 to modify the real-time video feed 302 of the user 304. Moreover, the actual modification shown by the modified video feed 302 can be based on something other than the identification of an object 306 being held by the user 304. For example, the prompt received or identified by the system 10 that causes the display 14 to display the modified video may also select what type of modification to show in the modified video. The modification in the modified video can also be based on the ambient conditions in the room where the user 304 is located, the local weather conditions, or any other suitable mechanism.

Generally, the system 10 must be able to generate image data of the user, process the image data, and modify the continuously displayed video feed of the user in real time or near real time. This time period is known as the system 10's response time. Generally, the system 10 can process the image data and modify the video feed in about 20 milliseconds. Thus, for example, when the user 304 moves within the field of view of the camera 20, the user 304's new location is shown on the display 14 within about 20 milliseconds or less. In other implementations, the response time of the system 10 may be less than about 20 milliseconds, between about 5 milliseconds and 20 milliseconds, between about 10 milliseconds and about 20 milliseconds, or less than about 10 milliseconds. In other implementations, the system 10 can process the image data and modify the video feed of the user 304 within about 50 microseconds. between about 10 microseconds and about 50 microseconds, between about 20 microseconds and about 40 microseconds, between about 10 microseconds and about 30 microseconds, or about 20 microseconds. In still other implementations, the system 10 processes the image data and modifies the video feed within about 1 second or less. As used herein, the term "real-time" as used at least in connection with the continuously displayed video feed of the user, refers to implementations where the system 10 processes image data and modifies the video feed of the user within the time frames or periods discussed herein.

In implementations where the display 14 only shows the modified portion of the user 304 in the real-time video feed 302, the response time of the system 10 can be reduced. Because the processor(s) 22 of the system 10 need only to process image data corresponding to the portion of the user 304 that is being modified in the video feed 302, the modification of the video feed 302 generally takes less time than if a video feed 302 of all of the user 304 (or even a larger portion of the user 304) was being modified.

When processing the image data generated by the camera 20, the system 10 can flip the resulting image or video feed 302 of the user 304 about a vertical axis so that the resulting image or video feed 302 matches what the user 304 will see in the mirror 12. Because the user 304's reflection in the mirror 12 is flipped about a vertical axis, a normal image or video feed captured by a camera 20 and displayed on a display 14 would not match the user 304's reflection. Thus, the image or video feed 302 that is displayed on the display 14 is flipped about a vertical axis to match the reflection in the mirror 12.

The system 10 can also be used to determine the mood of the user 304 and take actions to alter or improve the user 304's mood. In one implementation, the system 10 can determine if the user 304 has a negative mood by detecting certain actions or characteristics of the user 304. For example, the system 10 could detect when the user 304 is frowning, when the user 304 is slouching their shoulders, when the user 304 is hanging their head, or any other suitable action that may indicate a negative mood. After detecting a negative mood, the system 10 can take a number of actions to try to improve the user 304's mood. For example, the system 10 could play a favorite song of the user 304, improve the ambient lighting in the area surrounding the user 304, show the user 304 a stored photo or video of a positive memory, show the user 304 desirable local weather conditions (current or future), show a modified video of the user 304 with some desirable feature, or any other suitable action.

In another implementation, the system 10 can determine if the user 304 has a positive mood, for example by detecting the user 304 smiling, or by detecting any other actions associated with a positive mood. The system 10 can store information about why the user 304 is in a positive mood, which can be used in the future to try and improve the user 304's negative mood.

In still other implementations, the system 10 can act as an advisor or motivator after detecting various characteristics or features of the user 304. For example, if the system 10 knows or detects that the user 304 has gained weight, the system 10 could suggest to the user 304 that they exercise more frequently, take more daily steps, eat healthier, etc. In another example, the system 10 could show the user 304 a modified video or photo of themselves either in shape or out of shape, in an attempt to motivate the user 304. In a further example, the system 10 may detect if the user 304 is not getting enough sleep by monitoring for dark circles under the user 304's eyes, excessive yawning, etc., and suggest to the user 304 that they get more sleep. In yet another example, the system 10 may detect if the user 304 is having difficulty seeing, such as by detecting that the user 304 is squinting or opening their eyes excessively wide more than usual. The system 10 could administer an eye test, and/or suggest that the user 304 visit an eye doctor to obtain glasses or contacts.

While the present disclosure has been described with reference to one or more particular implementations, those skilled in the art will recognize that many changes may be made thereto without departing from the spirit and scope of the present disclosure. Each of these implementations and obvious variations thereof is contemplated as falling within the spirit and scope of the present disclosure. It is also contemplated that additional implementations according to aspects of the present disclosure may combine any number of features from any of the implementations described herein.

ALTERNATIVE IMPLEMENTATIONS

Alternative Implementation 1. A system comprising: a mirror having a first side and an opposing second side, the mirror being configured to permit a first portion of light incident on the first side to transmit therethrough and to permit a second portion of the light incident on the first side to reflect therefrom; an electronic display positioned adjacent to the second side of the mirror such that the electronic display is at least partially visible through the first side of the mirror responsive to the electronic display being at least partially activated; one or more sensors positioned generally about a periphery of the mirror and being configured to detect a presence of and a relative location of an object positioned adjacent to the first side of the mirror; a light source configured to produce light and at least partially aid in illuminating the object responsive to the object being adjacent to the first side of the mirror; and a camera positioned adjacent the second side of the mirror, the camera being configured to detect the object.

Alternative Implementation 2. The system of Alternative Implementation 1, further comprising one or more processors configured to adjust a color or an intensity of the light source.

Alternative Implementation 3. The system of Alternative Implementation 1, wherein the light source includes one more light-emitting diodes.

Alternative Implementation 4. The system of Alternative Implementation 1, wherein the mirror has a first axis and a second axis perpendicular to the first axis, and wherein the one or more sensors are configured to detect a first axial position of the object relative to the first axis of the mirror and a second axial position of the object relative to the second axis of the mirror.

Alternative Implementation 5. The system of Alternative Implementation 4, wherein the one or more sensors includes a first set of one or more transmitters disposed along a first portion of the mirror parallel to the first axis and a first set of one or more receivers disposed along a second opposing portion of the mirror parallel to the first axis, the first set of one or more transmitters and the first set of one or more receivers configured to detect the first axial position of the object.

Alternative Implementation 6. The system of Alternative Implementation 5, wherein the one or more sensors includes a second set of one or more transmitters disposed along a third portion of the mirror parallel to the second axis and a second set of one or more receivers disposed along a fourth opposing portion of the mirror parallel to the second axis, the second set of one or more transmitters and the second set of one or more receivers configured to detect the second axial position of the object.

Alternative Implementation 7. The system of Alternative Implementation 6, wherein the first axis is a vertical axis and the second axis is a horizontal axis.

Alternative Implementation 8. The system of Alternative Implementation 6, wherein at least a portion of the one or more sensors is disposed within a sensor frame that is coupled to the periphery of the mirror.

Alternative Implementation 9. The system of Alternative Implementation 1, further comprising one or more processors configured to cause the display to aid in illuminating the object by activating at least a portion of the display.

Alternative Implementation 10. The system of Alternative Implementation 9, wherein the one or more processors are configured to activate the portion of the display responsive to at least one of the one or more sensors detecting the presence and relative location of the object positioned adjacent to the first side of the mirror.

Alternative Implementation 11. The system of Alternative Implementation 9, wherein the activated portion of the display includes a ring-shaped configuration such that the activated portion of the display is generally aligned with an outer periphery of the object.

Alternative Implementation 12. The system of Alternative Implementation 11, wherein the activated portion of the display substantially encloses a non-activated portion of the display, the non-activated portion of the display being generally aligned with an interior of the outer periphery of the object.

Alternative Implementation 13. The system of Alternative Implementation 9, wherein the activated portion of the display has a shape that corresponds to a shape of the object.

Alternative Implementation 14. The system of Alternative Implementation 9, wherein the object is a face, and wherein the display is caused to be activated responsive to the face being located within a threshold distance from the mirror.

Alternative Implementation 15. The system of Alternative Implementation 14, wherein the threshold distance is less than about five inches.

Alternative Implementation 16 The system of Alternative Implementation 1, further comprising an ambient light sensor configured to detect an ambient light condition.

Alternative Implementation 17. The system of Alternative Implementation 16, further comprising one or more processors configured to determine a difference between the detected ambient light condition and a desired light condition.

Alternative Implementation 18. The system of Alternative Implementation 17, wherein at least one of the one or more processors is configured to adjust the light produced by the light source based on the determined difference between the detected ambient light condition and the desired light condition, such that the ambient light condition and the light produced by the light source combine to cause the object to be illuminated according to the desired light condition.

Alternative Implementation 19. The system of Alternative Implementation 16, wherein the ambient light sensor is included in the camera.

Alternative Implementation 20. The system of Alternative Implementation 1, wherein the display is configured to display one or more user-selectable icons visible to a user through the mirror, and wherein one or more processors are configured to adjust the light produced by the light source responsive to a selection of one of the one or more user-selectable icons.

Alternative Implementation 21. The system of Alternative Implementation 1, wherein the display is configured to display real-time video images captured by the camera.

Alternative Implementation 22. The system of Alternative Implementation 1, further comprising one or more processors configured to execute a first application, the display being configured to display a first type of information related the first application.

Alternative Implementation 23. The system of Alternative Implementation 22, wherein the camera is configured to monitor an area adjacent to the first side of the mirror, and wherein at least one of the one or more processors is configured to identify the object.

Alternative Implementation 24. The system of Alternative Implementation 23, wherein responsive to the identification of the object, at least one of the one or more processors is configured to cause the display to display a second type of information related to the first application, the second type of information being (i) different from the first type of information and (ii) based on the identified object.

Alternative Implementation 25. The system of Alternative Implementation 23, wherein responsive to the identification of the object, at least one of the one or more processors is configured to execute a second application different from the first application, the second application being based on the identified object.

Alternative Implementation 26. The system of Alternative Implementation 1, wherein the object is a toothbrush, a razor, a comb, a makeup implement, a face of a user, or any combination thereof.

Alternative Implementation 27. A method of modifying execution an application, comprising: providing an electronic display device and a mirror, the mirror having a first side and an opposing second side, the electronic display device being positioned adjacent to the second side of the mirror such the electronic display device is at least partially visible through the first side of the mirror responsive to the electronic display device being activated; executing, on one or more processing devices communicatively coupled to the electronic display device, a first application; displaying, on the electronic display device, a first type of information related to the first application; monitoring an area adjacent to the first side of the mirror with a camera communicatively coupled to the one or more processing devices; detecting, with the one or more processing devices, an object disposed in the area adjacent to the first side of the mirror; identifying, with the one or more processing devices, the detected object from a plurality of pre-determined potential objects; and responsive to identifying the detected object, modifying the execution of the first application based on the identified detected object.

Alternative Implementation 28. The method of Alternative Implementation 27, wherein the modifying the execution of the first application includes displaying a second type of information related to the first application, the second type of information being different from the first type of information.

Alternative Implementation 29. The method of Alternative Implementation 27, wherein the modifying the execution of the first application includes executing a second application on the processing device different from the first application.

Alternative Implementation 30. The method of Alternative Implementation 27, wherein the object is a toothbrush, a razor, a makeup implement, or any combination thereof.

Alternative Implementation 31. A method of illuminating a face, comprising: providing an electronic display device and a mirror, the mirror having a first side and an opposing second side, the electronic display device being positioned adjacent to the second side of the mirror such the electronic display device is at least partially visible through the first side of the mirror responsive to the electronic display device being activated; monitoring an area adjacent to the first side of the mirror with one or more sensors; detecting, with the one or more sensors, the face responsive to the face being positioned within a threshold distance from a surface of the mirror on the second side of the mirror; determining, using one or more processors communicatively coupled to the one or more sensors, an outer periphery of the face; and activating a portion of the electronic display device to illuminate the face.

Alternative Implementation 32. The method of Alternative Implementation 31, wherein the activated portion of the electronic display device includes a ring-shaped configuration such that the activated portion of the electronic display device is generally aligned with the outer periphery of the face.

Alternative Implementation 33. The method of Alternative Implementation 32, wherein the activated portion of the electronic display device substantially encloses a non-activated portion of the display, the non-activated portion of the electronic display device being generally aligned with an interior of the outer periphery of the face.

Alternative Implementation 34. The method of Alternative Implementation 31, wherein the activated portion of the electronic display device has a shape that generally corresponds to a shape of the face.

Alternative Implementation 35. The method of Alternative Implementation 31, wherein the threshold distance is less than about five inches.

Alternative Implementation 36. A system for illuminating a face of a user, the system comprising: a smart mirror device including: a frame; a mirror coupled to the frame; one or more sensors coupled to the frame and positioned generally adjacent to at least a portion of a periphery of the mirror; an electronic display device coupled to the frame such that the electronic display device is positioned adjacent to a portion of the mirror; and one or more processors configured to execute instructions stored in one or more memory devices such that the smart mirror device is caused to: responsive to the face of the user being positioned within a threshold distance from a surface of the mirror, detect, via at least one of the one or more sensors, the face of the user; determine an outer periphery of the face; and activate a portion of the electronic display device to aid in illuminating the face.

Alternative Implementation 37. The system of Alternative Implementation 36, wherein the activated portion of the electronic display has a generally oval shape, a generally circular shape, a generally curved shape, or any combination thereof.

Alternative Implementation 38. The system of Alternative Implementation 36, wherein the activated portion of the electronic display also aids in illuminating a reflection of the face in the mirror.

Alternative Implementation 39. The system of Alternative Implementation 36, wherein the mirror is coupled to the frame such that the mirror is less than one inch from a screen of the electronic display.

Alternative Implementation 40. A method of compensating for an ambient light condition, comprising: providing an electronic display device and a mirror, the mirror having a first side and an opposing second side, the electronic display device being positioned adjacent to the second side of the mirror such the electronic display device is at least partially visible through the first side of the mirror responsive to the electronic display device being activated; detecting, using an ambient light sensor, the ambient light condition illuminating an object; determining, using one or more processors communicatively coupled to the ambient light sensor, a difference between the detected ambient light condition and a desired light condition; producing light using one or more lighting sources based on the determined difference between the ambient light condition and the desired light condition; and illuminating the object with the produced light such that the ambient light condition and the produced light combine to cause the object to be illuminated according to the desired lighting condition.

Alternative Implementation 41. The method of Alternative Implementation 40, wherein the ambient light sensor is a camera.

Alternative Implementation 42. The method of Alternative Implementation 41, wherein the ambient light condition is detected by capturing an image of an object and analyzing the captured image.

Alternative Implementation 43. A system for compensating for an ambient lighting condition, the system comprising: a smart mirror device including: a frame; a mirror coupled to the frame; an ambient lighting sensor coupled to the frame; one or more lighting sources; an electronic display device coupled to the frame such that the electronic display device is positioned adjacent to a portion of the mirror; and one or more processors configured to execute instructions stored in one or more memory devices such that the smart mirror device is caused to: detect, using the ambient lighting sensor, the ambient lighting condition adjacent to the system; determine a difference between the detected ambient lighting condition and a desired lighting condition; and emit light, via one or more lighting sources, based on the determined difference between the ambient lighting condition and the desired lighting condition.

Alternative Implementation 44. A method of capturing an image of a user, comprising: providing an electronic display device and a mirror, the mirror having a first side and an opposing second side, the electronic display device being positioned adjacent to the second side of the mirror such the electronic display device is at least partially visible through the first side of the mirror responsive to the electronic display device being activated; illuminating, using light produced by one or more light sources, a user located adjacent to the first side of the mirror; capturing, using a camera, a first image of the user located adjacent to the first side of the mirror; displaying on the electronic display device the captured first image of the user; displaying, on the electronic display device, one or more user-selectable icons, each icon corresponding to a different lighting condition; detecting a user selection of at least one of the one or more user-selectable icons; adjusting the light produced by the one or more light sources based on the user selection of the at least one of the one or more user-selectable icons such that the user is illuminated by a selected lighting condition; and capturing, using the camera, a second image of the user illuminated by the selected lighting condition.

Alternative Implementation 45. The system of Alternative Implementation 6, wherein the mirror and the sensor frame have an identical shape.

Alternative Implementation 46. The system of Alternative Implementation 6, wherein the mirror and the sensor frame have a different shape.

Alternative Implementation 47. The system of Alternative Implementation 6, wherein the sensor frame has a rectangular shape, a square shape, a triangle shape, a circle shape, or an oval shape.

Alternative Implementation 48. The system of Alternative Implementation 6, wherein the sensor frame has a rectangular shape, a square shape, a triangle shape, a circle shape, or an oval shape.

Alternative Implementation 49. A system comprising: a mirror having a first side and an opposing second side, the mirror being configured to permit a first portion of light incident on the first side to transmit therethrough and to permit a second portion of the light incident on the first side to reflect therefrom; a first electronic display positioned adjacent to the second side of the mirror such that the first electronic display is at least partially visible through the first side of the mirror responsive to the first electronic display being at least partially activated; a second electronic display positioned adjacent to the second side of the mirror such that the second electronic display is at least partially visible through the first side of the mirror responsive to the second electronic display being at least partially activated, the second electronic display being spaced apart from the first electronic display such that a gap is defined between the first electronic display and the second electronic display; one or more sensors positioned generally about a periphery of the mirror and being configured to detect a presence of and a relative location of an object positioned adjacent to the first side of the mirror; a light source configured to produce light and at least partially aid in illuminating the object responsive to the object being adjacent to the first side of the mirror; and a camera configured to detect the object, the camera being positioned adjacent the second side of the mirror and positioned within the gap between the first electronic display and the second electronic display.

Alternative Implementation 50. A system comprising: a frame; a mirror coupled to the frame, the mirror having a first side and an opposing second side, the mirror being configured to permit a first portion of light incident on the first side to transmit therethrough and to permit a second portion of the light incident on the first side to reflect therefrom; an electronic display couple to the frame such that the electronic display is positioned adjacent to the second side of the mirror; a plurality of sensors positioned generally about at least a portion of a periphery of the mirror and being configured to detect a presence of and a relative location of an object positioned adjacent to the first side of the mirror; a camera positioned adjacent the second side of the mirror and positioned such that the object is within a field of view of the camera responsive to the object being positioned adjacent to the first side of the mirror; and an obstruction coupled the frame and being configured move between a first position where the obstruction obscures the field of view of the camera and a second position where the obstruction does not obscure the field of view of the camera.

Alternative Implementation 51. The system of Alternative Implementation 50, wherein the obstruction is pivotally coupled to the frame.

Alternative Implementation 52. The system of Alternative Implementation 50, wherein the obstruction is slidably coupled to the frame.

Alternative Implementation 53. The system of Alternative Implementation 50, wherein the obstruction includes an opaque material.

Alternative Implementation 54. The system of Alternative Implementation 50, wherein the obstruction includes a partially transparent material such that only a portion of light is able to pass therethrough.

Alternative Implementation 55. The system of Alternative Implementation 50, wherein the obstruction includes one or more optical filters.

Alternative Implementation 56. The system of Alternative Implementation 50, wherein the obstruction is biased towards the first position.

Alternative Implementation 57. The system of Alternative Implementation 50, wherein the obstruction is biased towards the second position.

Alternative Implementation 58. The system of Alternative Implementation 50, wherein the obstruction is configured to be biased towards the first position or towards the second position.

Alternative Implementation 59. The system of Alternative Implementation 50, wherein the obstruction is configured to be manually moved between the first position and the second position.

Alternative Implementation 60. The system of Alternative Implementation 50, wherein the obstruction is configured to be automatically moved between the first position and the second position using one or more electronic actuation devices.

Alternative Implementation 61. The system of Alternative Implementation 60, wherein the one or more activation devices include a solenoid, a spring, a lever, a magnet, or any combination thereof.

Alternative Implementation 62. The system of Alternative Implementation 50, wherein the electronic display is at least partially visible through the first side of the mirror only when to the electronic display is activated.

Alternative Implementation 63. The system of Alternative Implementation 50, further comprising a light source configured to produce light and at least partially aid in illuminating the object.

Alternative Implementation 64. A system comprising: a frame; a mirror coupled to the frame; an electronic display couple to the frame such that the electronic display is positioned adjacent to a rear side of the mirror; a camera coupled to the frame such that a field of view of the camera includes an area adjacent to a front side of the mirror; and an obstruction coupled the frame and being configured move between a first position and a second position, responsive to the obstruction being in the first position, the obstruction is configured to obscure at least a portion of the field of view of the camera, responsive to the obstruction being in the second position, the obstruction is configured to not obscure the field of view of the camera.

Alternative Implementation 65. The system of Alternative Implementation 64, wherein the mirror is a two-way mirror such that the field of view of the camera is able to extend into the area adjacent to the front side of the mirror.

Alternative Implementation 66. The system of Alternative Implementation 64, wherein the electronic display device includes an aperture therethrough such that the field of view of the camera is able to extend through the aperture and into the area adjacent to the front side of the mirror.

Alternative Implementation 67. The system of Alternative Implementation 66, wherein the aperture is located in a generally central portion of the electronic display device.

Alternative Implementation 68. A system for providing a tutorial, the system comprising: a smart mirror device including: a frame; a mirror coupled to the frame; an electronic display device coupled to the frame such that the electronic display device is positioned adjacent to a portion of the mirror; and one or more processors configured to execute instructions stored in one or more memory devices such that the smart mirror device is caused to: responsive to receiving an input to begin a first tutorial, display, on the electronic display device, (i) a first looping video illustrating a human performing a how-to tutorial for a first type of activity, (ii) a second looping video illustrating an animation associated with the how-to tutorial shown in the first looping video, and (iii) a real-time video feed of a user; and responsive to receiving a magnifier input associated with a portion of the user in the displayed real-time video feed, display, on the electronic display device, a zoomed in view of the user including the portion of the user.

Alternative Implementation 69. The system of Alternative Implementation 68, wherein the smart mirror further includes a light source that is configured to emit light onto a portion of the user.

Alternative Implementation 70. The system of Alternative Implementation 69, wherein the light source includes one or more lasers that are configured to project one or more shapes on the user.

Alternative Implementation 71. The system of Alternative Implementation 70, wherein the one or more shapes include dots, circles, squares, triangles, curves, arcs, arches, lines, or any combination thereof Alternative Implementation 72. The system of Alternative Implementation 70, wherein the one or more shapes projected onto the user indicate one or more locations for the user to apply one or more products associated with the first type of activity.

Alternative Implementation 73. The system of Alternative Implementation 68, wherein the first type of activity is application of makeup, application of moisturizer, application of hair dye, application of hair gel, application of shaving cream, shaving, brushing teeth, eyebrow waxing, waxing, eyebrow threading, threading, facials, ear cleaning, hair styling, application of contact lenses, application of facial masks, or any combination thereof.

Alternative Implementation 74. The system of Alternative Implementation 68, wherein the one or more processors are further configured to execute instructions stored in the one or more memory devices such that the smart mirror device is caused to: display, adjacent to the real-time video feed of the user, a selectable magnifier element.

Alternative Implementation 75. A system for providing a tutorial, the system comprising: a frame; a mirror coupled to the frame; an electronic display device coupled to the frame such that the electronic display device is positioned adjacent to a portion of the mirror; and one or more processors configured to execute instructions stored in one or more memory devices such that the system is caused to: responsive to receiving an input to begin a first tutorial, display, on the electronic display device, a first looping video illustrating a human performing a how-to tutorial for a first type of activity.

Alternative Implementation 76. The system of Alternative Implementation 75, wherein the system is further caused to display a second looping video illustrating an animation associated with the how-to tutorial shown in the first looping video.

Alternative Implementation 77. The system of Alternative Implementation 76, wherein the second looping video is displayed below the first looping video and aligned therewith such that a centerline of the first looping video and a centerline of the second looping video are coincident.

Alternative Implementation 78. The system of Alternative Implementation 75, wherein the system is further caused to display a real-time video feed of a user.

Alternative Implementation 79. The system of Alternative Implementation 78, wherein the system is further caused to, responsive to receiving a magnifier input associated with a portion of the user in the displayed real-time video feed, display, on the electronic display device, a zoomed in view of the user including the portion of the user.

Alternative Implementation 80. The system of Alternative Implementation 75, wherein the system is further caused to display a still image of a user.

Alternative Implementation 81. The system of Alternative Implementation 80, wherein the system is further caused to, responsive to receiving a magnifier input associated with a portion of the user in the displayed still image, display, on the electronic display device, a zoomed in still image of the user including the portion of the user.

Alternative Implementation 82. A system for providing a tutorial, the system comprising: a frame; a mirror coupled to the frame; an electronic display device coupled to the frame such that the electronic display device is positioned adjacent to a portion of the mirror; and one or more processors configured to execute instructions stored in one or more memory devices such that the system is caused to: responsive to receiving an input to begin a first tutorial, display, on the electronic display device, (i) a first looping video illustrating a human performing a how-to tutorial for a first type of activity and (ii) a real-time video feed of a user; and modify the real-time video feed of the user to overlay on a portion of the user one or more template features associated with the first type of activity.

Alternative Implementation 83. The system of Alternative Implementation 82, wherein the first type of activity is application of makeup, application of moisturizer, application of hair dye, application of hair gel, application of shaving cream, shaving, brushing teeth, eyebrow waxing, waxing, eyebrow threading, threading, facials, ear cleaning, hair styling, application of contact lenses, application of facial masks, or any combination thereof.

Alternative Implementation 84. The system of Alternative Implementation 82, wherein the one or more template features include one or more dots, one or more circles, one or more squares, one or more triangles, one or more curves, one or more arcs, one or more arches, one or more lines, or any combination thereof.

Alternative Implementation 85. The system of Alternative Implementation 82, wherein the one or more template features aid the user in conducting the first type of activity.

Alternative Implementation 86. A system for capturing and displaying images of a user, the system comprising: a frame; a mirror coupled to the frame; an electronic display device coupled to the frame such that the electronic display device is positioned adjacent to a portion of the mirror; a camera coupled to the frame; and one or more processors configured to execute instructions stored in one or more memory devices such that the system is caused to: generate, using the camera, video data associated with at least a portion of the user; display, on the electronic display device, the generated video data as a real-time video feed of at least a portion of the user; capture, from the video data, first image data reproducible as a first image of the at least a portion of the user; display the first image and a first set of selectable options, the first set of selectable options being associated with a first characteristic of the user; receive, via an input device, a selection of one of the first set of selectable options; and responsive to receiving the selection of the one or the first set of selectable options, display a second image of the user, the second image of the user being a modified version of the first image of the user and illustrating a proposed modification to the first characteristic of the user, the modification being based on the selection of the one of the first set of selectable options.

Alternative Implementation 87. The system of Alternative Implementation 86, wherein the system is further caused to: display a second set of selectable options, the second set of selectable options being associated with a second characteristic of the user; and receive, via the input device, a selection of one of the second set of selectable options.

Alternative Implementation 88. The system of Alternative Implementation 87, wherein the system is further caused to, responsive to receiving the selection of one of the second set of selectable options second, display a third image of the user, the third image of the user being a second modified version of the first image of the user, the second modification being based on the selection of the one of the second set of selectable options.

Alternative Implementation 89. The system of Alternative Implementation 88, wherein the system is further configured to simultaneously display the first image of the user, the second image of the user, and the third image of the user.

Alternative Implementation 90. The system of Alternative Implementation 87, wherein the system is further configured to, responsive to receiving the selection of the one of the second set of selectable options, display (i) the first image of the user, (ii) the second image of the user; and (iii) a third image associated with the selection of the one of the second set of selectable options, the third image illustrating a proposed modification to the second characteristic of the user.

Alternative Implementation 91. The system of Alternative Implementation 87, wherein the first characteristic of the user is a hair color of the user.

Alternative Implementation 92. The system of Alternative Implementation 91, wherein the first image of the user shows the user with an existing hair color and wherein the second image of the user shows the user with a modified hair color, the modified hair color corresponding to the selection of the one of the first set of selectable options.

Alternative Implementation 93. The system of Alternative Implementation 91, wherein each of the first set of selectable options is associated with a distinct hair color.

Alternative Implementation 94. The system of Alternative Implementation 91, wherein the second characteristic of the user is a hair style of the user.

Alternative Implementation 95. The system of Alternative Implementation 94, wherein each selectable option of the second set of selectable options is associated with a distinct hair style.

Alternative Implementation 96. The system of Alternative Implementation 86, wherein each of the first set of selectable options is a unique proposed modification of the first characteristic of the user.

Alternative Implementation 97. The system of Alternative Implementation 86, wherein each of the first set of user selectable options includes an image associated with a unique proposed modification of the first characteristic of the user.

Alternative Implementation 98. A system for displaying images, the system comprising: a frame; a mirror coupled to the frame; an electronic display device coupled to the frame such that the electronic display device is positioned adjacent to a portion of the mirror; a camera coupled to the frame; and one or more processors configured to execute instructions stored in one or more memory devices such that the system is caused to: display, on the electronic display device, a real-time video feed of a user; capture first image data reproducible as a first image of the user; identify an object being held by the user in the first image; and responsive to identifying the object being held by the user in the first image, display a second image of the user, the second image of the user being a modified version of the first image of the user, the modification being based on the identified object being held by the user.

Alternative Implementation 99. The method of Alternative Implementation 98, wherein the object includes hair dye and wherein the second image of the user illustrates the user having a hair color associated with the hair dye.

Alternative Implementation 100. The method of Alternative Implementation 98, wherein the object includes lipstick and wherein the second image of the user illustrates the user having a lip color associated with the lipstick.

Alternative Implementation 101. The method of Alternative Implementation 98, wherein the object includes makeup and wherein the second image of the user is a modified version of the first image that is modified based on the identified makeup.

Alternative Implementation 102. A system for displaying images, the system comprising: a frame; a mirror coupled to the frame; an electronic display device coupled to the frame such that the electronic display device is positioned adjacent to a portion of the mirror; a camera coupled to the frame; and one or more processors configured to execute instructions stored in one or more memory devices such that the system is caused to: display, on the electronic display device, a real-time video feed of a user; receive, via an input device, a selection of an area of interest of the user shown in the real-time video feed of the user; display, on the electronic display device, a zoomed-in real-time video feed of the area of interest of the user; and continue to display, on the electronic display device, the zoomed-in real time video feed of the area of interest of the user responsive to movement of the user.

Alternative Implementation 103. A system comprising: a frame; a mirror coupled to the frame; an electronic display device coupled to the frame such that the electronic display device is positioned adjacent to at least a portion of the mirror; a camera coupled to the frame, the camera having a field of view; and one or more processors configured to execute instructions stored in one or more memory devices such that the system is caused to: continuously display, on the electronic display device, a real-time video feed of at least a portion of a user positioned within the field of view of the camera; identify an object within the field of view of the camera; and subsequent to the identification, modify the continuously displayed real-time video feed based on at least the identified object.

Alternative Implementation 104. The system of Alternative Implementation 103, wherein the frame is configured to be mounted to a wall.

Alternative Implementation 105. The system of Alternative Implementation 103, wherein the at least a portion of the user includes a face of the user, hair of the user, a torso of the user, an arm of the user, a leg of the user, a head of the user, or any combination thereof.

Alternative Implementation 106. The system of Alternative Implementation 103, wherein the identified object is a beauty product capable of being applied to the user, and wherein the modified continuously displayed real-time video feed shows a result of the beauty product being applied to the user.

Alternative Implementation 107. The system of Alternative Implementation 106, wherein the identified object includes hair dye, and wherein the modified continuously displayed real-time video feed shows the user having a hair color associated with the hair dye.

Alternative Implementation 108. The system of Alternative Implementation 106, wherein the identified object includes lipstick, and wherein the modified continuously displayed real-time video feed shows the user having a lip color associated with the lipstick.

Alternative Implementation 109. The system of Alternative Implementation 106, wherein the identified object includes makeup, and wherein modified continuously displayed real-time video feed shows the user with the makeup applied to the user.

Alternative Implementation 110. The system of Alternative Implementation 103, wherein the identified object is a pair of glasses, and wherein the second real-time video of the user shows the user wearing the pair of glasses.

Alternative Implementation 111. The system of Alternative Implementation 103, wherein the identified object is held by the user.

Alternative Implementation 112. The system of Alternative Implementation 103, wherein the continuously displayed real-time video feed is modified responsive to the system receiving a prompt from the user.

Alternative Implementation 113. The system of Alternative Implementation 112, wherein the prompt from the user is the identification of the object within the field of view of the camera, a user selection of a user-selectable icon displayed on the display, a voice command, or a user gesture.

Alternative Implementation 114. The system of Alternative Implementation 103, wherein the modified continuously displayed real-time video feed of the at least a portion of the user shows only a modified portion of the user, such that (i) the modified portion of the user is visible to the user in the display through the mirror and (ii) an unmodified portion of the user is visible to the user in the mirror.

Alternative Implementation 115. The system of Alternative Implementation 103, wherein the modified continuously displayed real-time video feed of at least a portion of the user shows a modified portion of the user and an unmodified portion of the user, such that neither the modified portion of the user or the unmodified portion of the user are visible in the display.

Alternative Implementation 116. The system of Alternative Implementation 103, wherein the continuously displayed real-time video is modified within about 20 milliseconds of the identification of the object.

Alternative Implementation 117. The system of Alternative Implementation 103, wherein the continuously displayed real-time video is modified within about 20 microseconds of the identification of the object.

Alternative Implementation 118. A system, the system comprising: a frame; a mirror coupled to the frame; an electronic display device coupled to the frame such that the electronic display device is positioned adjacent to a portion of the mirror; a camera coupled to the frame, the camera having a field of view; and one or more processors configured to execute instructions stored in one or more memory devices such that the system is caused to: continuously display, on the electronic display device, a real-time video feed of at least a portion of a user positioned within the field of view of the camera; and subsequent to receiving a prompt, modify the continuously displayed real-time video feed based on at least the prompt.

Alternative Implementation 119. The system of Alternative Implementation 118, wherein the prompt is an identification of an object within the field of view of the camera, a user-selection of a user-selectable icon displayed on the display, a voice command, or a user gesture.

Alternative Implementation 120. The system of Alternative Implementation 118, wherein the modification is based on an identification of an object within the field of view of the camera, a user-selection of a user-selectable icon displayed on the display, a voice command, a user gesture, ambient conditions, or local weather conditions.

Alternative Implementation 121. The system of Alternative Implementation 118, wherein the modified continuously displayed real-time video feed of the at least a portion of the user shows only a modified portion of the user, such that (i) the modified portion of the user is visible to the user in the display and (ii) an unmodified portion of the user is visible to the user in the mirror.

Alternative Implementation 122. The system of Alternative Implementation 118, wherein the modified continuously displayed real-time video feed of the at least a portion of the user shows a modified portion of the user and an unmodified portion of the user, such that neither the modified portion of the user or the unmodified portion of the user are visible in the display.

Alternative Implementation 123. A system for displaying images or videos, the system comprising: a frame; a mirror coupled to the frame; an electronic display device coupled to the frame such that the electronic display device is positioned adjacent to a portion of the mirror; a camera coupled to the frame, the camera having a field of view; and one or more processors configured to execute instructions stored in one or more memory devices such that the system is caused to: monitor, using the camera, a user positioned within the field of view of the camera; and continuously display, on the electronic display device, a real-time video feed of a first portion of the user, such that a second portion of the user is visible to the user in the mirror; receive a prompt; and subsequent to the receiving of the prompt, modify the displayed first portion of the user in the continuously displayed real-time video feed.

Alternative Implementation 124. The system of Alternative Implementation 123, wherein the prompt includes identifying an object located within the field of view of the camera.

Alternative Implementation 125. A system, the system comprising: a frame; a mirror coupled to the frame; an electronic display device coupled to the frame such that the electronic display device is positioned adjacent to a portion of the mirror; a camera coupled to the frame, the camera having a field of view; and one or more processors configured to execute instructions stored in one or more memory devices such that the system is caused to: monitor, using the camera, a user positioned within the field of view of the camera; continuously display, on the electronic display device, a real-time video feed of at least a portion of the user; determine a mood of the user; and subsequent to the determination of the mood of the user, modify the continuously displayed real-time video feed based on at least the determined mood of the user.

Alternative Implementation 126. The system of Alternative Implementation 125, wherein the modified continuously displayed real-time video feed of the at least a portion of the user shows a modified version of the user based on the determined mood of the user.

Alternative Implementation 127. The system of Alternative Implementation 103, wherein the mirror has a rectangular shape with a long dimension of between about four inches and about twelve inches.

Alternative Implementation 128. The system of Alternative Implementation 103, wherein the mirror has a circular shape with a diameter of between about four inches and about twelve inches.

Alternative Implementation 129. The system of Alternative Implementation 103, wherein the mirror has a square shape that is (i) about three inches by about three inches, (ii) about four inches by about four inches, or (iii) about five inches by about five inches.

Alternative Implementation 130. The system of Alternative Implementation 103, wherein the mirror is sized to fit a reflection of (i) an upper body of the user, (ii) a head and a neck of the user, or (iii) only a head of the user.

Alternative Implementation 131. The system of Alternative Implementation 103, wherein the mirror has a size and shape that generally matches a size and a shape of the electronic display device.

Alternative Implementation 132. The system of Alternative Implementation 103, wherein the one or more processors are configured to connect with one or more external devices, and wherein the one or more memory devices are configured to receive data from each of the one or more external devices.

Alternative Implementation 133. The system of Alternative Implementation 132, wherein the one or more external devices includes at least one of a mobile phone, a laptop computer, a desktop computer, an online server, a fitness tracker, a scale, a cloud service, an Internet-connected water bottle, an Internet-connected thermostat, a smart watch, a smart speaker, or any combination thereof.

Alternative Implementation 134. The system of Alternative Implementation 132, wherein the one or more processors are configured cause the electronic display device to display information related to first data received from a first of the one or more external devices, and related to second data received from a second of the one or more external devices Alternative Implementation 135. The system of Alternative Implementation 132, wherein the one or more processors are configured to (i) analyze first data received from a first of the one or more external devices and second data received from a second of the one or more external devices, and (ii) correlate a portion of the first data with a portion of the second data.

Alternative Implementation 136. The system of Alternative Implementation 135, wherein the one or more processors are configured cause the electronic display device to display information related to the portion of the first data and the portion of the second data.

Alternative Implementation 137. The system of Alternative Implementation 135, wherein the one or more processors are configured cause a recommendation to be communicated to the user, the recommendation being based at least in part on the first portion of the first data and the second portion of the second data.

It is contemplated that any elements of any one of the above alternative implementations can be combined with any elements of one or more of any of the other alternative implementations and such combinations are intended as being included in the scope of the present disclosure.

What is claimed is:

1. A system comprising:
    a frame;
    a mirror coupled to the frame;
    an electronic display device coupled to the frame such that the electronic display device is positioned adjacent to at least a portion of the mirror;
    one or more sensors configured to detect portions of a user that are within a threshold distance of the system;
    a camera coupled to the frame, the camera having a field of view; and
    one or more processors configured to execute instructions stored in one or more memory devices such that the system is caused to:
        continuously display, on the electronic display device, a real-time video feed of at least a portion of the user positioned within the field of view of the camera;
        detect, based on data output by the one or more sensors, that the user's face is within the threshold distance of the system;
        determine, based on the detection of the user's face, boundaries of the user's face;
        display, on the electronic display device based on the boundaries of the user's face, an illuminated area, wherein the illuminated area is aligned with a periphery of the user's face;
        update, based on movement of the user's face with respect to the system, the display of the illuminated area such that the illuminated area remains aligned with the periphery of the user's face as the user's face moves with respect to the system;
        identify an object within the field of view of the camera; and
        subsequent to the identification, modify the continuously displayed real-time video feed based on at least the identified object.

2. The system of claim 1, wherein the at least a portion of the user includes the user's face, hair of the user, a torso of the user, an arm of the user, a leg of the user, a head of the user, or any combination thereof.

3. The system of claim 1, wherein the identified object is a beauty product capable of being applied to the user, and wherein the modified continuously displayed real-time video feed shows a result of the beauty product being applied to the user.

4. The system of claim 3, wherein the identified object includes hair dye, and wherein the modified continuously displayed real-time video feed shows the user having a hair color associated with the hair dye.

5. The system of claim 3, wherein the identified object includes lipstick, and wherein the modified continuously displayed real-time video feed shows the user having a lip color associated with the lipstick.

6. The system of claim 3, wherein the identified object includes makeup, and wherein modified continuously displayed real-time video feed shows the user with the makeup applied to the user.

7. The system of claim 3, wherein the identified object is a pair of glasses, and wherein the modified continuously displayed real-time video feed shows the user wearing the pair of glasses.

8. The system of claim 1, wherein the continuously displayed real-time video feed is modified responsive to the system receiving a prompt from the user.

9. The system of claim 8, wherein the prompt from the user is the identification of the object within the field of view of the camera, a user selection of a user-selectable icon displayed on the display, a voice command, or a user gesture.

10. The system of claim 1, wherein the modified continuously displayed real-time video feed of the at least a portion of the user shows only a modified portion of the user, such that (i) the modified portion of the user is visible to the user in the display through the mirror and (ii) an unmodified portion of the user is visible to the user in the mirror.

11. The system of claim 1, wherein the modified continuously displayed real-time video feed of at the least a portion of the user shows a modified portion of the user and an unmodified portion of the user, such that both the modified portion of the user and the unmodified portion of the user are visible in the display.

12. The system of claim 1, wherein the continuously displayed real-time video is modified within about 20 milliseconds of the identification of the object, or within 20 microseconds of the identification of the object.

13. The system of claim 1, wherein the modification is further based on at least a user-selection of a user-selectable icon displayed on the display, a voice command, a user gesture, ambient conditions, or local weather conditions.

14. The system of claim 1, wherein
the one or more processors are further configured to execute the instructions stored in the one or more memory devices such that the system is caused to:
determine a mood of the user; and
subsequent to the determination of the mood of the user, modify the continuously displayed real-time video feed based on at least the determined mood of the user.

15. The system of claim 14, wherein the modified continuously displayed real-time video feed of the at least a portion of the user shows a modified version of the user based on the determined mood of the user.

16. The system of claim 1, wherein the mirror has a size and shape that generally matches a size and a shape of the electronic display device.

17. The system of claim 1, wherein the one or more processors are configured to connect with one or more external devices, and wherein the one or more memory devices are configured to receive data from each of the one or more external devices.

18. The system of claim 17, wherein the one or more external devices includes at least one of a mobile phone, a laptop computer, a desktop computer, an online server, a fitness tracker, a scale, a cloud service, an Internet-connected water bottle, an Internet-connected thermostat, a smart watch, a smart speaker, or any combination thereof.

19. The system of claim 17, wherein the one or more processors are configured to (i) analyze first data received from a first of the one or more external devices and second data received from a second of the one or more external devices, and (ii) correlate a portion of the first data with a portion of the second data.

20. The system of claim 19, wherein the one or more processors are configured cause a recommendation to be communicated to the user, the recommendation being based at least in part on the portion of the first data and the portion of the second data.

* * * * *